(12) United States Patent
Iwase et al.

(10) Patent No.: US 9,672,227 B2
(45) Date of Patent: Jun. 6, 2017

(54) IMAGE PROCESSING APPARATUS, IMAGE DISPLAY METHOD, AND IMAGE DISPLAY PROGRAM

(75) Inventors: Ayako Iwase, Kanagawa (JP); Qihong Wang, Tokyo (JP); Akiko Terayama, Tokyo (JP); Hiroyuki Ozawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 804 days.

(21) Appl. No.: 12/604,795

(22) Filed: Oct. 23, 2009

(65) Prior Publication Data
US 2010/0145982 A1 Jun. 10, 2010

(30) Foreign Application Priority Data
Dec. 4, 2008 (JP) .................................. 2008-309248

(51) Int. Cl.
G06F 17/30 (2006.01)
G06F 3/0488 (2013.01)
G06F 3/0486 (2013.01)

(52) U.S. Cl.
CPC ...... G06F 17/30277 (2013.01); G06F 3/0486 (2013.01); G06F 3/0488 (2013.01)

(58) Field of Classification Search
CPC ......... G06F 17/30056; G06F 17/30064; G06F 17/30067; G06F 17/30115; G06F 17/30277; G06F 3/0488; G06F 3/04883; G06F 3/04842; G06F 3/03547; G06F 3/0416; H04M 1/0241
USPC .......................... 707/706, 722, 736, 749, 915
See application file for complete search history.

(56) References Cited

U.S. PATENT DOCUMENTS

| 2003/0113040 A1* | 6/2003 | Nishiyama et al. .......... 382/305 |
| 2008/0010275 A1 | 1/2008 | Lee et al. |
| 2008/0134033 A1* | 6/2008 | Burns et al. .................. 715/705 |
| 2008/0189629 A1* | 8/2008 | Diederiks et al. ............ 715/762 |

(Continued)

FOREIGN PATENT DOCUMENTS

| JP | 9-6791 | 1/1997 |
| JP | 10-289251 | 10/1998 |

(Continued)

OTHER PUBLICATIONS

Office Action issued Sep. 2, 2010, in Japanese Patent Application No. JP 2008-309248.

(Continued)

*Primary Examiner* — Scott A Waldron
*Assistant Examiner* — Rezwanul Mahmood
(74) *Attorney, Agent, or Firm* — Oblon, McClelland, Maier & Neustadt, L.L.P.

(57) ABSTRACT

An image processing apparatus includes: a display device; a storage unit configured to store a plurality of image data having information corresponding to a search key; a search key specifying unit configured to specify a search key used for image search; a search unit configured to search and extract image data having information relating to the search key specified by the search key specifying unit from the storage unit; and a display control unit configured to control the image corresponding to image data extracted by the search unit to be displayed on the position corresponding to the degree of association as to the search key on the display screen of the display device.

20 Claims, 24 Drawing Sheets

(56) References Cited

U.S. PATENT DOCUMENTS

| | | | | |
|---|---|---|---|---|
| 2008/0301128 | A1* | 12/2008 | Gandert et al. | 707/5 |
| 2009/0278817 | A1* | 11/2009 | Tai | 345/177 |
| 2009/0327948 | A1* | 12/2009 | Penttinen et al. | 715/780 |
| 2010/0107125 | A1* | 4/2010 | Ockene et al. | 715/838 |
| 2013/0232420 | A1* | 9/2013 | Manzari et al. | 715/730 |

FOREIGN PATENT DOCUMENTS

| | | |
|---|---|---|
| JP | 2000-222416 | 8/2000 |
| JP | 2001-126458 | 5/2001 |
| JP | 2001-195415 | 7/2001 |
| JP | 2002-288219 | 10/2002 |
| JP | 2005-354134 | 12/2005 |
| JP | 2008-097175 | 4/2008 |
| JP | 2008-165424 | 7/2008 |
| WO | WO 2007/066662 A1 | 6/2007 |
| WO | WO 2007/066663 A1 | 6/2007 |

OTHER PUBLICATIONS

European Search Report issued Oct. 10, 2010, in European Patent Application No. 09176877.0-2201.
U.S. Appl. No. 12/479,269, filed Jun. 5, 2009, Ozawa, et al.
U.S. Appl. No. 12/496,984, filed Jul. 2, 2009, Iwase, et al.
U.S. Appl. No. 12/499,349, filed Jul. 8, 2009, Ozawa, et al.
U.S. Appl. No. 12/508,909, filed Jul. 24, 2009, Ozawa, et al.
U.S. Appl. No. 12/509,045, filed Jul. 24, 2009, Iwase, et al.
U.S. Appl. No. 12/511,717, filed Jul. 29, 2009, Iwase, et al.
U.S. Appl. No. 12/559,163, filed Sep. 14, 2009, Ozawa, et al.
U.S. Appl. No. 12/580,627, filed Oct. 16, 2009, Ozawa, et al.
U.S. Appl. No. 12/582,046, filed Oct. 20, 2009, Iwase, et al.
U.S. Appl. No. 12/607,508, filed Oct. 28, 2009, Iwase, et al.
U.S. Appl. No. 12/607,475, filed Oct. 28, 2009, Ozawa, et al.
U.S. Appl. No. 12/776,856, filed May 10, 2010, Iwase, et al.

* cited by examiner

FIG. 2

| FILE NAME | KEYWORD (MULTIPLE REGISTRATIONS ALLOWED) | GPS INFORMATION | |
|---|---|---|---|
| IMAGE ANALYSIS INFORMATION | CAMERA INFORMATION | | SHOT DATE AND TIME |
| IMAGE DATA | | | |

FIG. 3

| FOLDER NAME | EVENT TITLE | CREATED DATE AND TIME | ETC. |
|---|---|---|---|
| | | | |
| FILE NAME 1 | ADDRESS ON RECORDING MEDIUM | | SHOT DATE AND TIME |
| FILE NAME 2 | ADDRESS ON RECORDING MEDIUM | | SHOT DATE AND TIME |
| ⋮ | ⋮ | | ⋮ |

FIG. 4

| CATEGORY | SEARCH KEY CANDIDATES |
|---|---|
| PEOPLE | FAMILY, FATHER, MOTHER, ELDER BROTHER, ELDER SISTER, YOUNGER BROTHER, YOUNGER SISTER, ..., ALEX (HIMSELF/HERSELF), MR. A, MR. B, MR. C, ... |
| PLACES | PLACE-NAME (STATE, CITY, COUNTY, TOWN, OTHER PLACE NAMES), STATION NAME, VARIOUS LANDMARK NAMES, ETC. |
| COLORS | RED, WHITE, BLACK, BLUE, ... |
| SEASONS | SPRING, SUMMER, AUTUMN, WINTER, NEW YEAR, EARLY SPRING, EARLY SUMMER, SPRING RAINS, EARLY AUTUMN, EARLY WINTER, ... |
| SUBJECTS | ANIMAL, DOG, CAT, LITTLE BIRD, ..., FLOWER, DAFFODIL, SUNFLOWER, ..., TREE, GRASS, MOUNTAIN, SEA, RIVER, ... |
| CAMERA INFORMATION | DIAPHRAGM, SHUTTER SPEED, ... |
| ETC. | IMAGE ANALYSIS, GPS INFORMATION |

FIG. 8

| DEGREE OF ASSOCIATION | KEYWORD |
|---|---|
| \multicolumn{2}{|l|}{SEARCH KEY: SUMMER} |
| HIGH | SUMMER, SUMMERTIME, EARLY SUMMER, SUMMER VACATION, ... |
| MEDIUM | SUNFLOWER, WATERMELON, FIREWORKS SHOW, SEA, ... |
| LOW | SPRING RAINS, HOMEWORK, SCHOOL, TRAVEL, ... |

FIG. 9

| IMAGE ANALYSIS INFORMATION |
|---|
| AREA OF A PERSON'S FACE WITHIN AN IMAGE |
| NUMBER OF PERSONS WITHIN AN IMAGE |
| DEGREE OF A PERSON'S SMILING FACE WITHIN AN IMAGE |
| FEATURES (HUE, COMPLEXITY, ETC.) OF WHOLE IMAGE |
| ⋮ |

FIG. 16

| SEARCH KEY k1 | SEARCH KEY k2 | DISPLAY POSITION |
|---|---|---|
| HIGH | HIGH | ArC (CENTER) HIGH |
| MEDIUM | MEDIUM | ArC (CENTER) MEDIUM |
| LOW | LOW | ArC (CENTER) LOW |
| HIGH | MEDIUM | ArL (LEFTWARD) MEDIUM |
| HIGH | LOW | ArL (LEFTWARD) MEDIUM |
| MEDIUM | HIGH | ArR (RIGHTWARD) MEDIUM |
| MEDIUM | LOW | ArL (LEFTWARD) LOW |
| LOW | HIGH | ArR (RIGHTWARD) MEDIUM |
| LOW | MEDIUM | ArR (RIGHTWARD) LOW |

FIG. 18

| SEARCH KEY k1 | SEARCH KEY k2 | DISPLAY AREA |
|---|---|---|
| HIGH | HIGH | Ar3 |
| HIGH | MEDIUM | Ar6 |
| HIGH | LOW | Ar9 |
| MEDIUM | HIGH | Ar2 |
| MEDIUM | MEDIUM | Ar5 |
| MEDIUM | LOW | Ar8 |
| LOW | HIGH | Ar1 |
| LOW | MEDIUM | Ar4 |
| LOW | LOW | Ar7 |

FIG. 24
(a) TILT TO POUR
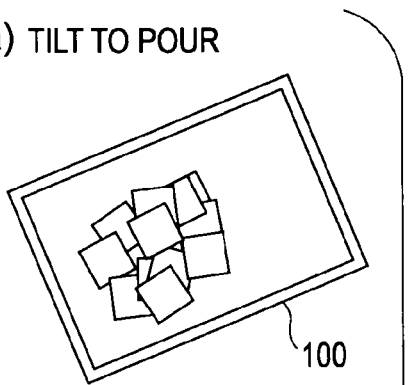
(b) SHAKE RIGHT AND LEFT
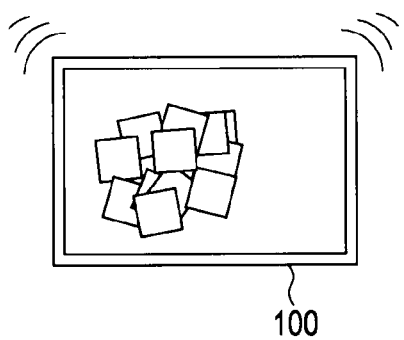
(c) TAP THE TOP OF THE SET
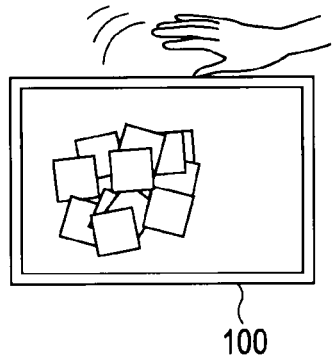
IMAGE GROUP NARROWED DOWN BY SEARCH COLLAPSES INTO ONE GROUP, AND IS SORTED IN A FOLDER AS ONE GROUP
(d)
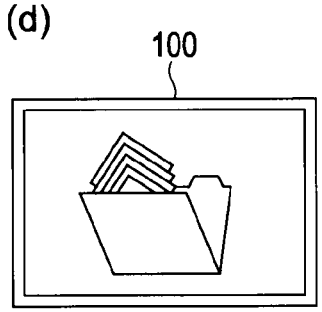

IMAGE PROCESSING APPARATUS, IMAGE DISPLAY METHOD, AND IMAGE DISPLAY PROGRAM

BACKGROUND OF THE INVENTION

1. Field of the Invention

The present invention relates to an apparatus including a display device having a relatively large display screen, e.g., such as a digital still camera, capable of displaying various images, and a method and program used with the apparatus thereof.

2. Description of the Related Art

Digital still cameras which record taken images in a recording medium as digital data have been used widely. In recent years, there has been much advance in reduction in the size of built-in flash memory or removable memory used with digital still cameras, and the capacity of the memory has become great, so a great amount of image data can be stored in such memory.

Also, with digital still cameras, number of taken images which can be stored therein has increased from year to year, and image data of a number too great to be managed in the user's head is frequently stored in built-in flash memory or removable memory.

Therefore, there have been developed digital still cameras wherein a user adds a keyword to image data, whereby search can be executed using that keyword. For example, various types of information such as a place where an image has been taken, the name of a person who has been taken in an image, and so forth, have been added as keywords to image data obtained by taking an image.

Also, in the case of searching the image data of a desired image from a plurality of image data using a keyword added to the image data, the user sets (specifies) a search key (search condition) to execute search processing. For example, a search key is set by selecting a suitable one from search keys presented beforehand, or the like, or input of text data is accepted from the user, and this is set as a search key. Subsequently, search processing is executed using the search key thus set, whereby image data having this search key can be narrowed down. Thus, a keyword is added to image data, thereby enabling search of image data using the keyword thereof, and search of image data can be executed flexibly.

Also, with regard to image search using a keyword, various improvements have been made, and for example, Japanese Unexamined Patent Application Publication No. 2005-354134 and Japanese Unexamined Patent Application Publication No. 2008-165424 disclose searching of a desired image rapidly in a sure manner.

SUMMARY OF THE INVENTION

Incidentally, in the case of detecting image data having information matched with a search key (search condition), search results are displayed in a list format, so in many cases the results thereof can be recognized suitably. However, in the case of extending a search range to image data relating to a search key (search condition), it is difficult to visually quickly recognize the degree of association with the search condition regarding the search results just by arraying and displaying the search results thereof in a flat tiled form.

It has been found to be desirable to provide the results of image search so as to recognize relationship with a search key (search condition) as well.

According to an embodiment of the present invention, an image processing apparatus includes: a display device; a storage unit configured to store a plurality of image data having information corresponding to a search key; a search key specifying unit configured to specify a search key used for image search; a search unit configured to search and extract image data having information relating to the search key specified by the search key specifying unit from the storage unit; and a display control unit configured to control the image corresponding to image data extracted by the search unit to be displayed on the position corresponding to the degree of association as to the search key on the display screen of the display device.

According to the above configuration, a search key used for image search is specified via the search key specifying unit. Image data having information relating to this specified search key is searched and extracted from the storage unit for storing a plurality of image data by the search unit.

Subsequently, the image corresponding to the searched and extracted image data is displayed on the display screen of the display device by the display control unit. In this case, the image corresponding to the image data obtained as a search result is displayed on the position on the display screen corresponding to the degree of association as to the search key by the display control unit.

Thus, the results of the image search can be provided to the user so as to recognize relationship with the search key (search condition) as well.

According to the above configuration, the results of image search can be provided to the user so as to recognize relationship with the search key (search condition) as well.

BRIEF DESCRIPTION OF THE DRAWINGS

FIG. 2 is a diagram for describing a layout example of an image file to be recorded in a recording medium of the imaging apparatus;

FIG. 3 is a diagram for describing a layout example of an image folder formed in the recording medium of the imaging apparatus;

FIG. 4 is a diagram for describing a search key candidate information table formed in the recording medium of the imaging apparatus, or EEPROM, or the like beforehand;

FIG. 8 is a diagram for describing a configuration example of a search key degree-of-association dictionary;

FIG. 9 is a diagram for describing information that can become a search key for image search, of image analysis information;

FIG. 16 is a diagram for describing a display position determining table (1) for determining a display region of thumbnail images;

FIG. 18 is a diagram for describing a display position determining table (2) for determining a display region of thumbnail images;

FIG. 24 is a diagram for describing an operation for determining search results;

DESCRIPTION OF THE PREFERRED EMBODIMENTS

Figure 1:
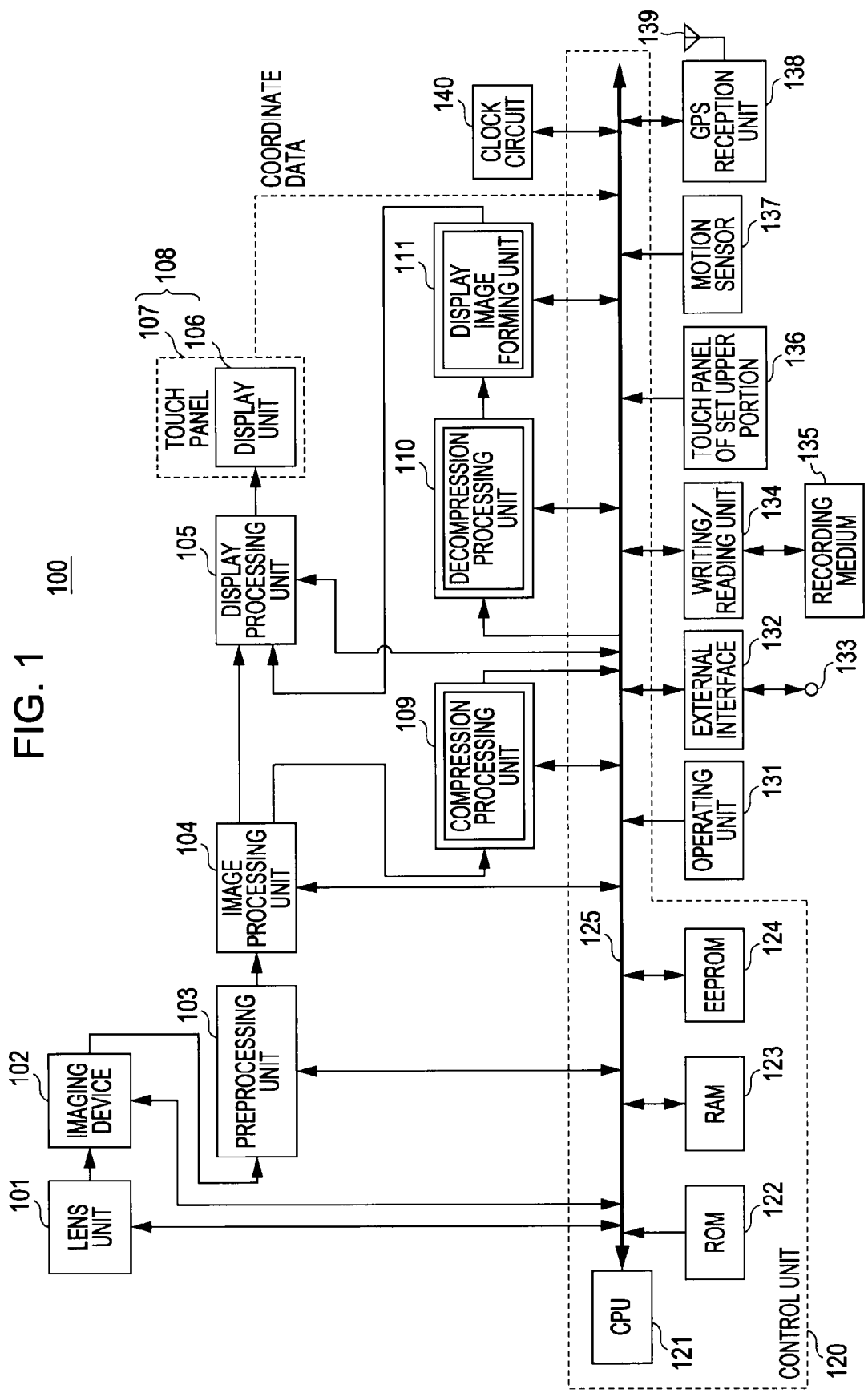
FIG. 1 is a block diagram for describing a configuration example of an imaging apparatus to which an embodiment of an apparatus, method, and program of the present invention has been applied.

An embodiment of an apparatus, method, and program will be described below with reference to the drawings.
Configuration Example of Imaging Apparatus FIG. 1 is a block diagram for describing a configuration example of an imaging apparatus 100 to which an embodiment of an apparatus, method, and program of the present invention has been applied. The imaging apparatus 100 switches shooting modes, whereby both still images and moving pictures can be taken and recorded in a recording medium. However, with the embodiment described below, the configuration and operation of the imaging apparatus 100 will be described with a case where the imaging apparatus 100 uses a function as a digital still camera to principally take or play a still image as an example, in order to simplify explanation.

As shown in FIG. 1, the imaging apparatus 100 includes a lens unit 101, an imaging device 102, a preprocessing unit 103, an image processing unit 104, a display processing unit 105, a display unit 106, a touch panel 107, a compression processing unit 109, a decompression processing unit 110, and a display image forming unit 111.

Also, the imaging apparatus 100 includes a control unit 120, an operating unit 131, an external interface (hereinafter, abbreviated as external interface) 132, an input/output terminal 133, a writing/reading unit 134, and a recording medium 135. Also, the imaging apparatus 100 includes a touch panel on the set upper portion 136, a motion sensor 137, a GPS reception unit 138, a GPS reception antenna 139, and a clock circuit 140.

With the imaging apparatus 100 according to the present embodiment, the display unit 106 is made up of a so-called thin display device, for example, such as an LCD (Liquid Crystal Display), organic EL panel (Organic Electroluminescence Panel), or the like. Though described later, the touch panel 107 is adhered to the whole surface of the display screen of the display unit 106 so as to form an operating surface.

The touch panel 107 accepts an specifying operation (contact operation) as to the operating surface from the user (operator), detects the specified position (touch position) on the operating surface of the touch panel 107, and notifies the control unit 120 of the coordinate data indicating the specified position thereof.

The control unit 120 controls each unit of the imaging apparatus 100 as described later, and also recognizes what kind of display is executed as to the display screen of the display unit 106. The control unit 120 can accept a specifying operation (input operation) from the user based on the coordinate data indicating the specified position on the operating surfaced from the touch panel 107, and display information on the display screen of the display unit 106 corresponding to the specified position thereof.

For example, let us say that the user brings a finger or stylus or the like into contact with a position of the operating surface of the touch panel 107. In this case, in the event that a number has been displayed on the position on the display screen corresponding (matching with) the contact position thereof, the control unit 120 can determine that the user has selected and input the displayed number thereof.

Thus, with the imaging apparatus 100, the display unit 106 and the touch panel 107 make up a touch screen 108 serving as an input apparatus. Note that the touch panel 107 is realized with, for example, a pressure-sensitive type or electrostatic type.

Also, the touch panel 107 can detect each of operations arranged to perform as to multiple portions on the operating surface simultaneously to output the coordinate data indicating each of the contact positions. Also, the touch panel 107 can also detect each of specifying operations arranged to be performed as to the operating surface repeatedly to output the coordinate data indicating each of the contact positions.

Further, the touch panel 107 can also detect contact positions continuously at predetermined timing to output the coordinate data indicating this while the finger or stylus is brought into contact by the user.

Thus, the touch panel 107 can accept various specifying operations (operation input) from the user such as a so-called tapping operation, double tapping operation, dragging operation, flicking operation, pinching operation, and the like to detect this.

Here, the tapping operation is a motion (operation) to specify on the operating surface only once by the user's finger or stylus, such as a "tap". The double tapping operation is a motion to specify on the operating surface continuously twice such as "tap, tap".

Also, the dragging operation is a motion to move the user's finger or stylus while contacting the operating surface. The flicking operation is a motion to specify one point on the operating surface with the user's finger or stylus, and then to operate so as to quickly flick this in an arbitrary direction.

The pinching operation is an operation to bring the user's two fingers into contact with the operating surface simultaneously to open or close the two fingers or the like. In this case, an operation to open the two fingers in contact or the like will be referred to as a pinch out operation, and an operation to close the two fingers or the like will be referred to a pinch in operation.

Though the dragging operation and the flicking operation differ in operation speed, the dragging operation and the flicking operation are operations to bring the user's finger or the like into contact with the operating surface and then to move this onto the operating surface (tracing operation on the operating surface), and are operations to be able to recognize with two types of information of movement distance and movement direction.

Therefore, with the present specification, in the case that one of the dragging operation and the flicking operation is performed, whereby the same processing can be performed, the term "tracing operation" is used as the general term of the dragging operation and the flicking operation.

Subsequently, the control unit 120 is connected to each unit making up the imaging apparatus 100, and controls each unit of the imaging apparatus 100 as described above, and has the configuration of a so-called microcomputer.

The control unit 120 is configured so as to connect to a CPU (Central Processing Unit) 121, ROM (Read Only Memory) 122, RAM (Random Access Memory) 123, and EEPROM (Electrically Erasable and Programmable ROM) 124 via a CPU bus 125.

The CPU 121 reads out a program stored in later-described ROM 122 to execute this, forms a control signal to be supplied to each unit to supply this to each unit, and accepts data or the like provided from each unit to process this.

The ROM 122 stores and holds, as described above, various programs to be executed by the CPU 121, various types of data for processing, and so forth beforehand. The RAM 123 is principally used as a work area, such as temporarily storing a result on the way with various types of processing.

The EEPROM 124 is so-called nonvolatile memory, and stores and holds information to be held even when the power of the imaging apparatus 100 is turned off. For example, various parameters set by the user, the final results of various types of processing, a processing program or data newly provided for adding a function or the like are held in the EEPROM 124.

The control unit 120 thus configured is, as shown in FIG. 1, connected to the operating unit 131, external interface 132, writing/reading unit 134, touch panel on the set upper portion 136, motion sensor 137, GPS reception unit 138, and clock circuit 140.

The operating unit 131 includes operation keys such as various types of adjustment keys, function keys, shutter key, and the like, and accepts operation input from the user to notify the control unit 120 thereof. Thus, the control unit 120 controls each unit according to the operation input from the user accepted via the operating unit 131, whereby processing according the operation input can be executed.

The external interface 132 is a digital interface conforming to a predetermined standard, for example, such as USB (Universal Serial Bus), IEEE (Institute of Electrical and Electronics Engineers Inc) 1394, or the like.

That is to say, the external interface 132 accepts the data from external equipment connected to the input/output terminal 133 by converting this into data in a format that can be processed at the imaging apparatus 100, or outputs data output from the imaging apparatus 100 by converting it into data in a predetermined format.

The writing/reading unit 134 writes data to the recording medium 135 of the imaging apparatus 100, or reads out data recorded in the recording medium 135, according to the control of the control unit 120.

The recording medium 135 is configured so as to detachable to the imaging apparatus 100, and is so-called memory card type removable memory configured so as to have storage capacity of several gigabytes or more, and semiconductor memory is used, for example.

Note that, an arrangement may be made wherein, for example, a built-in type recording medium such as built-in flash memory or small hard disk or the like may be used as the recording medium 135, besides memory card type removable memory.

Also, an arrangement may be made wherein another removable type recording medium such as an optical disc such as a small DVD (digital Versatile Disc) or CD (Compact Disc) or the like may be used as the recording medium 135.

The touch panel on the set upper portion 136 is used for accepting specifying input from the user in a predetermined case. This touch panel 136 is also realized as a pressure-sensitive panel or electrostatic panel. Note that the touch panel on the set upper portion 136 is not necessarily configured of a touch panel, and rather may be realized as a so-called hardware key.

The motion sensor 137 is used for detecting the motion of the imaging apparatus 100, and specifically, is configured of a biaxial or triaxial acceleration sensor or the like. In the case that the imaging apparatus 100 is inclined, the motion sensor 137 can detect how much the imaging apparatus 100 is inclined in which direction to notify the control unit 120 thereof.

Also, the motion sensor 137 can detect distinctly a case where the imaging apparatus 100 is shaken horizontally, and a case where the imaging apparatus 100 is shaken vertically to notify the control unit 120 thereof. Also, for example, even in the case that vibration is applied to the imaging apparatus 100 by tapping, or the like, the motion sensor 137 can also detect this to notify the control unit 120 thereof.

The GPS reception unit 138 receives a predetermined signal from multiple satellites via the GPS reception antenna 139, and analyzes this, whereby the current position of the imaging apparatus 100 can be detected, and this can be notified to the control unit 120.

According to the function of the GPS reception unit 138, the imaging apparatus 100 obtains the current position information at the time of taking of an image, whereby the position information (GPS information) indicating the taking-of-image position can be added to image data as metadata.

Note that the GPS reception unit 138 is configured so as to be operated or so as to stop the operation according to the instruction from the user accepted via the operating unit 131.

The clock circuit 140 has a calendar function, whereby the current date, current day of the week, and current time can be provided, and also a time counter function for measuring a predetermined time interval can be realized as appropriate.

According to the function of this clock circuit 140, information relating to taken date such as taken date and time, taken day of the week, or the like can be added to taken image data. Also, the function of the clock circuit 140 is used, whereby a self timer shooting function that clicks the shutter automatically after elapse of a certain period of time since a predetermined operation to enable an image to be taken can also be realized.

With the imaging apparatus 100 shown in FIG. 1, the lens unit 101 includes, though not shown in the drawing, an imaging lens (objective lens), exposure adjustment mechanism, focusing adjustment mechanism, shutter mechanism, and so forth, and is a portion to take an image of a subject, and to form an image on the sensor surface of the imaging device of the subsequent stage.

The imaging device 102 is configured of an imaging sensor (imaging device) such as a CCD (Charge Coupled Device) or CMOS (Complementary Metal Oxide Semiconductor) image sensor or the like. The imaging device 102 takes an image to be formed on the sensor surface of itself via the lens unit 101 as an electric signal (image signal).

With the imaging apparatus 100 according to the present embodiment, the imaging device 102 includes a single-plate color filter for a color pattern determined to form any one of signals of R (Red), G (Green), and B (Blue) for each pixel beforehand.

Subsequently, the image signal taken via the imaging device 102 is supplied to the preprocessing unit 103 of the subsequent stage. The preprocessing unit 103 includes a CDS (Correlated Double Sampling) circuit, an AGC (Automatic Gain Control) circuit, an A/D (Analog/Digital) converter, and so forth, and is a portion to take the image signal from the imaging device 102 as digital data.

The image signal (image data) taken via the preprocessing unit 103 is supplied to the image processing unit 104. The image processing unit 104 includes a detector circuit, a white balance circuit, a demosaic circuit, a resolution conversion circuit, another image correction circuit, and so forth.

With the image processing unit 104, first, parameters for various types of adjustment processing, such as parameters for exposure adjustment, parameters for focusing (focal point) adjustment, parameters for white balance adjustment, and so forth are formed based on the image data from the preprocessing circuit 103.

Of the parameters formed at the image processing unit 104, parameters for exposure adjustment, and parameters for focusing adjustment are supplied to the control unit 120. The control unit 120 controls, based on the parameters from the image processing unit 104, the exposure adjustment mechanism and the focusing adjustment mechanism of the lens unit 101, whereby adjustment for exposure or focusing can be executed suitably.

Subsequently, with the image processing unit 104, black level matching processing, or white balance adjustment processing based on the parameters for white balance adjustment formed as described above is executed as to the image data from the preprocessing unit 103. According to such adjustment processing, the image data from the preprocessing unit 103 is adjusted so as to obtain an image having a suitable hue.

Subsequently, with the image processing unit 104, demosaic processing (simultaneous processing) for generating RGB data (three primary colors data), aperture correction processing, gamma (γ) correction processing, or the like is executed as to the image data adjusted so as to have a suitable hue.

Further, with the image processing unit 104, Y/C conversion processing for forming a luminance signal (Y) and color signals (Cb, Cr) from the formed RGB data, chromatic aberration correction processing, resolution conversion processing, or the like is executed to form a luminance signal Y and color signals Cb and Cr.

The image data (luminance signal Y, color signals Cb, Cr) formed at the image processing unit 104 is supplied to the display processing unit 105, and is converted into an image signal in a format to be supplied to the display unit 106, and is supplied to the display unit 106.

Thus, the image of a subject taken via the lens unit 101 is displayed on the display screen of the display unit 106, whereby the user can take an image of a target subject while confirming the image of the subject displayed on the display screen of the display unit 106.

Simultaneously, the luminance signal Y and the color signals Cb and Cr formed at the image processing unit 104 are also supplied to the compression processing unit 109. Subsequently, at timing when the shutter key of the operating unit 131 is pressed, the compression processing unit 109 subjects the image data of an image arranged to be displayed on the display screen of the display unit 106 to data compression at that time, and supplies this to the control unit 120.

Note that, with the compression processing unit 109, data compression processing is executed in accordance with a predetermined data compression method. As the data compression method, in the case of a still image, the JPEG (Joint Photographic Experts Group) method is used, and in the case of a moving picture, the MPEG (Moving picture Experts Group) method or the like is used. It goes without saying that the data compression method is not restricted to these, and rather various types can be used.

The control unit 120 controls the writing/reading unit 134 to record the image data subjected to data compression from the compression processing unit 109 in the recording medium 135. Thus, with the imaging apparatus 100, the image of a subject can be taken, and image data forming the image of the subject thereof can be recorded in the recording medium 135.

With the imaging apparatus 100, the image data thus taken and obtained can be stored in the recording medium 135 for each folder to be formed by the user though details will be described later, and can be managed. Folders can be formed according to an object such as for each subject or for each event or the like. With the imaging apparatus 100 according to the present embodiment, folders are formed for each event where taking of an image has been executed, for example, such as the first day of school, an athletic meet, birthday party, or the like. It goes without saying that taken image data can also be moved to a target folder later.

Subsequently, the image data recorded in the recording medium 135 is arranged to be able to be read out by the writing/reading unit 134 controlled by the control unit 120.

The image data read out from the recording medium 135 is supplied to the decompression processing unit 110 via the control unit 120.

The decompression processing unit 110 subjects the image data supplied to itself to decompression processing in accordance with a data compression method used at the time of data compression to restore image data before data compression, and supplies this to the display image forming unit 111.

The display image forming unit 111 uses the image data from the decompression processing unit 110, also uses various types of display data supplied from the control unit 120 as appropriate to form the image data of an image to be displayed on the display screen of the display unit 106, and supplies this to the display processing unit 105.

The display processing unit 105 converts the image data from the display image forming unit 111 into an image signal in a format to be supplied to the display unit 106, and supplies this to the display unit 106, in the same way as when the image data from the image processing unit 104 was processed.

Thus, the image corresponding to the image data recorded in the recording medium 135 can be displayed on the display screen of the display unit 106. That is to say, the image data of a target image recorded in the recording medium 135 can be played.

Thus, the imaging apparatus 100 according to the present embodiment can take the image of a subject and record in the recording medium 135. Also, the imaging apparatus 100 reads out image data recorded in the recording medium 135 to subject this to playback processing, whereby the image corresponding to the image data thereof can be displayed on the display screen of the display unit 106.

With the imaging apparatus 100 having the above configuration, as described below, information serving as a search key (search condition) candidate such a keyword or the like is added to an image file recorded in the recording medium 135 by being taken, and image data can be searched accordingly.

Subsequently, the imaging apparatus 100 does not extract image data having information to be matched with the search key simply. The image data having information relating to the search key is searched and extracted, whereby the result thereof can be displayed on the display screen of the display unit 106 according to the degree of association as to the search key.

Also, the imaging apparatus 100 can determine the results of image search with a range that the user intends without performing complicated operations to store these. Configuration Examples of Image File and Image Folder FIG. 2 is a diagram for describing a layout example of an image file to be recorded in the recording medium 135 of the imaging apparatus 100. As shown in FIG. 2, image files having a file name that is identification information for identifying each image file. This file name is automatically provided by the control unit 120 at the time of taking of an image.

Also, metadata such as a keyword, GPS information, image analysis information, camera information, taken date and time, and so forth is arranged to be added to each image file. Such metadata can be used as the information corresponding to the search key of image data.

Here, the keyword is principally text data to be input by the user. Specifically, with regard to the keyword, a plurality of information can be registered as keywords, which indicates a place name indicating a place where an image has been taken, the name of a person who has been taken into an image, the name of an event that has been held at a place where an image has been taken, the content of the image thereof, and so forth.

Note that the keyword is input via the operating unit 131 and the touch screen 108 in the case that the image corresponding to the image data of an image file to which the keywords will be added is displayed on the display screen of the display unit 106, whereby the keyword can be added to this image file.

Also, for example, an arrangement may be made wherein on a personal computer various types of metadata such as a keyword or the like is added to image data, this is taken into the imaging apparatus 100 via the input/output terminal 133 and the external interface 132, and is recorded in the recording medium 135. That is to say, image data to which metadata such as a keyword and the like has been added at external equipment is taken into the imaging apparatus 100, whereby this can be used.

The GPS information is position information (information of longitude and latitude) indicating the position at the time of taking an image obtained via the above GPS reception unit 138, which can be added to an image file via the control unit 120.

The image analysis information is arranged so as to subject the image data of this image file to image analysis by a predetermined method, thereby obtaining image analysis results, and storing these in each image file. This image analysis is executed principally with the function of the control unit 120 at appropriate timing after taking of an image, and is added to the image file.

With the image analysis information, for example, various techniques such as edge detection, color analysis, and the like are used, whereby the features of the image according to each image data can be indicated by being digitized, and the similarities of picture compositions and subjects can be compared between images.

For that matter, according to this image analysis information, based on the results of this image analysis, an image where a similar person (face) has been taken can be searched, an image where a similar place has been taken can be searched, or an image where features such as hue and complexity are similar can be searched.

Also, this image analysis information is, though described later, information obtained as a result of image analysis, and includes various types of analysis information, such as the area of a person's face within an image, the number of persons who has been taken into an image, the degree of a person's smiling face who has been taken into an image, and information indicating the features of the whole image.

The camera information is information indicating diaphragm, shutter speed, and so forth at the time of taking of an image. This camera information is information managed at the control unit 120, and is added to an image file by the control unit 120 in the case that taking of an image has been performed. According to this camera information, it can be recognized that image data has been taken under what kind of camera conditions.

The taken date and time is date and time information that the control unit 120 has obtained at the time of taking of an image via the clock circuit 140, and has been added to an image file, and is made up of date and time. Thus, it can be recognized accurately when the image data of each image file was taken.

Image data forming the image of a subject obtained by taking an image is stored in an image file as main data. The image file thus formed is recorded in the recording medium 135 of the imaging apparatus 100. Subsequently, the image file is, as described below, stored in an image folder to be created in the recording medium 135 in accordance with the user's instructions.

Note that, with the imaging apparatus 100 according to the present embodiment, in the case that the user does not form an image folder, for example, the folder corresponding to taken date is automatically formed, whereby image data obtained by taking an image can be stored in this.

The image folders in which an image file is stored, as described above, are formed for each event where taking of an image has been performed, for example, such as the first day of school, athletic meet, birthday party, or the like, or for each taken year and month, or for each taken year, month, and day, or the like.

In addition to this, for example, in the case that image folders are formed for each subject and used, or in the case that the imaging apparatus 100 is shared by a family or the like, the image folders are formed for each photographer, and can be used accordingly.

FIG. 3 is a diagram for describing a layout example of an image folder to be formed in the recording medium 135 of the imaging apparatus 100. As shown in FIG. 3, an image folder has a folder name that is identification information for identifying each folder. This folder name is, for example, information corresponding to an event where taking of an image has been performed, such as the first day of school, athletic meet, birthday party, or the like, information relating to a taken day, such as taken year and month, taken year, month, and day, or the like. Also, each image folder has the event title of this image folder, created date and time, other various types of metadata.

The event title can store, in the case that the image folder thereof has been created corresponding to an event, information indicating the more detailed content of the event, e.g., detailed content such as "Alex's first day of school 2008.4.10".

The created date and time is information indicating date and time when this image file was created, and is information that the control unit 120 obtains from the clock circuit 140 at the time of creating an image folder.

In addition to this, information that can be added automatically at the imaging apparatus 100, such as the number of image files stored in this image folder, or comment information (character information) to be input by the user, or the like, can be added as the metadata.

An image folder stores the file name, address on the recording medium, taken date and time, of each of image files belonging to the folder thereof. According to the information of this image folder, it can be recognized when images were taken, which image files are stored in this image folder, and where the image files thereof are stored on the recording medium.

Subsequently, with image files, the image file of image data obtained by taking an image is managed in time-series order according to taken date and time. Thus, based on the information of the image folder, the image data of the image files shown in FIG. 3 can be read out in the direction of time elapsing to display this sequentially, or can be read out sequentially in a direction back in time to display this.

Search Key Candidate Information Table

With the imaging apparatus 100 according to the present embodiment, in order to enable image data search processing using a search key to be performed readily, information serving as a candidate of a search key (search key candidate information) is registered beforehand. The search key candidate information registered in this search key candidate information table can be used as a search key without being registered at the time of search, which will be described later as well.

FIG. 4 is a diagram for describing the search key candidate information table to be created in the recording medium 135 or the EEPROM 124 or the like of the imaging apparatus 100 beforehand. With the imaging apparatus 100 according to the present embodiment, the search key candidate information table manages search key candidate information by classifying into seven categories of "people", "places", "colors", "seasons", "subjects", "camera information", and "etc.".

The search key candidate information relating to people belongs to the category "people", and information such as "family, father, mother, elder brother, elder sister, younger brother, younger sister, . . . " and so forth is registered beforehand, as shown in FIG. 4. Also, the name of the user himself/herself, the name of a friend or acquaintance who will be (has been) a subject, or the like can be registered by the user himself/herself, for example, such as "Alex (himself/herself)", "Mr. A", "Mr. B", "Mr. C", or the like.

The search key candidate information relating to places belongs to the category "places", and information such as a state, city, county, town, other place names, station name, various landmark names, and so forth is registered beforehand, as shown in FIG. 4. Note that the user himself/herself can register a new place name, the name of a newly created landmark (skyscraper or commercial facilities, or the like), a place name that has not been registered, or the like.

Color names such as red, white, black, blue, and so forth, as shown in FIG. 4, belong to the category "colors", multiple color names that have frequently commonly been used are registered beforehand. Note that the user himself/herself can also register color names that are not registered beforehand.

The search key candidate information relating to seasons belongs to the category "seasons", and some words relating to seasons such as new spring, early spring, early summer, early autumn, early winter, and so forth other than "spring, summer, autumn, winter" are registered beforehand, as shown in FIG. 4. Note that the user himself/herself can also register words relating to seasons that are not registered beforehand.

The search key candidate information relating to what can serve as a subject is registered in the category "subjects", and the name of what can commonly frequently serve as a subject, such as an animal, flower, tree, mountain, sea, and so forth are registered beforehand, as shown in FIG. 4. Note that the user himself/herself can also register a word relating to what can serve as a subject that is not registered beforehand.

The search key candidate information such as camera setting conditions at the time of taking of an image such as diaphragm, shutter speed, and the like is registered in the category "camera information" beforehand. For example, this is used in the case that an image taken using a particular setting condition is searched, or the like. Note that the user himself/herself can also register camera information that is not registered beforehand.

The search key candidate information not belonging to any of the above six categories is registered in the category "etc.". For example, item names such as image analysis, GPS information, and the like are registered, and these are selected, whereby the image analysis information of a particular image can be used as a search key, and the GPS information of a particular image can be used as a search key. With the imaging apparatus 100 according to the present embodiment, as described above, the user can add various keywords to an image file recorded in the recording medium 135 by taking an image.

As described above, the user plays the image according to the image data stored in the image file recorded in the recording medium 135 by taking an image, and upon performing predetermined operations for adding a keyword, the keyword can be input via the operating unit 131.

In this case, a search key candidate information list of the search key candidate information table shown in FIG. 4 is displayed, whereby a target keyword can be selected and added from the displayed candidates. Also, in the case that there is no target keyword of the search key candidate information list, for example, text data such as a word is input via an input key realized with the touch screen 8, whereby this can be added as a keyword.

As described above, it goes without saying that an arrangement may be made wherein on the personal compute, various types of metadata such as a keyword and the like is added to image data, this is taken into the imaging apparatus 100 via the input/output terminal 133 and the external interface 132, and is recorded in the recording medium 135. That is to say, image data to which metadata such as a keyword and the like were added at external equipment is taken into the imaging apparatus 100, whereby this can be used.

Also, a search key candidate can also be added to the search key candidate table of the imaging apparatus 100 via external equipment such as a personal computer to be connected via the input/output terminal 133 and the external interface 132.

It goes without saying that the search key candidate table formed at external equipment such as a personal computer or the like is taken into via the input/output terminal 133 and the external interface 132, and this is stored in predetermined memory such as the EEPROM 124 or the like, whereby this can be used.

In this case, in the event that there is no information input as a keyword in the search key candidate information table, the control unit 120 requests confirmation regarding whether or not this key word is registered additionally in the search key candidate information table.

Subsequently, in the case that additional registration has been instructed, the control unit 120 can register this keyword in the category instructed by the user via the operating unit 131 or the like, for example.

Thus, with the imaging apparatus 100 according to the present embodiment, one of the keywords added to the image files stored in the recording medium 135, and one of the search key candidate information registered in the search key candidate information table are arranged to be matched.

Selection Processing of Search Key Used for Image Search

Next, description will be made regarding processing for selecting a search key used for image search from the search key candidate information registered in the search key candidate information table shown in FIG. 4, with the imaging apparatus 100 according to the present embodiment. FIGS. 5A through 7B are diagrams for describing processing for selecting a search key used for image search from the search key candidate information registered in the search key candidate information table.

With the imaging apparatus 100, for example, a predetermined operation is performed, for example, such as a pressing operation of a menu key provided to the operating unit 131, or the like, whereby the control unit 120 forms a menu having processes that can be executed at the imaging apparatus 100 as selection items, and displays this on the display unit 106.

That is to say, the control unit 120 uses information for display stored in the ROM 122 to form image data for menu display (menu screen). Subsequently, the control unit 120 processes the formed image data for menu display via the decompression processing unit 110, display image forming unit 111, and display processing unit 105 to form an image signal for menu display, and supplies this to the display unit 106.

Thus, a menu screen with processes that are executable at the imaging apparatus 100 as selection items is displayed on the display screen 6G of the display unit 106. Note that, with regard to the image data for menu display, decompression processing does not have to be executed, and accordingly, the image data for menu display is not subjected to particular processing at the decompression processing unit 110.

With the imaging apparatus 100, as described with reference to FIG. 1, the touch screen 108 is made up of the display unit 106 and the touch panel 107, instruction input from the user is accepted via this touch screen 108.

The user performs an operation to select a menu item "image search" from the menu displayed on the display screen 6G of the display unit 106 as to the imaging apparatus 100. Specifically, the user brings the finger or the like in contact as to a position on the operating surface of the touch panel 107 corresponding to the display position of the menu item "image search".

Thus, the coordinate data indicating the contact position of the user on the operating surface is supplied to the control unit 120 from the touch panel 107. The control unit 120 determines which item has been selected by the user based on this coordinate data, and the display information displayed on the position on the display screen corresponding to the position on the operating surface indicated with this coordinate data.

In this case, the control unit 120 recognizes that the menu item "image search" is displayed on the position of the display screen 6G corresponding to the position on the operating surface brought into contact by the user. Accordingly, the control unit 120 can determine that the menu item "image search" has been selected by the user.

Figure 5A:
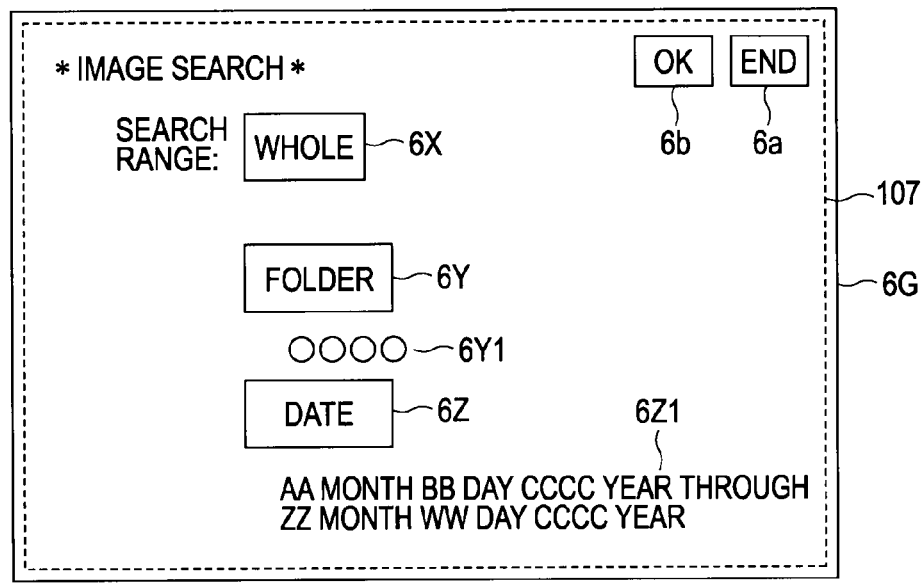
FIGS. 5A and 5B are diagrams for describing processing for selecting a search key used for image search from search key candidate information registered in the search key candidate information table.

Subsequently, the control unit 120 displays a search range setting screen shown in FIG. 5A on the display screen 6G of the display unit 106, in the same way as with the case of displaying the above menu. As shown in FIG. 5A, the search range setting screen has a title (screen title) called "* image search *", and also has a whole icon 6X, folder icon 6Y, and date icon 6Z for specifying a search range. Also, the search range setting screen has, as shown in FIG. 5A, an end icon 6a, and an OK icon 6b on the right upper edge portion.

In FIG. 5A, the whole icon 6X is for specifying all the image files recorded in the recording medium 135 as a search target. Accordingly, in the case that the whole icon 6X has been selected, the control unit 120 sets all the image files recorded in the recording medium as search targets at the time of the image search.

The folder icon 6Y is for specifying only image files stored in the image folder selected by the user of the image files recorded in the recording medium 135 as search targets. In the case that the folder icon 6Y has been selected, the control unit 120 forms a list of the image folders formed in the recording medium 135, and displays this on the display screen of the display unit 106, whereby the user can select a target image folder.

In the case that an image folder has been selected by the user, in FIG. 5A, as shown in display 6Y1, the control unit 120 displays the folder name of the selected image folder on the display screen 6G of the display unit 106.

Subsequently, the control unit 120 sets only the image files stored in the selected image folder as a search target. Note that the image folder that can be selected is not restricted to one, and rather multiple image folders can also be set as search targets.

The date icon 6Z is for specifying, of the image files recorded in the recording medium 135, only the image files wherein the appended taken year, month, and day belong to the date range specified by the user, as search targets. In the case that the date icon 6Z has been selected, the control unit 120 displays a date range setting screen on the display screen of the display unit 106, whereby the user can input a target date range.

In the case that a date range has been input, in FIG. 5A, as shown in display 6Z1, the control unit 120 displays the input date range on the display screen 6G of the display unit 106. Subsequently, the control unit 120 sets only the image files of which the taken year, month, and day belong to the input date range, as search targets.

Note that the date range may be one day such as Oct. 1, year 2008 through Oct. 1, year 2008, and input (setting) of a range, such as several days, several weeks increments, several months, or several years, may be performed.

Subsequently, with the search range setting screen shown in FIG. 5A, in the case that the end icon 6a has been selected, the control unit 120 ends the image search processing, and for example, returns to a state in which the menu screen is displayed.

Also, with the search range setting screen shown in FIG. 5A, in the case that the OK icon 6b has been selected, the control unit 120 executes the image search with the selected range. In this case, the control unit 120 forms, as shown in FIG. 5B, a search key selection screen (1) having a category list display 611, and displays this on the display screen 6G of the display unit 106.

Note that, in the case that the OK icon 6b has been selected in spite of no search range being selected, the control unit 120 sends a warning sound, or displays a warning message, thereby prompting the use to select a search range.

Figure 5B:
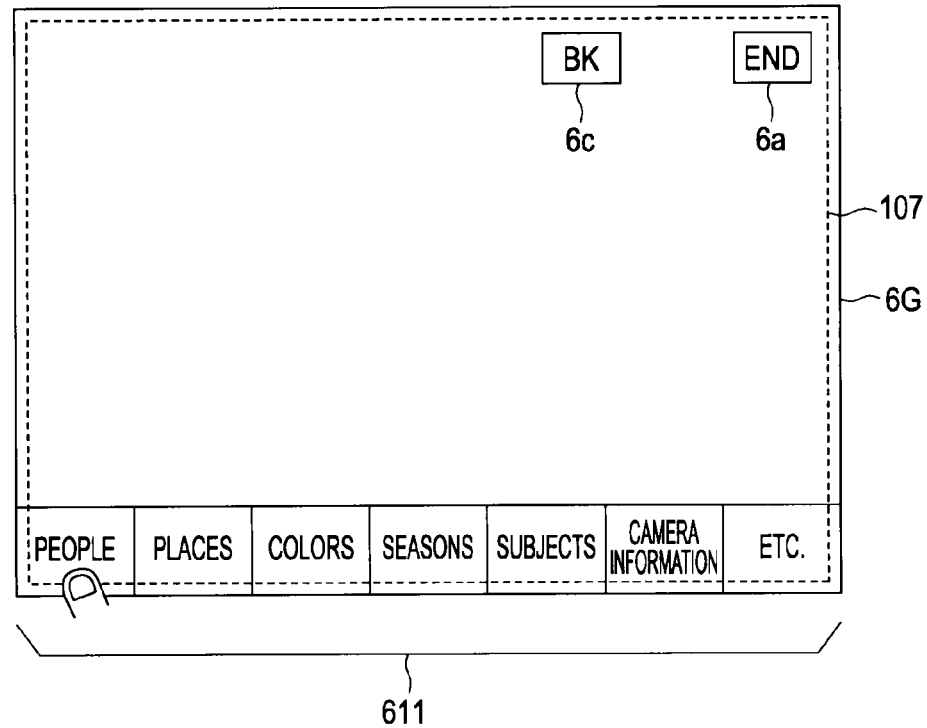

As shown in FIG. 5B, the search key selection screen (1) has an end icon 6a and an BK icon 6c, and also category list display 611 the lower edge portion of the display screen 6G.

The category list display 611 is formed based on the category information of the search key candidate table described with reference to FIG. 4, and as shown in FIG. 5B, has seven categories of people, places, colors, seasons, subjects, camera information, etc.

The user selects a category name to which the search key candidate information to be used as a search key is assumed to belong, from the displayed category list display 611. Specifically, the user selects a category name by bringing the finger or the like into contact with the position on the operating surface of the touch panel 107 corresponding to the display position of the target category name.

The control unit 120 recognizes what kind of instruction input has been performed by the user, based on the coordinate data from the touch panel 107, and display information displayed on the position on the display screen 6G corresponding to the position on the operating surface of the touch panel 107 indicated with this coordinate data.

Now, as shown in FIG. 5B, let us say that the finger or the like is brought into contact with the position on the operating surface of the touch panel 107 corresponding to the display position of the category "people" by the user. In this case, the control unit 120 determines that the category "people" has been selected, and forms a search key selection screen (2) having a list display (search key candidate display) 621 of the search key candidate information belonging to the category "people", and displays this on the display screen 6G of the display unit 106.

Note that, in FIG. 5B, in the case that the end icon 6a has been selected, the control unit 120 ends the image search processing, and for example, returns to a state in which the menu screen is displayed. Also, in FIG. 5B, in the case that the BK icon 6c has been selected, the control unit 120 returns to the search range setting screen described with reference to FIG. 5A, whereby setting of a search range can be performed again.

Figure 6A:
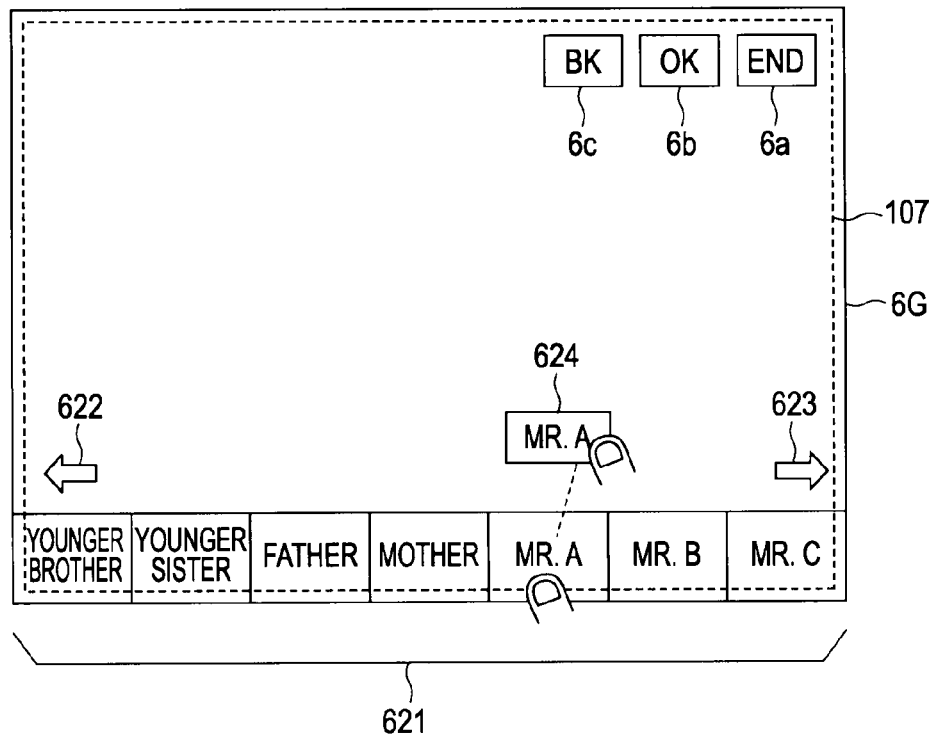
FIGS. 6A and 6B are diagrams for describing processing for selecting a search key used for image search from search key candidate information registered in the search key candidate information table.

As shown in FIG. 6A, the search key selection screen (2) has an end icon 6a, an OK icon 6b, and a BK icon 6c, and also has search key candidate display 621 on the lower edge portion of the display screen 6G.

The search key candidate display 621 is a list of search key candidate information belonging to the category "people" selected at the search key selection screen (1) of the previous stage. Also, as shown in FIG. 6A, in the case of the search key selection screen (2), a left arrow icon 622 and a right arrow icon 623 for scrolling the search key candidate display are provided.

In this case, upon a tapping operation being performed as to the left arrow icon 622, the control unit 120 scrolls the search key candidate display 621 from the right side to the left side for one search key candidate worth. A tapping operation is repeated as to the left arrow icon 622, whereby the search key candidate display 621 can be scrolled from the right side to the left side for one search key candidate worth in order.

Similarly, upon a tapping operation being performed as to the right arrow icon 623, the control unit 120 scrolls the search key candidate display 621 from the left side to the right side for one search key candidate worth. A tapping operation is repeated as to the right arrow icon 623, whereby the search key candidate display 621 can be scrolled from the left side to the right side for one search key candidate worth in order.

These left arrow icon 622 and right arrow icon 623 are operated, the search key candidate display is scrolled, and in the case that target search key candidate information is displayed, an operation for selecting the search key candidate information thereof is performed.

Note that, in the case that the left and right arrow icons 622 and 623 are not used, for example, with the operating surface of the touch panel 107, a tracing operation in the left direction or a tracing operation in the right direction is performed, whereby the search key candidate display can also be scrolled.

For example, let us say that, in FIG. 6A, item "Mr. A" of the search key candidate display is search key candidate information that the user intends to set as a search key. In this case, the user brings the finger or the like into contact with the position on the operating surface of the touch panel 107 corresponding to the display position of the item "Mr. A", and performs a tracing operation (dragging operation or flicking operation).

The control unit 120 recognizes, as described above, that a tracing operation has been performed from the display position of the item "Mr. A", based on the coordinate data from the touch panel 107, and the display position on the display screen 6G of each piece of display information.

In this case, the control unit 120 recognizes that the item "Mr. A" has been selected as a search key, and displays display 624 of "Mr. A" selected as a search key outside the display of the search key candidate display 621 on the display screen 6G. Thus, the user can recognize that the item "Mr. A" has been able to be selected as a search key at the imaging apparatus 100.

Similarly, other items belonging to the category "people" can also be selected as search keys. That is to say, multiple items (search key candidate information) can also be selected as search keys within the same category.

Subsequently, after the item "Mr. A" has been selected as a search key, in the case of intending to end the image search itself, the user selects the end icon 6a. Thus, the control unit 120 ends the image search processing, and for example, returns to a state in which the menu is displayed. In this case, the selected search key is determined not to have been selected.

Also, after the item "Mr. A" has been selected as a search key, in the case of intending to perform selection of category again, the user selects the BK icon 6c. Thus, the control unit 120 allows the user to return to the search key selection screen (1) described with reference to FIG. 5B, and to perform selection of category again. In this case, the item "Mr. A" is determined not to have been selected as a search key.

Also, after the item "Mr. A" has been selected as a search key, in the case of the OK icon 6b being selected, the control unit 120 determines the item "Mr. A" selected in FIG. 6A as a search key.

Figure 6B:
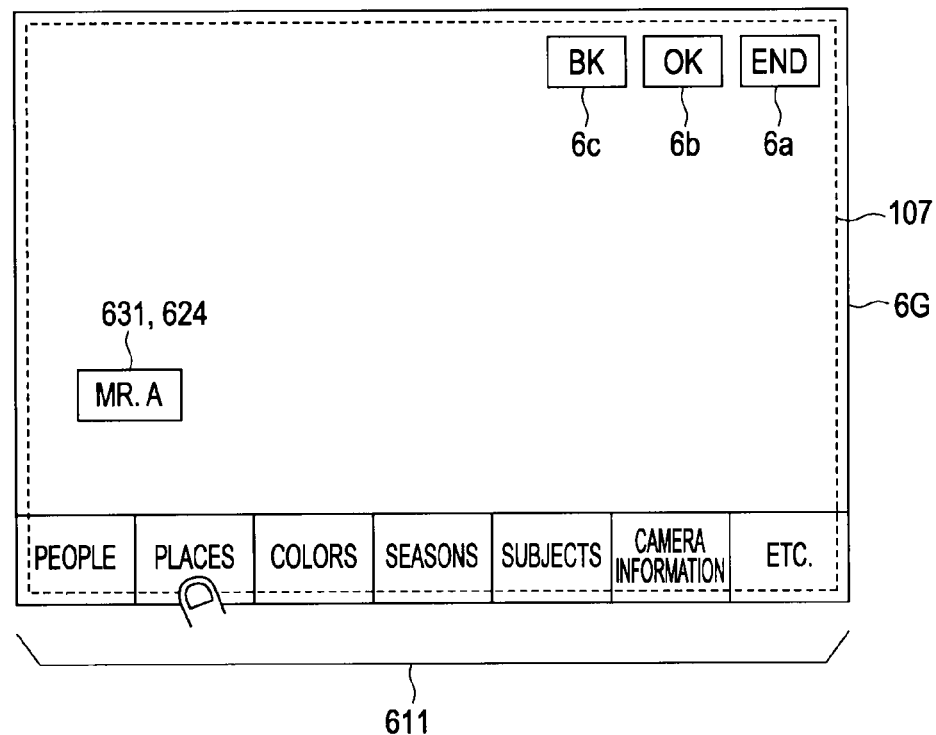

Subsequently, the control unit 120 forms, as shown in FIG. 6B, a search key selection screen (3) having the display 631 of the item "Mr. A" determined as a search key, and having the category list display 611 displayed again, and displays this on the display screen 6G of the display unit 106. Thus, a category of the search key candidate information table can be allowed to be selected newly.

In a state of FIG. 6B, in the case of intending to end the image search itself, the user selects the end icon 6a. Thus, the control unit 120 ends the image search processing, and for example, returns to a state in which the menu is displayed.

Also, in the case of intending to perform selection of a search key at the category "people" again, the user selects the BK icon 6c. Thus, the control unit 120 returns to the search key selection image (2) described with reference to FIG. 6A, and allows the user to perform selection of a search key at the category "people" again.

In this case, according to the control of the control unit 120, the already selected search key can be canceled, the already selected search key can be canceled to select a new search key, or a search key can further be selected in addition to the already selected search key.

Also, in a state of FIG. 6B, in the case that selection of a search key has been completed, and the image search has been executed using the selected search key, the user selects the OK icon 6b. Thus, the control unit 120 eliminates the category list display 611 in FIG. 6B, and allows the user to execute the image search processing.

In this case, the control unit 120 reads out image (image in a search range) data in the range set in FIG. 5A, controls the decompression processing unit 110, display image forming unit 111, and display processing unit 105 to display the thumbnail images of images within the search range on the whole screen of the display screen 6G at random. Subsequently, the control unit 120 waits for an instructing operation (contact operation) as to the selected search key display (display 631 in the case of FIG. 6B, which is an operation for instructing to start the image search.

Also, in a state of FIG. 6B, in the case of further performing selection of a search key, in the same way as with the case described with reference to FIG. 5B, the user selects a category name to which search key candidate information to be used as a search key is assumed to belong. That is to say, the user brings the finger or the like into contact with the position on the operating surface of the touch panel 107 corresponding to the display position of a target category name, thereby selecting the category name.

Now, as shown in FIG. 6B, let us say that the finger or the like is brought into contact with the position on the operating surface of the touch panel 107 corresponding to the display position of the category "places" by the user. In this case, the control unit 120 determines that the category "places" has been selected, and forms a search key selection screen (4) having a list display (search key candidate display) 641 of the search key candidate information belonging to the category "places" shown in FIG. 7A, and displays this on the display screen 6G of the display unit 106.

Figure 7A:
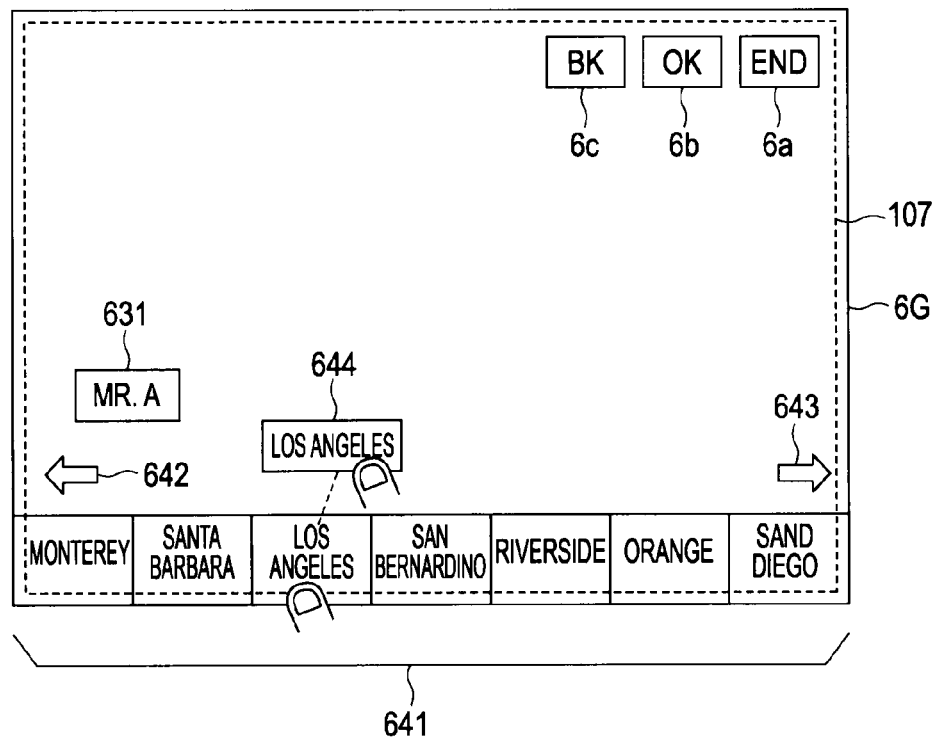
FIGS. 7A and 7B are diagrams for describing processing for selecting a search key used for image search from search key candidate information registered in the search key candidate information table.

As shown in FIG. 7A, the search key selection screen (4) has an end icon 6a, an OK icon 6b, and a BK icon 6c, and also has search key candidate display 641 on the lower edge portion of the display screen 6G.

The search key candidate display 641 is a list of search key candidate information belonging to the category "places" selected at the search key selection screen (3) of the previous stage. Also, as shown in FIG. 7A, in the case of the search key selection screen (4), a left arrow icon 642 and a right arrow icon 643 for scrolling the search key candidate display are provided.

In this case, upon a tapping operation being performed as to the left arrow icon 642, the control unit 120 scrolls the search key candidate display 641 from the right side to the left side for one search key candidate worth. A tapping operation is repeated as to the left arrow icon 642, whereby the search key candidate display 641 can be scrolled from the right side to the left side for one search key candidate worth in order.

Similarly, upon a tapping operation being performed as to the right arrow icon 643, the control unit 120 scrolls the search key candidate display 641 from the left side to the right side for one search key candidate worth. A tapping operation is repeated as to the right arrow icon 643, whereby the search key candidate display 641 can be scrolled from the left side to the right side for one search key candidate worth in order.

These left arrow icon 642 and right arrow icon 643 are operated, the search key candidate display is scrolled, and in the case that target search key candidate information is displayed, an operation for selecting the search key candidate information thereof is performed.

For example, let us say that, in FIG. 7A, item "Los Angeles" of the search key candidate display is search key candidate information that the user intends to set as a search key. In this case, the user brings the finger or the like into contact with the position on the operating surface of the touch panel 107 corresponding to the display position of the item "Los Angeles", and performs a tracing operation (dragging operation or flicking operation).

The control unit 120 recognizes that a tracing operation has been performed from the display position of the item "Los Angeles", based on the coordinate data from the touch panel 107, and the display position on the display screen 6G of each piece of display information.

In this case, the control unit 120 recognizes that the item "Los Angeles" has been selected as a search key, and displays display 644 of "Los Angeles" selected as a search key outside the display of the search key candidate display 641 on the display screen 6G. Thus, the user can recognize that the item "Los Angeles" has been able to be selected as a search key at the imaging apparatus 100.

Similarly, other items belonging to the category "places" can also be selected as search keys. That is to say, multiple items (search key candidate information) can also be selected as search keys within the same category.

Subsequently, after the item "Los Angeles" has been selected as a search key, in the case of intending to end the image search itself, the user selects the end icon 6a. Thus, the control unit 120 ends the image search processing, and for example, returns to a state in which the menu is displayed. In this case, the selected search key is determined not to have been selected.

Also, after the item "Mr. A" and the item "Los Angeles" have been selected as search keys, in the case of intending to perform selection of category again, the user selects the BK icon 6c. Thus, the control unit 120 allows the user to return to the search key selection screen (3) described with reference to FIG. 6B, and to perform selection of category again. In this case, the item "Los Angeles" is determined not to have been selected as a search key.

Also, after the item "Mr. A" and the item "Los Angeles" have been selected as search keys, in the case of the OK icon 6b being selected, the control unit 120 determines the item "Los Angeles" selected in FIG. 7A as a search key.

Figure 7B:
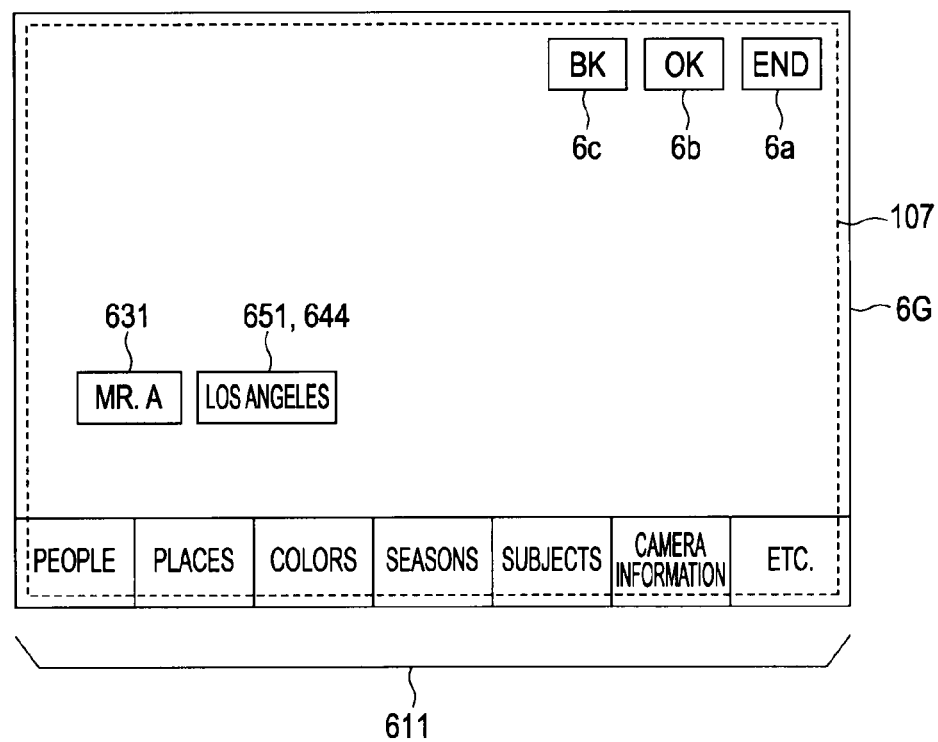

Subsequently, the control unit 120 forms, as shown in FIG. 7B, a search key selection screen (5) having the display 631 of the item "Mr. A" and the display 651 of the item "Los Angeles" determined as search keys, and having the category list display 611 displayed again, and displays this search key selection screen (5) shown in FIG. 7B on the display screen 6G of the display unit 106.

Thus, the user can be arrowed to select and determine one or more pieces of search key candidate information as search keys regarding a relevant category of the seven categories of the search key candidate information table.

Accordingly, the user can be arrowed to select a plurality of search key candidate information from the same category as search keys, or to select one or more pieces of search key candidate information from each of a plurality of categories as search keys.

Subsequently, in a state of FIG. 7B, in the case of intending to end the image search itself, the user selects the end icon 6a. Thus, the control unit 120 ends the image search processing, and for example, returns to a state in which the menu is displayed. In this case, selection of a search key is determined not to have been performed.

Also, in the case of intending to perform selection of a search key at the category "places" again, the user selects the BK icon 6c. Thus, the control unit 120 returns to the search key selection image (4) described with reference to FIG. 7A, and allows the user to perform selection of a search key at the category "places" again.

In this case, according to the control of the control unit 120, the already selected search key can be canceled, the already selected search key can be canceled to select a new search key, or a search key can further be selected in addition to the already selected search key.

Also, in a state of FIG. 7B, in the case that selection of a search key has been completed, and the image search has been executed using the selected search key, the user selects the OK icon 6b. Thus, the control unit 120 eliminates the category list display 611 in FIG. 7B, and allows the user to execute the image search processing.

In this case, the control unit 120 reads out image (image in a search range) data in the range set in FIG. 5A, controls the decompression processing unit 110, display image forming unit 111, and display processing unit 105 to display the thumbnail images of images within the search range on the whole screen of the display screen 6G at random. Subsequently, the control unit 120 waits for an instructing operation (contact operation) as to the selected search key display (display 631 and display 651 in the case of FIG. 7B), which is an operation for instructing to start the image search.

Thus, a search key is selected by the user, and the selected search key is determined at the imaging apparatus 100, thereby allowing the user to perform the image search. With the imaging apparatus 100 according to the present embodiment, as shown in FIGS. 6B and 7B, the user brings the finger or the like into contact as to the display of the search key item determined as a search key, whereby the image search is started.

Specifically, the display of the search key item is the display 631 of the item "Mr. A" or the display 651 of the item "Los Angeles", and in the case that the user brings the finger or the like into contact as to the display of the determined search key item, and the control unit 120 detects this, the control unit 120 starts the image search.

Note that the search key selection processing described with reference to FIGS. 5A through 7B is an example, and with a mode different from this, a target search key may also be selected from the search key candidate information.

Configuration for Searching Image Data Having Information Relating to Search Key As also described above, the imaging apparatus 100 according to the present embodiment searches and extracts image data having information relating to a search key, whereby the results thereof can be displayed on the display screen of the display unit 106 according to the degree of association as to the search key.

In order to realize this, the imaging apparatus 100 has a configuration for searching image data having information relating to a search key. This configuration is roughly classified into two. One is used in the case that the search key is character information, and the other is used in the case that the search key is image analysis information. Each of these will be described below.

Configuration Example of Search Key Degree-of-Association Dictionary

Description will be made regarding a configuration for searching image data having information relating to the search key, in the case that the search key is character information. In this case, the imaging apparatus 100 according to the present embodiment uses a search key degree-of-association dictionary.

FIG. 8 is a diagram for describing a configuration example of the search key degree-of-association dictionary. With regard to character information having a possibility of being used as a search key, the search key degree-of-association dictionary summarizes character information (keyword) relating to that character information according to the degree of association as to that character information.

With the example shown in FIG. 8, related keywords are registered by being classified into three stages of the degrees of association "high", "medium", and "low" as to a search key. Here, the character information (keyword) of the degree of association "high" as to a search key is character information having the same character information, character information serving as a synonym, and the same character as to this search key, and indicating approximately the same meaning and content.

Also, the character information (keyword) of the degree of association "medium" as to a search key is character information directly linking to this search key as a general image. Also, the character information (keyword) of the degree of association "low" as to a search key is character information as common imagery that rarely directly links to this search key, but can link to this search key by some keyword intervening between both.

With the example shown in FIG. 8, as for the keywords of the degree of association "high", "summer, summertime, early summer, summer vacation, . . . " and the like are registered as to the search key "summer". The keyword "summer" is a search key itself, the keyword "summertime" is a synonym of the search key "summer", the keywords "early summer, summer vacation" have the same characters as the search key "summer", and have generally the same meaning content, and accordingly, these are set to the degree of association "high".

Also, as the keywords of the degree of association "medium" as to the search key "summer", "sunflower, watermelon, fireworks show, sea, . . . " and the like are registered. The keywords "sunflower, watermelon" are seen principally in the "summer", and directly link to the search key "summer", and accordingly, are set to the degree of association "medium".

Also, the keyword "fireworks show" is principally a seasonal tradition of the "summer", due to firework shows being often held on the Fourth of July in the USA, and accordingly directly links to the search key "summer", and is set to the degree of association "medium". Also, the keyword "sea" frequently reminds people of the "summer", and accordingly, is set to the degree of association "medium".

Also, as the keywords of the degree of association "low" as to the search key "summer", "spring rains, homework, school, travel, . . . " and the like are registered. The keyword "spring rains" is a climatic state immediately before the summer, does not remind people of the search key "summer" directly, but if the "spring rains" end, "summer" will come, and accordingly, the keyword "spring rains" is set to the degree of association "low" as to the search key "summer".

Also, the keywords "homework, school, travel" can be correlated with the search key "summer" through, for example, the term "summer vacation", and accordingly, are set to the degree of association "low".

Thus, the search key degree-of-association dictionary is configured wherein related keywords are registered beforehand as to each of the terms having a possibility to be used as a search key by being classified into three stages of the degrees of association "high", "medium", and "low".

Note that character information having a possibility to be used as a search key is at least character information registered in the categories "people", "places", "colors", "seasons", and "subjects" of the search key candidate information table described with reference to FIG. 4.

Accordingly, a search key degree-of-association dictionary such as shown in FIG. 8 is formed for each piece of character information having a possibility to be used as a search key, and is stored and held in, for example, the EEPROM 124 or the like of the imaging apparatus 100.

Also, a search key degree-of-association dictionary that has been created is provided, but this is configured so as to be modified by the user for individual use.

Subsequently, in the case that the term "summer" is used as a search key in accordance with a configuration example of the search key degree-of-association dictionary shown in FIG. 8, image files (image data) having the keywords of the degrees of association "high", "medium", and "low" shown in FIG. 8 can be searched and extracted.

Subsequently, the extracted image files are classified according to the degrees of association thereof, whereby these can be handled for each of the degrees of association "high", "medium", and "low".

Example of Image Degree-of-Association Distinction Standard Based on Image Analysis Information Next, description will be made regarding a configuration for searching image data having information relating to a search key in the case that the search key is image analysis information. In this case, the imaging apparatus 100 according to the present embodiment executes the image search based on the image analysis information.

In this case, it is important to execute the image search based on which information of the image analysis information. FIG. 9 is a diagram for describing information to be able to become a search key for the image search, of the image analysis information.

As described with reference to FIG. 2, the image analysis information obtained by analyzing the image data of each image file is added to each image file as metadata. As described above and also as shown in FIG. 9, the area of a person's face within an image, the number of persons who have been taken into an image, the degree of a person's smiling face who has been taken into an image, and information indicating the features of the whole image, and so forth are included in this image analysis information.

Upon the category "etc." being selected from the category list display 611 shown in FIG. 5B and the like, each piece of information shown in FIG. 9 is displayed as information making up the image analysis information, target information is selected therefrom. Thus, the image search can be executed in accordance with the selected image analysis information.

For example, let us say that "the area of a person's face within an image" has been selected as the image analysis information, and an image to be used as a search key has been specified. In this case, the control unit 120 searches and extracts related images from the recording medium 135 based on "the area of a person's face within an image" of the image analysis information of the image specified as a search key.

Specifically, the control unit 120 searches and extracts from the recording medium 135 with an image of a first predetermined range as an image of the degree of association "high", with an image of a second predetermined range as an image of the degree of association "medium", and with an image of a third predetermined range as an image of the degree of association "low", of "the area of a person's face within an image".

In this case, the first predetermined range is a range closest to the area of a person's face within the image serving as the search key, and the second and third predetermined ranges are ranges gradually separated from the area of a person's face within the image serving as the search key.

Thus, in the case that "the area of a person's face within an image" of the image analysis information is used, images relating to the image serving as the search key can be searched and extracted, of an image to be used as the search key, with the area of a person's face within this image as a reference.

Also, let us say that "the number of persons within an image" has been selected as the image analysis information, and an image to be used as a search key has been specified. In this case, the control unit 120 searches and extracts related images from the recording medium 135 based on "the number of persons within an image" of the image analysis information of the image specified as a search key.

Specifically, the control unit 120 searches and extracts from the recording medium 135 with an image of a first predetermined range as an image of the degree of association "high", with an image of a second predetermined range as an image of the degree of association "medium", and with an image of a third predetermined range as an image of the degree of association "low", of "the number of persons within an image".

In this case, the first predetermined range is a range closest to the number of persons within the image serving as the search key, and the second and third predetermined ranges are ranges gradually separated from the number of persons within the image serving as the search key.

Thus, in the case that "the number of persons within an image" of the image analysis information is used, images relating to the image serving as the search key can be searched and extracted, of an image to be used as the search key, with the number of persons within this image as a reference.

Also, even in the case that "the degree of a person's smiling face within an image" that is the image analysis information is used, the control unit 120 can search related images from the recording medium 135 based on, of an image specified as the search key, "the degree of a person's smiling face within the image".

Also, even in the case that "the features of the whole image" that is the image analysis information is used, the control unit 120 can search related images from the recording medium 135 based on, of an image specified as the search key, "the features of the whole image".

In this case, an arrangement is made wherein similarity is obtained from the hue and complexity of an image, related images are extracted according to this similarity, and are classified into the degrees of association "high", "medium", and "low".

Thus, with the imaging apparatus 100 according to the present embodiment, the search key degree-of-association dictionary and the image analysis information are used, whereby images relating to a specified search key can be searched and extracted. Subsequently, the imaging apparatus 100 is configured so as to display searched and extracted images in accordance with the degree of association as to the search key.

Display Mode (1) of Image Search Results

Next, description will be made regarding a display mode of search results in the case that, as described above, after a search key has been selected by the user, and the image search has been executed using the selected search key thereof. Here, a case where a search key serving as character information has been selected will be described as an example.

Figure 10:
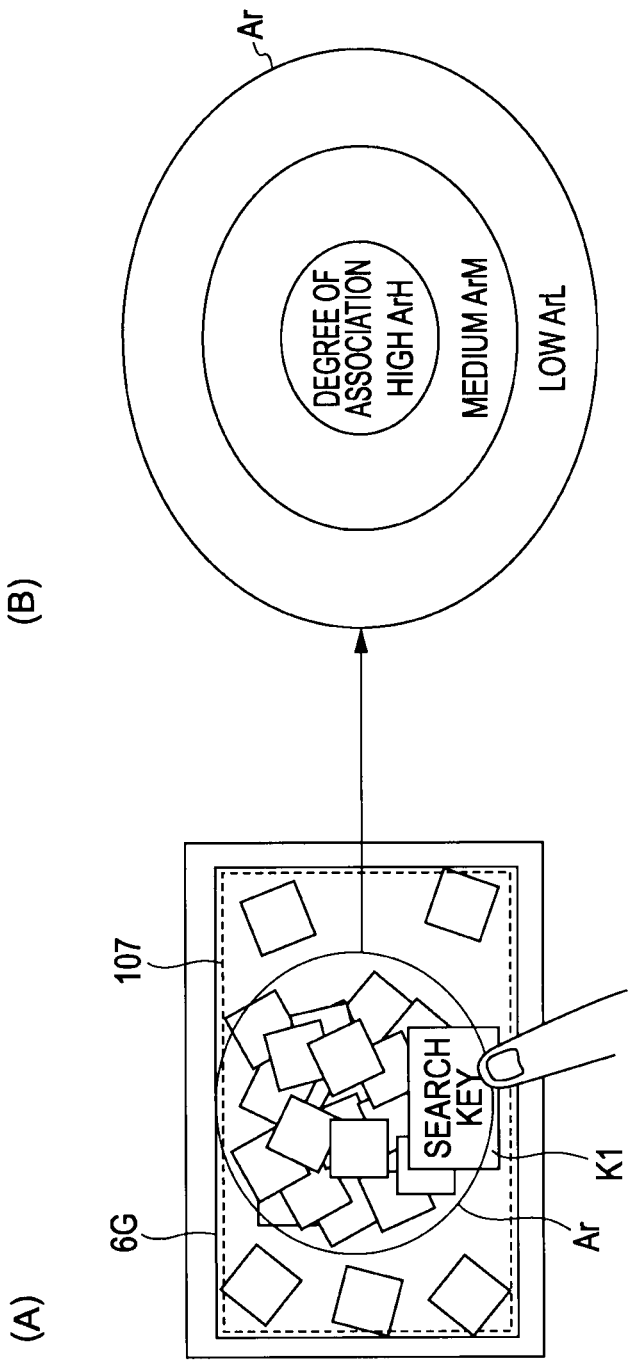
FIG. 10 is a diagram for describing a display mode (1) of search results in the case that image search is executed from a state in which one search key (character information) is selected.

FIG. 10 is a diagram for describing a display mode (1) of search results in the case that the image search is executed from a state in which a single search key (character information) is selected, as described with reference to FIGS. 5A through 6B.

In FIG. 10, (A) is a diagram illustrating the display mode of search results in the case that the image search has been executed in accordance with the selected search key, and (B) is a diagram for describing the details of a search result display region Ar in (A).

As described with reference to FIGS. 5A through 6B, upon the user setting a search range of an image, and selecting a single target search key, the control unit 120 displays images corresponding to the image data of the search range (thumbnail images) on the display screen 6G of the display unit 106 in a scattered manner. Also, the control unit 120 displays search key display (search key icon) K1 corresponding to the selected search key on the display screen 6G of the display unit 106.

Subsequently, as shown in (A) in FIG. 10, upon the user bringing the finger or the like into contact with the position on the operating surface of the touch panel 107 corresponding to the display position of the search key display K1 displayed on the display screen 6G, the coordinate data indicating the contact position thereof is supplied from the touch panel 107 to the control unit 120.

The control unit 120 manages, as described above, what kind of information has been displayed where on the display screen 6G. Subsequently, the control unit 120 can detect that the search key display K1 has been specified, based on the coordinate data indicating the specified position on the operating surface from the touch panel 107, and the display information on the display screen 6G of the display unit 106 corresponding to the specified position thereof.

The control unit 120 recognizes that specifying of the search key display is for specifying to start the image search using the search key corresponding to the search key display thereof, and executes the image search using the selected search key. In this case, the control unit 120 references the search key degree-of-association dictionary configured as described with reference to FIG. 8, and searches and extracts image files having a keyword relating to the search key.

Subsequently, the control unit 120 displays the thumbnail images corresponding to the image data of the extracted image files on the position according to the degree of association of a keyword as to the search key. In the case of this example, the control unit 120 displays the image data obtained as search results on the position corresponding to the degree of association of a keyword as to the search key within the region indicated with the search result display region Ar on the display screen 6G.

That is to say, such that the search result display region Ar alone is shown in (B) in FIG. 10, the inside of the search result display region Ar is, in the outward direction from the center thereof, made up of a display region of the degree of association "high", a display region of the degree of association "medium", and a display region of the degree of association "low".

Accordingly, in the case of this example, the control unit 120 displays the thumbnail images of image files having a keyword of which the degree of association is "high" as to the search key on an central portion ArH of the display region Ar.

Subsequently, the control unit 120 displays the thumbnail images of image files having a keyword of which the degree of association is "medium" as to the search key on a region ArM outside the display region of which the degree of association is "high", of the display region Ar.

Further, the control unit 120 displays the thumbnail images of image files having a keyword of which the degree of association is "low" as to the search key on a region ArL outside the display region ArM of which the degree of association is "medium", of the display region Ar.

Thus, the thumbnail images of the image files having a keyword of which the degree of association is "high", "medium", or "low" as to the search key can be displayed on the position corresponding to the degree of association thereof.

Note that, in the case of this example, with the image search, the control unit 120 searches and extracts, based on the search key and the search key degree-of-association dictionary, image files having a keyword relating to the search key from the image files stored in the recording medium 135.

The extracted image files are temporarily stored in, for example, the RAM 123, and the image data thereof is readout according to the degree of association thereof by the control unit 120, and is supplied to the decompression unit 110, where the image data is subjected to decompression processing, and the image data before data compression is restored.

Subsequently, the image data subjected to the decompression processing at the decompression processing unit 110 is supplied to the display image forming unit 111, where the image data is subjected to thinning processing or the like to form thumbnail data, and this is disposed on the position corresponding to the degree of association of the keyword possessed by itself as to the search key.

Thus, with the display image forming unit 111, the image data making up one screen worth of image is formed, this is converted into an image signal having a format to be supplied to the display processing unit 105, and this is supplied to the display processing unit 105.

Upon receiving supply of an image signal from the display image forming unit 111, the display processing unit 105 forms an image signal to be supplied to the display unit 106 from this, and supplies this to the display unit 106. Thus, the image having a keyword relating to the selected search key is displayed, such as shown in (A) in FIG. 10, on the position corresponding to the degree of association thereof on the display screen of the display unit 106.

Note that, as the degree of association decreases, the transparency regarding the images narrowed down is increased, or the luminosity thereof is decreased, whereby thumbnail images having a different degree of association can be displayed so as to be distinguished.

Thus, images having a keyword of which the degree of association differs as to the search key are displayed on the position corresponding to the degree of association thereof, whereby the user can confirm the results of the image search while having a consciousness of the difference thereof.

Also, instead of searching only images having a keyword matched with the search key in a traditional manner, images having a keyword relating to the search key can also be searched, and search results can be displayed while taking into consideration the difference between degrees of association. Accordingly, the image search can effectively be executed, and the results thereof can be used suitably.

Note that description has been made here assuming that with the display image forming unit 111, thumbnail data for displaying thumbnail images is formed by subjecting image data to thinning processing, or the like. However, the present invention is not restricted to this.

Load is applied to processing for forming thumbnail data from image data. Therefore, an arrangement may be made wherein, with each image file, thumbnail data is formed from the image data beforehand, and this is held at each image file.

Thus, thumbnail data is formed and added to each image file beforehand, whereby the compression processing of the image data at the decompression processing unit 110, and the forming processing of the thumbnail data at the display image forming unit 111 can be omitted.

That is to say, in the case that each image file includes thumbnail data, the image files corresponding to the search key are extracted, and thumbnail data is read out from the image files thereof to supply this to the display image forming unit 111.

Thus, with the mode shown in FIG. 10, the search results, i.e., the thumbnail images of the image files having a keyword relating to the search key can be displayed on the position corresponding to the degree of association thereof.

Details of Processing During Image Search

Figure 11:
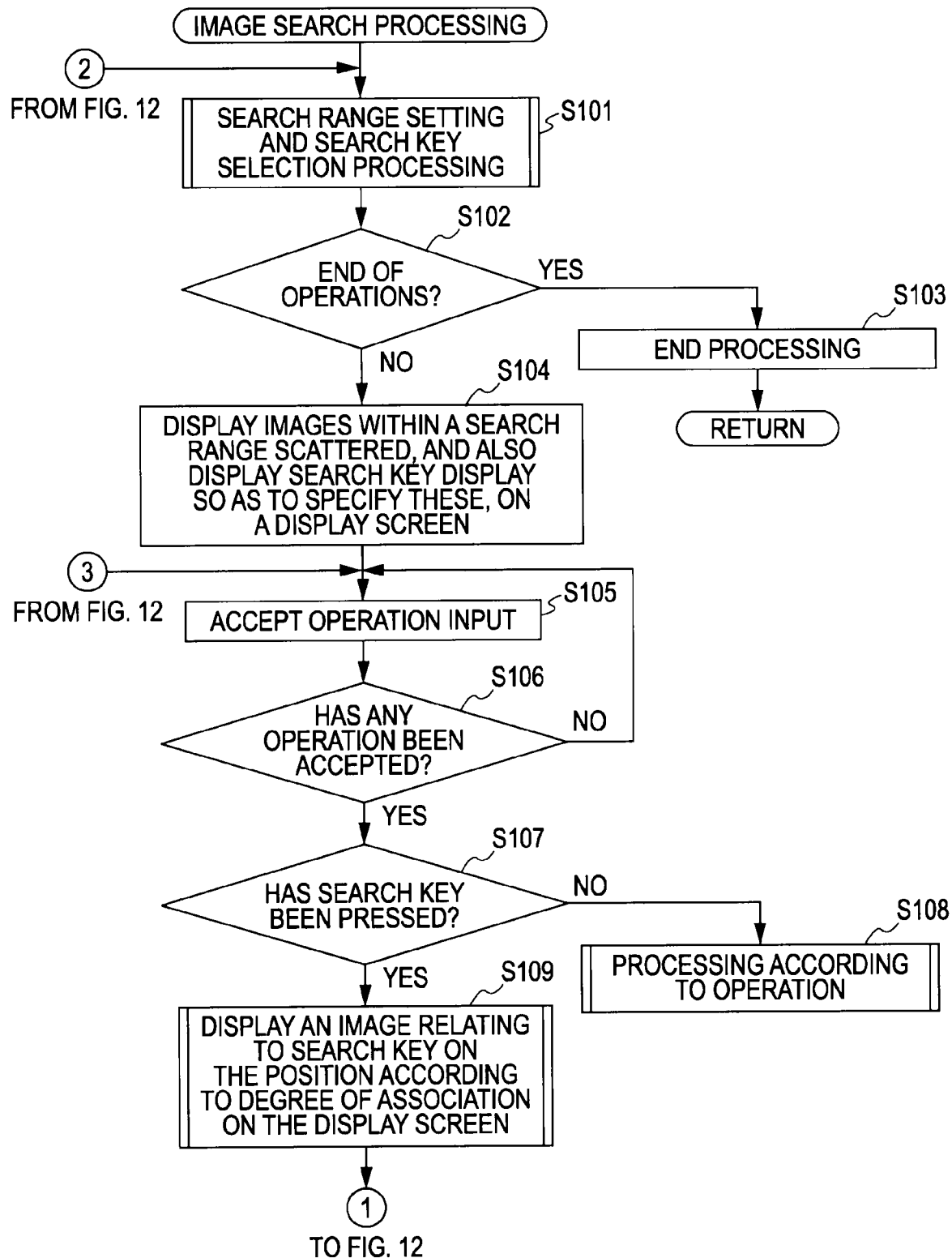
FIG. 11 is a flowchart for describing processing at the time of image search to be executed in the imaging apparatus.
Figure 12:
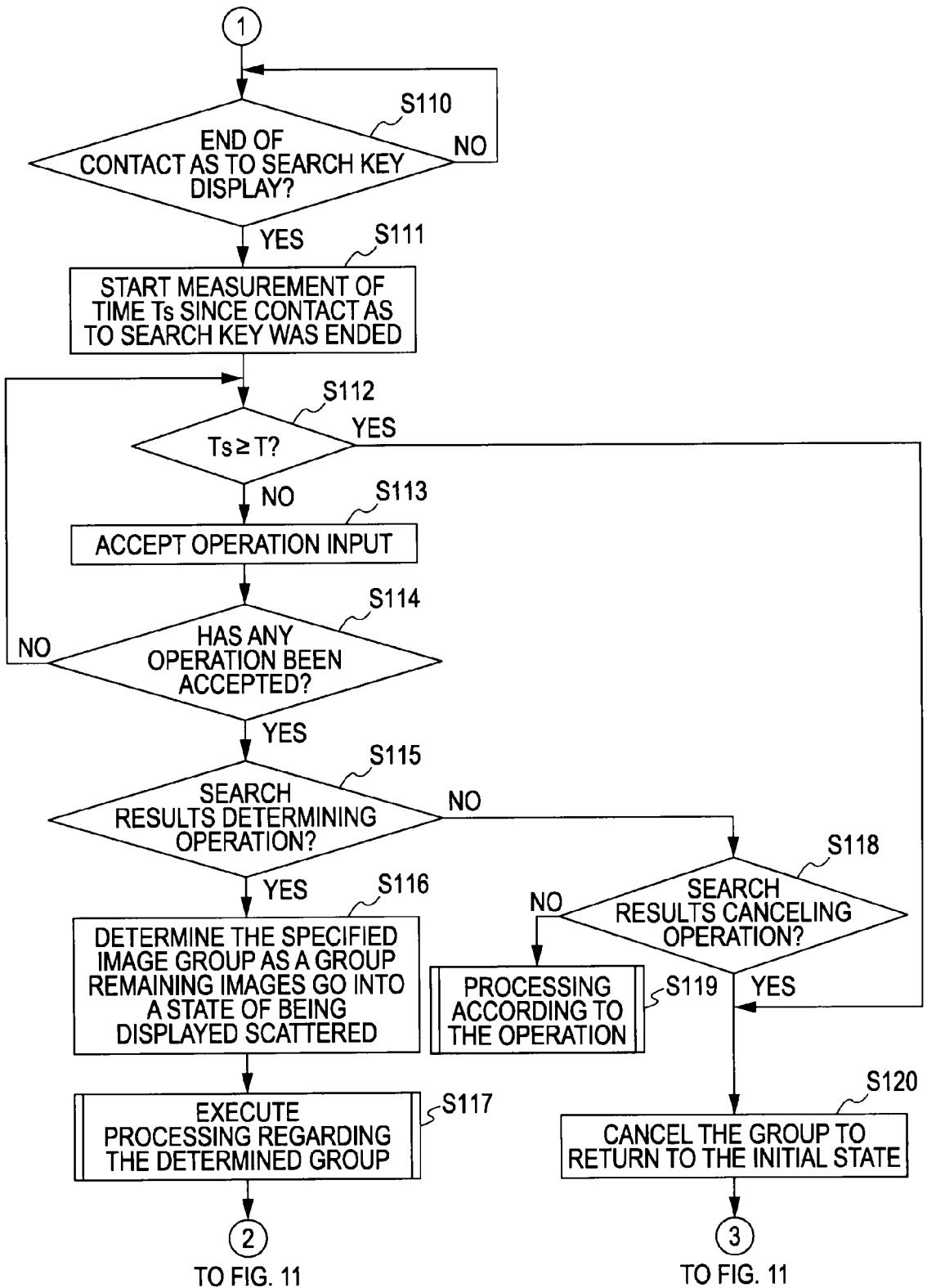
FIG. 12 is a flowchart continued from FIG. 11.

Next, description will be made regarding processing at the time of the image search to be executed at the imaging apparatus 100 according to the present embodiment. FIGS. 11 and 12 are a flowchart for describing the processing at the time of the image search to be executed at the imaging apparatus 100.

The processing of the flowchart shown in FIGS. 11 and 12 is, as described above, processing principally executed by the control unit 120 in the case that the menu item "image search" has been selected from the displayed menu.

Upon the processing shown in FIGS. 11 and 12 being executed, the control unit 120 executes, as described with reference to FIGS. 5A through 7B, setting of an image search range, and the selection processing of a search key (step S101).

Subsequently, in the processing in step S101, the control unit 120 determines whether or not an end operation has been performed (step S102). When determination is made in the determining processing in step S102 that an end operation has been performed, the control unit 120 executes processing for ending the image search processing (step S103) to end the processing shown in FIGS. 11 and 12, and for example, returns to the menu display.

Also, when determination is made in the determining processing in step S102 that an end operation has not been performed, the control unit 120 determines that selection of a search key has been performed suitably, and displays the initial screen for the image search (step S104).

Specifically, in step S104 the control unit 120 displays the thumbnail images of the image files in the search range set by the processing in step S101 on the display screen 6G in a scattered manner, and also displays the search key display corresponding to the selected search key.

Subsequently, the control unit 120 accepts operation input from the user via the touch screen 108 or the like (step S105), and determines whether or not operation input has been accepted (step S106).

When determination is made in the determining processing in step S106 that operation input from the user has not been accepted, the control unit 120 repeats the processing from step S105 to wait for operation input from the user.

When determination is made in the determining processing in step S106 that operation input from the user has been accepted, the control unit 120 determines whether or not the search key display as to the selected search key has been specified by the user (step S107).

When determination is made in the determining processing in step S107 that the search key display as to the selected search key has not been specified by the user, the control unit 120 executes the processing corresponding to the operation input accepted in step S105 (step S108).

In step S108, the control unit 120 allows the user to perform various types of processing according to the operation input of the user. For example, the user is allowed to perform change of a search key, adding processing, and so forth.

Subsequently, when determination is made in the determining processing in step S107 that the search key display has been specified by the user, the control unit 120 executes the image search using the search key corresponding to the specified search key display to display the search results (step S109).

In step S109, the control unit 120 displays, as described with reference to (A) and (B) in FIG. 10, the thumbnail images of the image files having a keyword relating to the search key on the position corresponding to the degree of association thereof on the display screen 6G, and proceeds to the processing in FIG. 12.

Subsequently, the control unit 120 determines whether or not contact of the finger or the like of the user as to the search key display has been completed (step S110). When determination is made in the determining processing in step S110 that contact has continued, the control unit 120 repeats the processing from step S110 to go into a wait state for until contact ends.

When determination is made in the determining processing in step S110 that contact of the finger or the like of the user as to the search key display has been completed, the control unit 120 uses the function of the clock circuit 140 to start measurement of time Ts since the end of contact of the user's finger as to the search key display (step S111).

Subsequently, the control unit 120 determines whether or not the time Ts of which the measurement has been started in step S111 is equal to or greater than a predetermined period of time T (step S112). When determination is made in the determining processing in step S112 that the measurement time Ts is smaller than the predetermined period of time T, the control unit 120 accepts operation input from the user (step S113).

Subsequently, the control unit 120 determines whether or not operation input from the user has been accepted (step S114). When determination is made in the determining processing in step S114 that operation input has not been accepted, the control unit 120 repeats the processing from step S112.

When determination is made in the determining processing in step S114 that operation input has been accepted, the control unit 120 determines whether or not the accepted operation input is a search results determining operation (step S115).

When determination is made in the determining processing in step S115 that the accepted operation input is a search results determining operation, the control unit 120 determines the specified image group as a group, and the other images are displayed in a scattered manner (step S116).

After the processing in step S116, the control unit 120 executes processing regarding the images of the determined group, such as storing the images of the determined group in a predetermined image folder, setting the images of the determined group to playback targets, or the like (step S117). Subsequently, the control unit 120 repeats the processing from step S101 in FIG. 11, for example.

Also, when determination is made in the determining processing in step S115 that the accepted operation input is not a search results determining operation, the control unit 120 determines whether or not the accepted operation input is a search results canceling operation (step S118).

When determination is made in the determining processing in step S118 that the accepted operation input is not a search results canceling operation, the control unit 120 executes the processing corresponding to the accepted operation input (step S119).

Also, when determination is made in the determining processing in step S118 that the accepted operation input is a search results canceling operation, for example, the control unit 120 cancels display of the image search results, and returns to the initial state of the image search (step S120).

The initial state of the image search is, as described above, a state in which the thumbnail images of the image files in the search range are displayed on the display screen 6G in a scattered manner, and also the search key display corresponding to the selected search key is displayed, and the user is arrowed to perform the image search.

After the processing in step S120, the control unit 120 repeats the processing from step S105 in FIG. 11, whereby the user is allowed to perform the image search corresponding to the displayed search key display, or to perform the image search by adding a new search key.

Also, when determination is made in the determining processing in step S112 that the measurement time Ts is equal to or greater than the predetermined period of time T, the control unit 120 cancels display of the image search results, and returns to the initial state of the image search (step S120). Subsequently, as described above, the control unit 120 repeats the processing from step S105 in FIG. 11.

Thus, with the imaging apparatus 100 according to the present embodiment, simply the user selects a search key from available search key candidate information to specify the search key thereof, whereby the user can search images having a keyword relating to the search key.

Subsequently, the results of the image search can be displayed, as described with reference to FIG. 10, according to the degree of association of a keyword as to the search key, whereby the user can recognize which image has a high degree of association as to the search key, in a sure manner.

Display Mode (2) of Image Search Results

Next, description will be made regarding another display mode of search results in the case that, as described above, after a search key has been selected by the user, and the image search has been executed using the selected search key thereof. Here, a case where a search key serving as character information has been selected will be described as an example, in the same way as with the case described with reference to FIG. 10.

Figure 13:
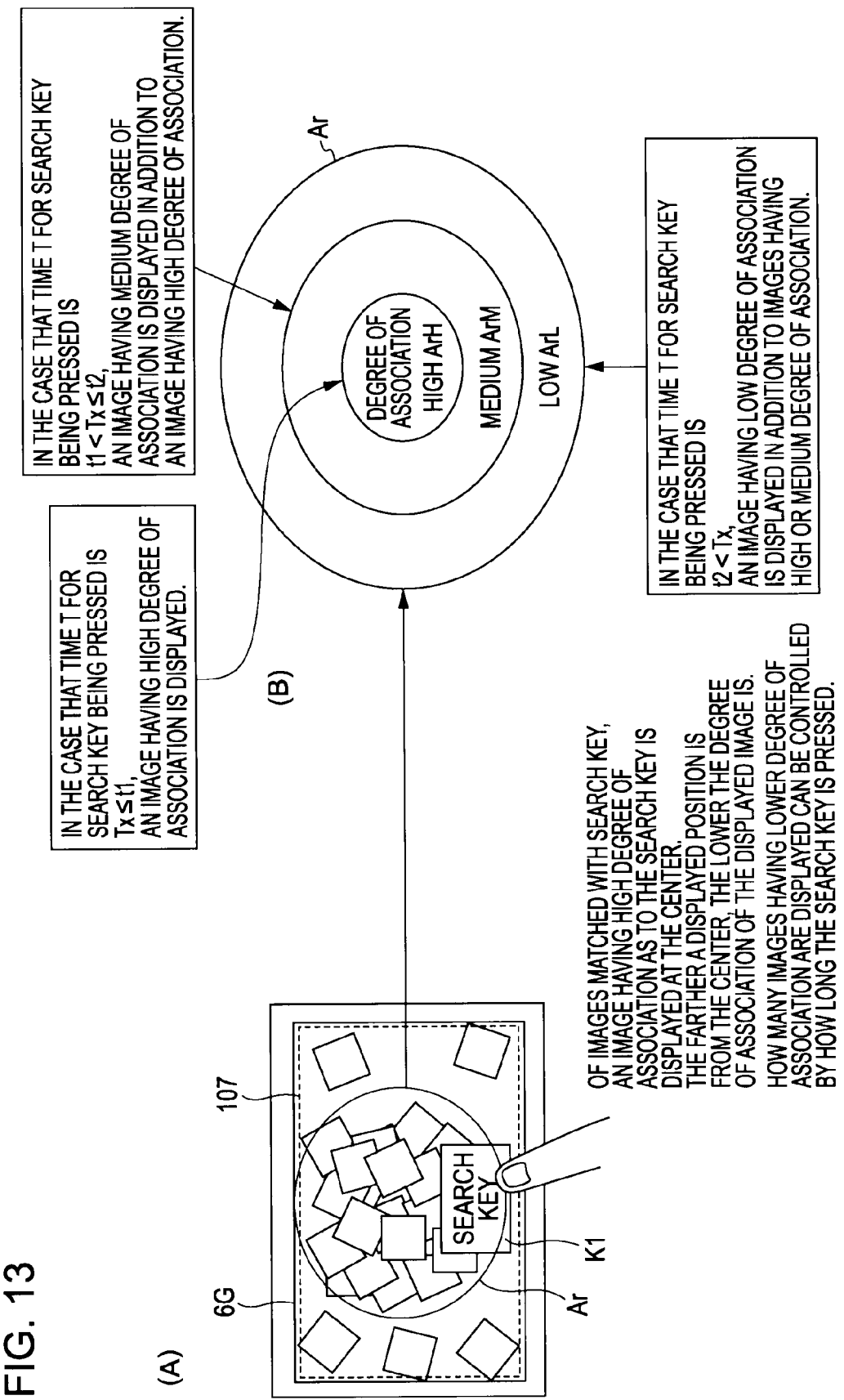
FIG. 13 is a diagram for describing a display mode (2) of search results in the case that image search is executed from a state in which one search key (character information) is selected.

FIG. 13 is a diagram for describing a display mode (2) of search results in the case that the image search is executed from a state in which a single search key (character information) is selected, as described with reference to FIGS. 5A through 6B.

In FIG. 13, (A) is a diagram illustrating the display mode of search results in the case that the image search has been executed in accordance with the selected search key, and (B) is a diagram for describing the details of a search result display region Ar in (A).

In the case of the display mode (1) of search results described above with reference to FIG. 10, the results of the image search have been all displayed at once. On the other hand, in the case of the display mode (2) of search results shown in FIG. 13, the display range of search results is controlled according to the contact duration time (specifying duration time) of the finger or the like as to the search key display.

Selection of a search key, and execution of the image search processing using this search key are executed in the same way as with the case described with reference to FIG. 10. Specifically, as shown in (A) in FIG. 13, in the case that the user brings the finger or the like into contact with the position on the operating surface of the touch panel 107 corresponding to the display position of the displayed search key display K1, the control unit 120 recognizes that this operation is a start instruction for the image search processing corresponding to the search key.

Subsequently, as described above, the touch panel 107 can detect the contact position consecutively at predetermined timing to output the coordinate data indicating this while the user is bringing the finger or the like into contact with the contact position.

Accordingly, in the case that the same coordinate data is supplied from the touch panel 107 at predetermined timing, the control unit 120 can detect that the finger or the like is still in contact at the same position of the operating surface of the touch panel 107.

Therefore, the control unit 120 measures the contact duration time Tx via the clock circuit 140 since the finger or the like were brought into contact with the position on the operating surface of the touch panel 107 corresponding to the display position of the search key display until this contact is released.

The control unit 120 displays only the thumbnail images of the image files having a keyword of which the degree of association is "high" as to the search key on the search result display region Ar until this contact measurement time Tx exceeds a predetermined threshold t1.

In this case, the control unit 120 displays the thumbnail images of the image files having a keyword of which the degree of association is "high" as to the search key on a central portion ArH of the search result display region Ar that is divided into three display regions such as shown in (B) in FIG. 13.

Subsequently, in the case that this contact duration time Tx exceeds the predetermined threshold t1, the control unit 120 additionally displays the thumbnail images of the images having a keyword of which the degree of association is "medium" as to the search key on the search result display region Ar.

In this case, the control unit 120 displays the thumbnail images of the image files having a keyword of which the degree of association is "medium" as to the search key on a region ArM that is a region outside the central portion ArH of the search result display region Ar that is divided into three display regions such as shown in (B) in FIG. 13.

Also, in this case, in addition to the thumbnail images of which the degrees of association are "high" already displayed on the central portion ArH, the control unit 120 displays the thumbnail images of which the degrees of association are "medium" on the region ArM in the outside thereof.

Subsequently, in the case that this contact duration time Tx exceeds a predetermined threshold t2, the control unit 120 additionally displays the thumbnail images of the images having a keyword of which the degree of association is "low" as to the search key on the search result display region Ar.

In this case, the control unit 120 displays the thumbnail images of the image files having a keyword of which the degree of association is "low" as to the search key on a region ArL that is a region outside the search result display region Ar that is divided into three display regions such as shown in (B) in FIG. 13.

That is to say, in addition to the display of the thumbnail images of which the degrees of association are "high" already displayed on the central portion ArH, and the display of the thumbnail images of which the degrees of association are "medium" already displayed on the region ArM, the control unit 120 displays the thumbnail images of which the degrees of association are "low" on the region ArL in the outside thereof.

Thus, the display range of the search results is gradually widened according to the contact duration time Tx of the user's finger or the like as to the search key display K1, whereby the results of the image search can be provided to the user in stages.

Accordingly, as compared to the case of displaying the results of the image search at once, the results of the image search can be indicated in stages in accordance with the degree of association as to the search key, whereby the user can relatively readily recognize the content of the search results.

Note that the above thresholds t1 and t2 satisfy relationship of t1<t2, and are determined such that the t1 is two seconds, and the t2 is four seconds, for example.

Also, in the case of the display mode (2) of the results of the image search described with reference to (A) and (B) in FIG. 13 as well, search results can be displayed in the mode shown in FIG. 13 according to the functions of the decompression processing unit 110, display image forming unit 111, and display processing unit 105 controlled by the control unit 120.

Note that (B) in FIG. 13 describes that in the case that the contact duration time Tx is equal to or smaller than the threshold t1, the thumbnail images of the image files of which the degrees of association as to the search key are "high" are displayed on the region ArH.

Also, (B) in FIG. 13 describes that in the case that the contact duration time Tx is greater than the threshold t1, and is also equal to or smaller than the threshold t2, the thumbnail images of the image files of which the degrees of association as to the search key are "medium" are displayed on the region ArM.

Also, (B) in FIG. 13 describes that in the case that the contact duration time Tx is greater than the threshold t2, the thumbnail images of the image files of which the degrees of association as to the search key are "low" are displayed on the region ArL.

However, the contact duration time Tx is consecutively measured, and accordingly, as described above, three cases are detected, i.e., a case where the contact duration time Tx is equal to or smaller than the threshold t1, a case where the contact duration time Tx is greater than the threshold t1, and a case where the contact duration time Tx is greater than the threshold t2.

Thus, the results of the image search can be displayed in accordance with the degree of association as to the search key under the same condition as the conditional expression shown in (B) in FIG. 13.

Details of Display Processing of Search Results

Figure 14:
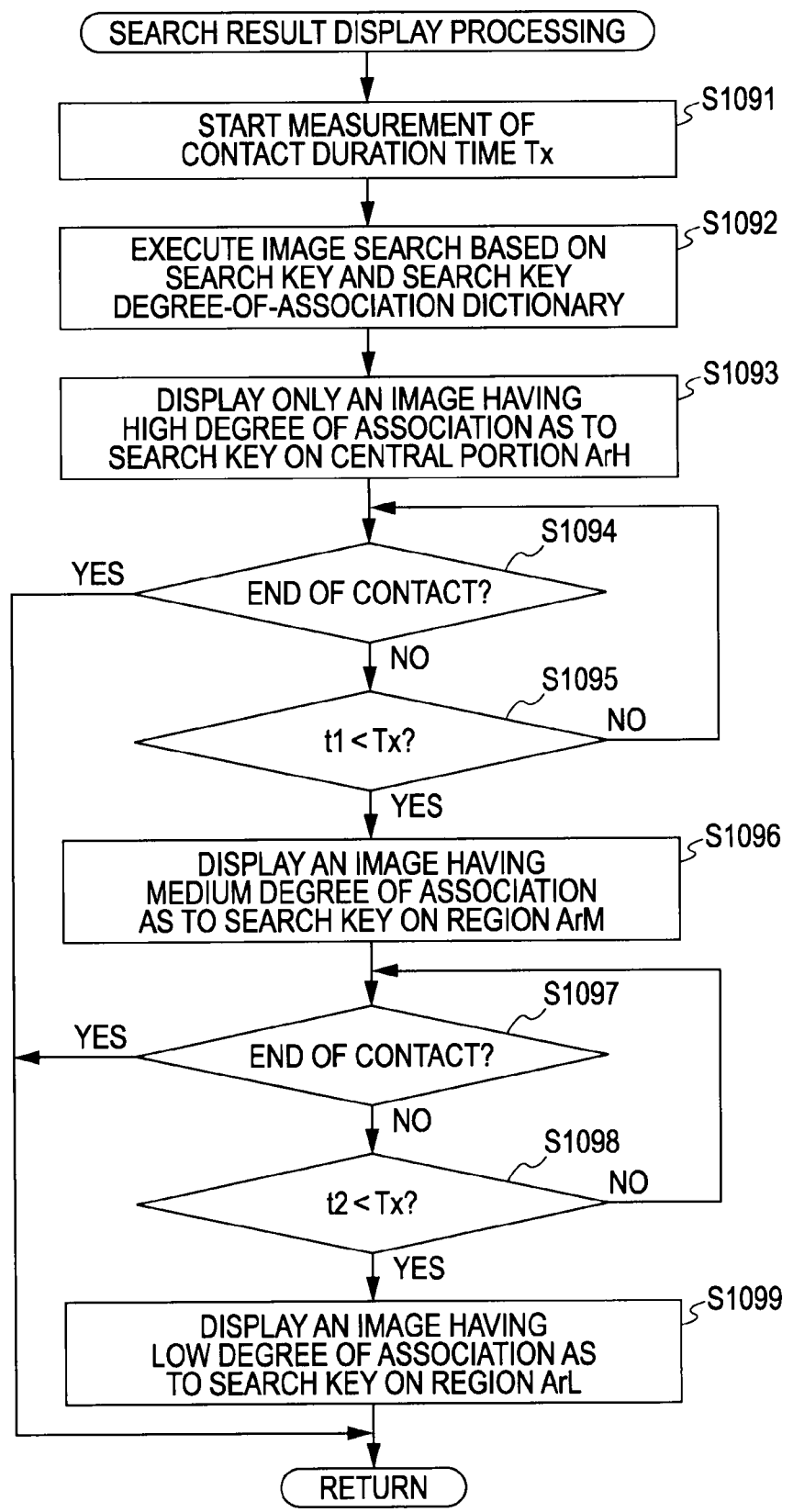
FIG. 14 is a flowchart for describing processing in the case of displaying the results of image search with the display mode (2) described using FIG. 13.

Next, description will be made regarding processing in the case that, with the display mode (2) described with reference to FIG. 13, the results of the image search are displayed. FIG. 14 is a flowchart for describing the processing in the case that, with the display mode (2) described with reference to FIG. 13, the results of the image search are displayed.

The processing shown in this FIG. 14 is executed in step S109 of the processing at the time of the image search described with reference to FIGS. 11 and 12. Specifically, upon the user bringing the finger or the like into contact to search key display, and instructing to execute the image search, the control unit 120 executes the search result display processing shown in FIG. 14 in step S109 shown in FIG. 11.

First, the control unit 120 starts measurement of the contact duration time Tx of the user's finger or the like as to the position on the operating surface of the touch panel 107 corresponding to the display position of the search key display via the clock circuit 140 of the imaging apparatus 100 (step S1091).

The control unit 120 continuously executes this measurement of the contact duration time Tx while the coordinate data indicating the position on the operating surface of the touch panel 107 corresponding to the display position of the search key display from the touch panel 107 is continuously provided.

Subsequently, based on the content of the specified search key, and the search key degree-of-association dictionary corresponding to this search key, the control unit 120 executes the image search, and extracts image files having a keyword relating to the specified search key (step S1092).

Next, the control unit 120 displays the thumbnail images corresponding to the image data of the image files having a keyword of which the degree of association is "high" as to the search key on the central portion ArH of the search result display region Ar, as shown in FIG. 13 (step S1093).

That is to say, with this processing in step S1093, of the image files searched and extracted in step S1092, only the image files having a keyword of which the degree of association is "high" as to the search key are set as processing targets.

Subsequently, in step S1093, as described above, the control unit 120 principally controls the decompression processing unit 110, display image forming unit 111, and display processing unit 105 to execute a series of display processing of the thumbnail images as to the region ArH.

Specifically, in step S1093, decompression processing of image data to be displayed is executed by the decompression processing unit 110. Also, processing for forming thumbnail data from decompressed image data, and processing for forming an image signal where thumbnail images according to thumbnail data are disposed on the central portion ArH are executed by the display image forming processing unit 111. Processing for displaying the image according to this image signal on the display screen of the display unit 106 is executed by the display processing unit 105.

After the processing in step S1093, the control unit 120 determines, based on the coordinate data supplied from the touch panel 107, whether or not contact onto the position on the operating surface of the touch panel 107 corresponding to the display position of the search key display has ended (step S1094).

When determination is made in the determining processing in step S1094 that contact has ended, the control unit 120 leaves the processing shown in FIG. 14 so as not to execute the following display processing (the display processing of the search results of the degree of association "medium" and degree of association "low").

Also, when determination is made in the determining processing in step S1094 that contact has not ended, the control unit 120 determines whether or not the contact duration time Tx exceeds a predetermined first threshold t1 (step S1095).

When determination is made in the determining processing in step S1095 that the contact duration time Tx does not exceed the threshold t1, the control unit 120 repeats the processing from step S1094.

When determination is made in the determining processing in step S1095 that the contact duration time Tx exceeds the threshold t1, the control unit 120 displays the thumbnail images corresponding to the image data of the image files having a keyword of which the degree of association is "medium" as to the search key (step S1096).

This processing in step S1096 is processing for displaying the thumbnail images corresponding to the image data of the image files having a keyword of which the degree of association is "medium" as to the search key on the region ArM of the search result display region Ar based on the results of the image search, as shown in FIG. 13.

That is to say, with this processing in step S1096, of the image files searched and extracted in step S1092, only the image files having a keyword of which the degree of association is "medium" as to the search key are set as processing targets.

Subsequently, in step S1096, in the same way as with the processing in step S1093 described above, the control unit 120 principally controls the decompression processing unit 110, display image forming unit 111, and display processing unit 105 to execute a series of display processing of the thumbnail images as to the region ArM.

Specifically, in step S1096, decompression processing of image data to be displayed is executed by the decompression processing unit 110. Also, processing for forming thumbnail data from decompressed image data, and processing for forming an image signal where thumbnail images according to thumbnail data are disposed on the central portion ArM are executed by the display image forming processing unit 111. Processing for displaying the image according to this image signal on the display screen of the display unit 106 is executed by the display processing unit 105.

After the processing in step S1096, the control unit 120 determines, based on the coordinate data supplied from the touch panel 107, whether or not contact onto the position on the operating surface of the touch panel 107 corresponding to the display position of the search key display has ended (step S1097).

When determination is made in the determining processing in step S1097 that contact has ended, the control unit 120 leaves the processing shown in FIG. 14 so as not to execute the following display processing (the display processing of the search results of the degree of association "low").

Also, when determination is made in the determining processing in step S1097 that contact has not ended, the control unit 120 determines whether or not the contact duration time Tx exceeds a predetermined second threshold t2 (step S1098).

When determination is made in the determining processing in step S1098 that the contact duration time Tx does not exceed the threshold t2, the control unit 120 repeats the processing from step S1097.

When determination is made in the determining processing in step S1098 that the contact duration time Tx exceeds the threshold t2, the control unit 120 displays the thumbnail images corresponding to the image data of the image files having a keyword of which the degree of association is "low" as to the search key (step S1099).

This processing in step S1099 is processing for displaying the thumbnail images corresponding to the image data of the image files having a keyword of which the degree of association is "low" as to the search key on the region ArL of the search result display region Ar based on the results of the image search, as shown in FIG. 13.

That is to say, with this processing in step S1099, of the image files searched and extracted in step S1092, only the image files having a keyword of which the degree of association is "low" as to the search key are set as processing targets.

Subsequently, in step S1099, as described above, the control unit 120 principally controls the decompression processing unit 110, display image forming unit 111, and display processing unit 105 to execute a series of display processing of the thumbnail images as to the region ArL.

Specifically, in step S1099, decompression processing of image data to be displayed is executed by the decompression processing unit 110. Also, processing for forming thumbnail data from decompressed image data, and processing for forming an image signal where thumbnail images according to thumbnail data are disposed on the central portion ArL are executed by the display image forming processing unit 111. Processing for displaying the image according to this image signal on the display screen of the display unit 106 is executed by the display processing unit 105.

After this processing in step S1099, the control unit 120 ends the processing shown in FIG. 14, returns to the processing in step S109 shown in FIG. 11, and executes the processing from step S110 in FIG. 12.

Thus, in the case of the display mode (2) of the search results described with reference to FIGS. 13 and 14, the display range of the search results is gradually widened according to the contact duration time Tx of the user's finger or the like as to the search key display K1, whereby the results of the image search can be provided to the user in stages.

That is to say, in the case that the contact duration time as to the search key display is short, only images of which the degrees of association are high as to the search key are displayed, and images of which the degrees of association lower as to the search key can be displayed in stages each time the contact duration time exceeds the threshold.

Display Mode (3) of Image Search Results

Next, description will be made regarding another display mode of search results in the case that, as described above, after a search key has been selected by the user, and the image search has been executed using the selected search key thereof. Here, a case where two search keys serving as character information have been selected will be described as an example, as described with reference to FIGS. 5A through 7B.

Figure 15:
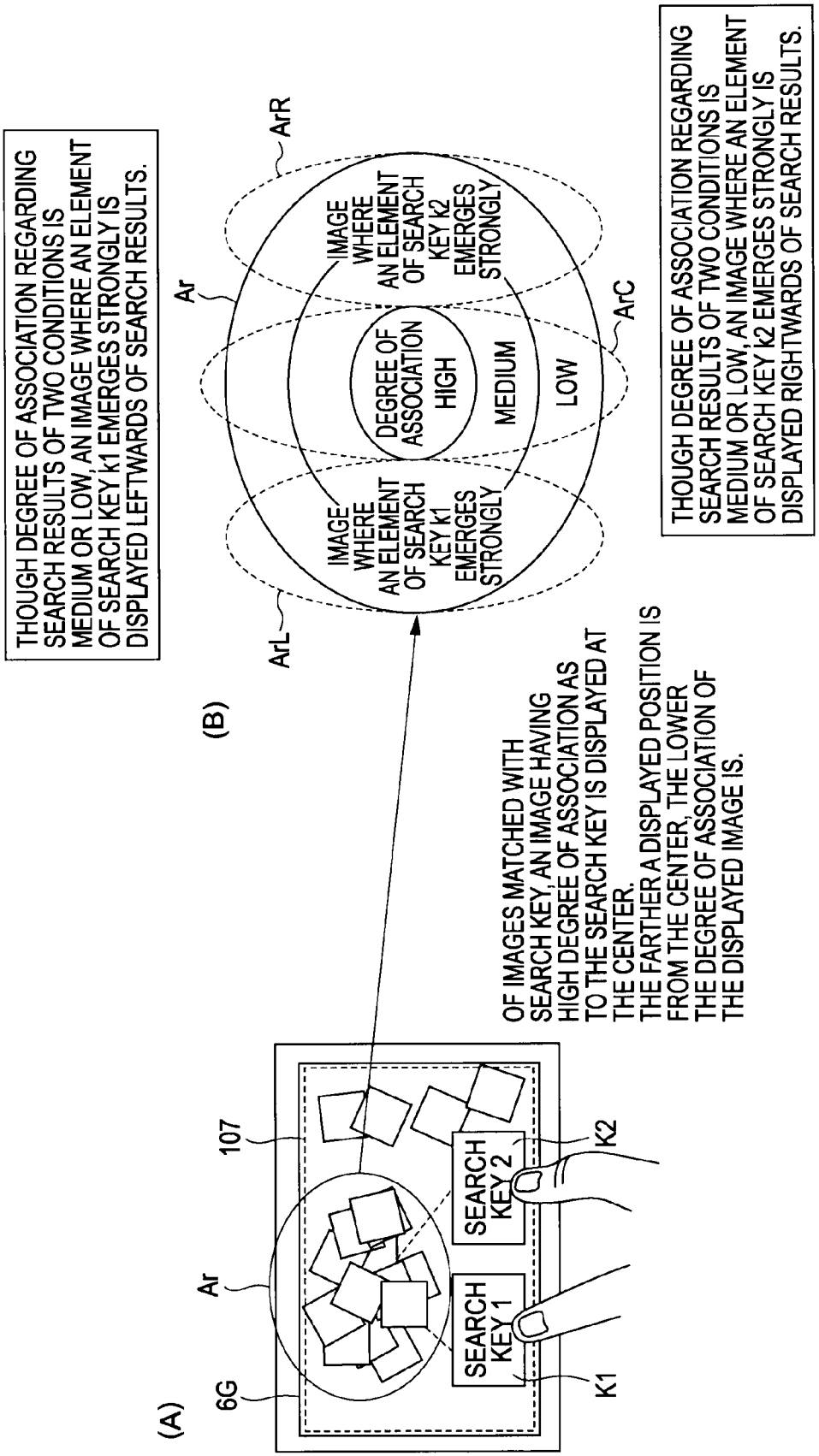
FIG. 15 is a diagram for describing a display mode (3) of search results in the case that image search is executed from a state in which two search keys (character information) is selected.

FIG. 15 is a diagram for describing a display mode (3) of search results in the case that the image search is executed from a state in which two search keys (character information) are selected, as described with reference to FIGS. 5A through 7B.

In FIG. 15, (A) is a diagram illustrating the display mode of search results in the case that the image search has been executed in accordance with the selected search keys, and (B) is a diagram for describing the details of a search result display region Ar in (A).

As shown in (A) in FIG. 15, in the case of this example, two search keys have been selected, and the search key displays (search key icons) K1 and K2 corresponding to these are displayed on the display screen 6G of the display unit 106. Subsequently, as shown in (A) in FIG. 15, let us say that the user has specified each of the search key display K1 and the search key display K2.

Specifically, let us say that the user has brought the fingers or the like into contact with the positions on the operating surface of the touch panel 107 corresponding to the display position of the search key display K1 and the display position of the search key display K2, respectively.

As also described above, the touch panel 107 can detect each of operations arranged to be performed simultaneously upon multiple places on the operating surface to output the coordinate data indicating each of the contact positions thereof.

Accordingly, as shown in (A) in FIG. 15, in the case that both of the search key display K1 and the search key display K2 have been specified, the control unit 120 can detect that the two places on the operating surface have been specified based on the coordinate data from the touch panel 107.

In the case of this example as well, the control unit 120 can determine that the search key displays K1 and K2 have been selected by the user based on the coordinate data from the touch panel 107, and the display information displayed on the position on the display screen corresponding to the position on the operating surface indicated with this coordinate data.

In this case, the control unit 120 executes the image search using both of the two search keys corresponding to the specified search key displays K1 and K2. Now, let us say that the search key corresponding to the search key display K1 is a search key k1, and the search key corresponding to the search key display K2 is a search key k2.

Subsequently, the control unit 120 searches and extracts an image file having both of a keyword relating to the search key k1, and a keyword relating to the search key k2, and displays the thumbnail images corresponding to the image data of the extracted image files on the display screen 6G.

In this case, the control unit 120 displays the thumbnail images within the search result display region Ar according to the degrees of association relating to the search keys k1 and k2, as shown in (A) in FIG. 15. Basically, in the same way as with the case illustrated in FIGS. 10 and 13, the control unit 120 displays the thumbnail images so as to be headed from the central portion of the search result display region Ar to the outside in the sequence of the degree of association "high"→the degree of association "medium"→the degree of association "low".

However, in the case that there are two search keys to be used, there is an image file having a keyword of which the degree of association is high as to one of the search keys, and having a keyword of which the degree of association is low as to the other search key.

In such a case, the control unit 120 displays the thumbnail images such that the user can understand to which search key the thumbnail images have a high degree of association. For example, the control unit 120 displays the thumbnail images of the image files having a keyword of which the degree of association is "high" as to the search key k1, and a keyword of which the degree of association is "medium" or "low" as to the search key k2 on positions close to the search key display K1.

Conversely, the control unit 120 displays the thumbnail images of the image files having a keyword of which the degree of association is "high" as to the search key k2, and a keyword of which the degree of association is "medium" or "low" as to the search key k1 on positions close to the search key display K2.

Thus, an arrangement is made wherein, in the case that the image search using the two search keys has been executed, the user can be notified accurately of regarding whether or not each image of the thumbnail images that are the search results has a strong degree of association as to which search key with the display.

More specifically, in the case of this example, a display region is assigned to, such as shown in (B) in FIG. 15, the search result region Ar where the search results are displayed such as shown in (A) in FIG. 15.

Such as shown in (B) in FIG. 15, this case is similar to the case described with reference to FIGS. 10 and 13 in that, with the search result display region Ar, the central portion thereof is set to the display region of an image having a "high" degree of association, the outside thereof is set to the display region having a "medium" degree of association, and the further outside thereof is set to the display of a "low" degree of association.

Further, in the case of this example, the region ArL is provided to the search key display K1 side as the display region of an image having correlation with the search key k1. Also, the region ArR is provided to the search key display K2 side as the display region of an image having correlation with the search key k2. Further, the region ArC is provided between the region ArL and the region ArR as the display region of an image having equivalent correlation with both of the search key k1 and the search key k2.

Subsequently, in the case of having executed the image search using the two search keys k1 and k2, the control unit 120 determines the search results thereof as the display regions of the thumbnail images based on the degree of association of a keyword corresponding to the search key k1, and the degree of association of a keyword corresponding to the search key k2.

FIG. 16 is a diagram for describing a display position determining table (1) for determining the display regions of the thumbnail images according to the degrees of association as to the search key of each of keywords corresponding to the two search keys k1 and k2.

As also described above, the control unit 120 searches and extracts image files having both of a keyword relating to the search key k1, and a keyword relating to the search key k2, and displays the thumbnail images corresponding to the image data of the extracted image files on the display screen 6G.

In this case, the control unit 120 determines the display regions of the thumbnail images corresponding to the image data of the searched and extracted image files, based on the display position determining table (1) shown in FIG. 16.

Specifically, as shown in FIG. 16, the control unit 120 displays the thumbnail images of the image files having a keyword having a "high" degree of association as to the search key k1, and a keyword having a "high" degree of association as to the search key k2 on the portion that the characters "high" of the region ArC shown in (B) in FIG. 15 indicates.

Also, the control unit 120 displays the thumbnail images of the image files having a keyword having a "medium" degree of association as to the search key k1, and a keyword having a "medium" degree of association as to the search key k2 on the portion that the characters "medium" of the region ArC shown in (B) in FIG. 15 indicates.

Also, the control unit 120 displays the thumbnail images of the image files having a keyword having a "low" degree of association as to the search key k1, and a keyword having a "low" degree of association as to the search key k2 on the portion that the characters "low" of the region ArC shown in (B) in FIG. 15 indicates.

Also, the control unit 120 displays the thumbnail images of the image files having a keyword having a "high" degree of association as to the search key 1l, and a keyword having a "medium" degree of association as to the search key k2 on the portion that the characters "medium" of the region ArL shown in (B) in FIG. 15 indicates.

Also, the control unit 120 displays the thumbnail images of the image files having a keyword having a "high" degree of association as to the search key k1, and a keyword having a "low" degree of association as to the search key k2 on the portion that the characters "medium" of the region ArL shown in (B) in FIG. 15 indicates.

Also, the control unit 120 displays the thumbnail images of the image files having a keyword having a "medium" degree of association as to the search key k1, and a keyword having a "high" degree of association as to the search key k2 on the portion that the characters "medium" of the region ArR shown in (B) in FIG. 15 indicates.

Also, the control unit 120 displays the thumbnail images of the image files having a keyword having a "medium" degree of association as to the search key k1, and a keyword having a "low" degree of association as to the search key k2 on the portion that the characters "low" of the region ArL shown in (B) in FIG. 15 indicates.

Also, the control unit 120 displays the thumbnail images of the image files having a keyword having a "low" degree of association as to the search key k1, and a keyword having a "high" degree of association as to the search key k2 on the portion that the characters "medium" of the region ArR shown in (B) in FIG. 15 indicates.

Also, the control unit 120 displays the thumbnail images of the image files having a keyword having a "low" degree of association as to the search key k1, and a keyword having a "medium" degree of association as to the search key k2 on the portion that the characters "low" of the region ArR shown in (B) in FIG. 15 indicates.

Thus, as described above with reference to FIG. 15, in the case that the image search using the two search keys has been executed, the user can be notified of regarding whether or not the thumbnail images displayed on the display screen 6G have a stronger degree of association as to which search key.

Note that such display processing of the results of the image search is executed in step S109 of the processing described with reference to FIGS. 11 and 12. In the case of this example as well, the control unit 120 controls the decompression processing unit 110, display image forming unit 111, and display processing unit 105 to display the thumbnails corresponding to the image data of the image files extracted as the results of the image search according to the display mode (3) shown in FIG. 15.

Also, description has been made here regarding the case of using the two search keys, but the present invention is not restricted to this. Three or more search keys may be used. Thus, even in the case of using three or more search keys, the display region corresponding to each search key should be provided.

Subsequently, for example, as described with reference to FIG. 16, display positions (display regions) where the thumbnail images are displayed should be determined.

Also, description has been made here assuming that the image files having a keyword relating to the search key k1, and a keyword relating to the search key k2 are extracted. However, the present invention is not restricted to this.

For example, there is a case where one keyword relates to both of the search key k1 and the search key k2. Even in such a case, similar to the case of different keywords, the display positions (display regions) of the thumbnail images should be determined according to the degree of association as to the search key k1, and the degree of association as to the search key k2.

Note that the display position determining table (1) shown in FIG. 16 is an example, and accordingly, it goes without saying that the results of the image search may be displayed according to the degree of association as to a single search key in accordance with another table.

Display Mode (4) of Image Search Results

Next, description will be made regarding another display mode of search results in the case that, as described above, after a search key has been selected by the user, and the image search has been executed using the selected search key thereof. Here, a case where two search keys serving as character information have been selected will be described as an example, as described with reference to FIGS. 5A through 7B.

Figure 17:
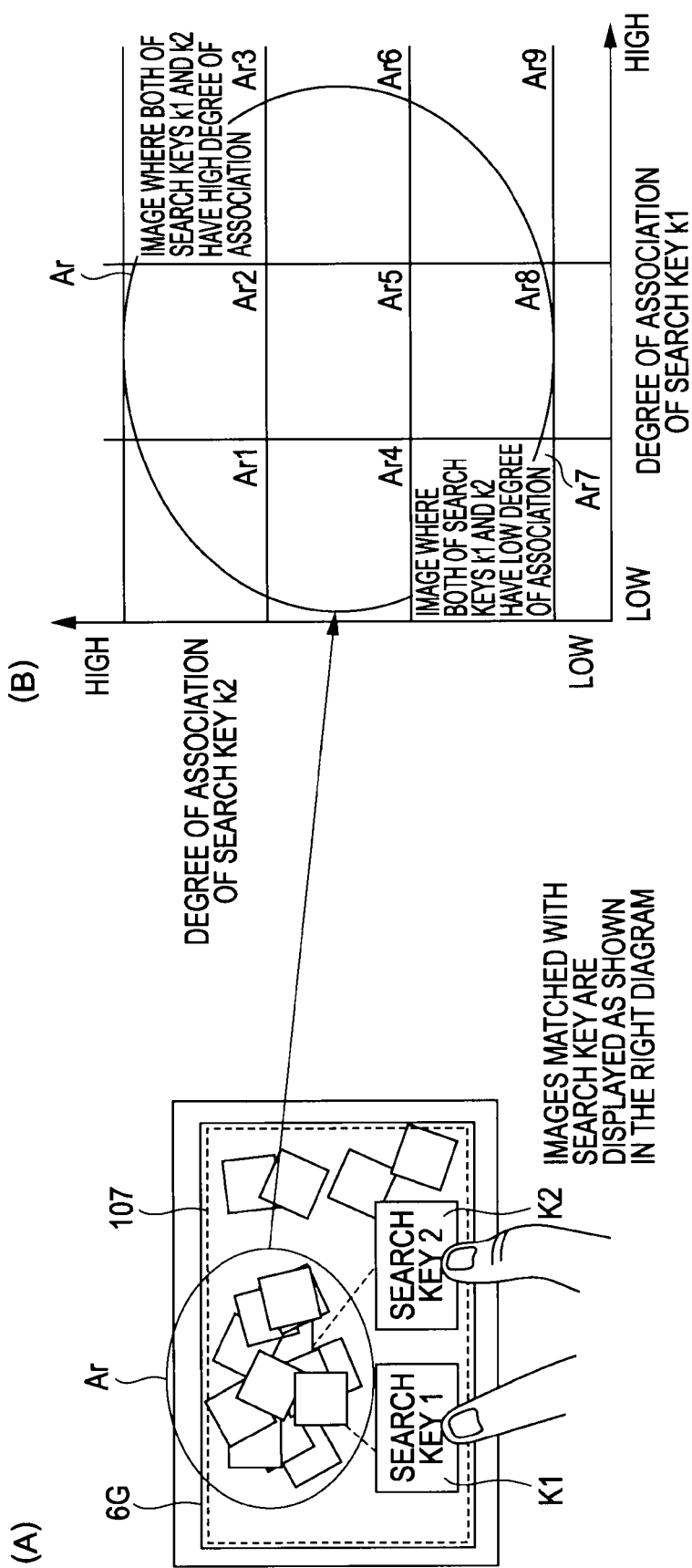
FIG. 17 is a diagram for describing a display mode (4) of search results in the case that image search is executed from a state in which two search keys (character information) is selected.

FIG. 17 is a diagram for describing a display mode (4) of search results in the case that the image search is executed from a state in which two search keys (character information) are selected, as described with reference to FIGS. 5A through 7B.

In FIG. 17, (A) is a diagram illustrating the display mode of search results in the case that the image search has been executed in accordance with the selected search keys, and (B) is a diagram for describing the details of a search result display region Ar in (A).

In the case of the display mode (4) illustrated in FIG. 17 as well, two search key displays K1 and K2 are specified simultaneously, and the image search according to these corresponding two search keys is executed in the same way as with the case described with reference to FIG. 15. In the case of this example as well, let us say that the search key corresponding to the search key display K1 is a search key k1, and the search key corresponding to the search key display K2 is a search key k2.

The control unit 120 searches and extracts image files having both of a keyword relating to the search key k1, and a keyword relating to the search key k2, and displays the thumbnail images corresponding to the image data of the extracted image files on the display screen 6G.

However, the display mode of the thumbnail images greatly differs from the display mode (3) described with reference to FIG. 15. In the case of the display mode (4) of this example, coordinate axes corresponding to the search keys k1 and k2 are provided, and the thumbnail images are displayed on the positions determined with these coordinate axes, respectively. More specifically, in the case of this example, a display region is assigned to, such as shown in (B) in FIG. 17, the search result region Ar where the search results are displayed such as shown in (A) in FIG. 17.

Such as shown in (B) in FIG. 17, let us say that the horizontal axis is a coordinate axis as to the search key k1, and the vertical axis is a coordinate axis as to the search key k2. Subsequently, let us say that the display region Ar is provided to a region surrounded with these vertical and horizontal axes.

Subsequently, let us say that an intersection between the horizontal axis and the vertical axis is a degree of association "0", and with regard to the horizontal axis, the degree of association increases as closed to the right side, and with regard to the vertical axis, the degree of association increases as closed to the upper side.

Subsequently, the search result display region Ar formed in the area surrounded with the horizontal axis and the vertical axis is divided into 9 small regions Ar1 through Ar9, as shown in (B) in FIG. 17.

Subsequently, in the case that the image search has been executed using the two search keys k1 and k2, the control unit 120 determines the search results thereof as the display regions of the thumbnail images based on the degree of association of a keyword corresponding to the search key k1, and the degree of association of a keyword corresponding to the search key k2. That is to say, the control unit 120 determines where to display, of the small regions Ar1 through Ar9.

FIG. 18 is a diagram for describing a display position determining table (2) for determining the display regions of the thumbnail images according to the degrees of association as to the search key of each of keywords corresponding to the two search keys k1 and k2.

As also described above, the control unit 120 searches and extracts image files having both of a keyword relating to the search key k1, and a keyword relating to the search key k2, and displays the thumbnail images corresponding to the image data of the extracted image files on the display screen 6G.

In this case, the control unit 120 determines the display regions of the thumbnail images corresponding to the image data of the searched and extracted image files, based on the display position determining table (2) shown in FIG. 18.

Specifically, as shown in FIG. 18, the control unit 120 displays the thumbnail images of the image files having a keyword having a "high" degree of association as to the search key k1, and a keyword having a "high" degree of association as to the search key k2 on the region Ar3 shown in (B) in FIG. 17.

Also, the control unit 120 displays the thumbnail images of the image files having a keyword having a "high" degree of association as to the search key k1, and a keyword having a "medium" degree of association as to the search key k2 on the region Ar6 shown in (B) in FIG. 17.

Also, the control unit 120 displays the thumbnail images of the image files having a keyword having a "high" degree of association as to the search key k1, and a keyword having a "low" degree of association as to the search key k2 on the region Ar9 shown in (B) in FIG. 17.

Also, the control unit 120 displays the thumbnail images of the image files having a keyword having a "medium" degree of association as to the search key k1, and a keyword having a "high" degree of association as to the search key k2 on the region Ar2 shown in (B) in FIG. 17.

Also, the control unit 120 displays the thumbnail images of the image files having a keyword having a "medium" degree of association as to the search key k1, and a keyword having a "medium" degree of association as to the search key k2 on the region Ary shown in (B) in FIG. 17.

Also, the control unit 120 displays the thumbnail images of the image files having a keyword having a "medium" degree of association as to the search key k1, and a keyword having a "low" degree of association as to the search key k2 on the region Ar8 shown in (B) in FIG. 17.

Also, the control unit 120 displays the thumbnail images of the image files having a keyword having a "low" degree of association as to the search key k1, and a keyword having a "high" degree of association as to the search key k2 on the region Ar1 shown in (B) in FIG. 17.

Also, the control unit 120 displays the thumbnail images of the image files having a keyword having a "low" degree of association as to the search key k1, and a keyword having a "medium" degree of association as to the search key k2 on the region Ar4 shown in (B) in FIG. 17.

Also, the control unit 120 displays the thumbnail images of the image files having a keyword having a "low" degree of association as to the search key k1, and a keyword having a "low" degree of association as to the search key k2 on the region Ar7 shown in (B) in FIG. 17.

Thus, as described above with reference to FIG. 17, in the case that the image search using the two search keys has been executed, the user can be notified of regarding how much the thumbnail images displayed on the display screen 6G have a degree of association as to each of the two search keys.

Note that such display processing of the results of the image search is executed in step S109 of the processing described with reference to FIGS. 11 and 12. In the case of this example as well, the control unit 120 controls the decompression processing unit 110, display image forming unit 111, and display processing unit 105 to display the thumbnails corresponding to the image data of the image files extracted as the results of the image search according to the display mode (4) shown in FIG. 17.

Also, description has been made here regarding the case of using the two search keys, but the present invention is not restricted to this. Three or more search keys may be used. Thus, even in the case of using three or more search keys, the coordinate axis corresponding to each of the search keys should be provided.

Subsequently, the display regions of the thumbnail images should be provided within space formed with these multiple coordinate axes. Subsequently, as described with reference to FIG. 18, the display positions (display regions) where the thumbnail images are displayed should be determined according to a combination of degrees of association as to each of the search keys.

Also, description has been made here assuming that the image files having a keyword relating to the search key k1, and a keyword relating to the search key k2 are extracted. However, the present invention is not restricted to this.

For example, there is a case where one keyword relates to both of the search key k1 and the search key k2. Even in such a case, similar to the case of different keywords, the display positions (display regions) of the thumbnail images should be determined according to the degree of association as to the search key k1, and the degree of association as to the search key k2.

Display Mode (5) of Image Search Results

Next, description will be made regarding another display mode of search results in the case that, as described above, after a search key has been selected by the user, and the image search has been executed using the selected search key thereof. Here, a case where two search keys serving as character information have been selected will be described as an example, as described with reference to FIGS. 5A through 7B.

In the case of this display mode (5), the display range of the search results is changed according to the distance between the search key displays corresponding to the selected two search keys respectively (distance on the display screen).

Figure 19:
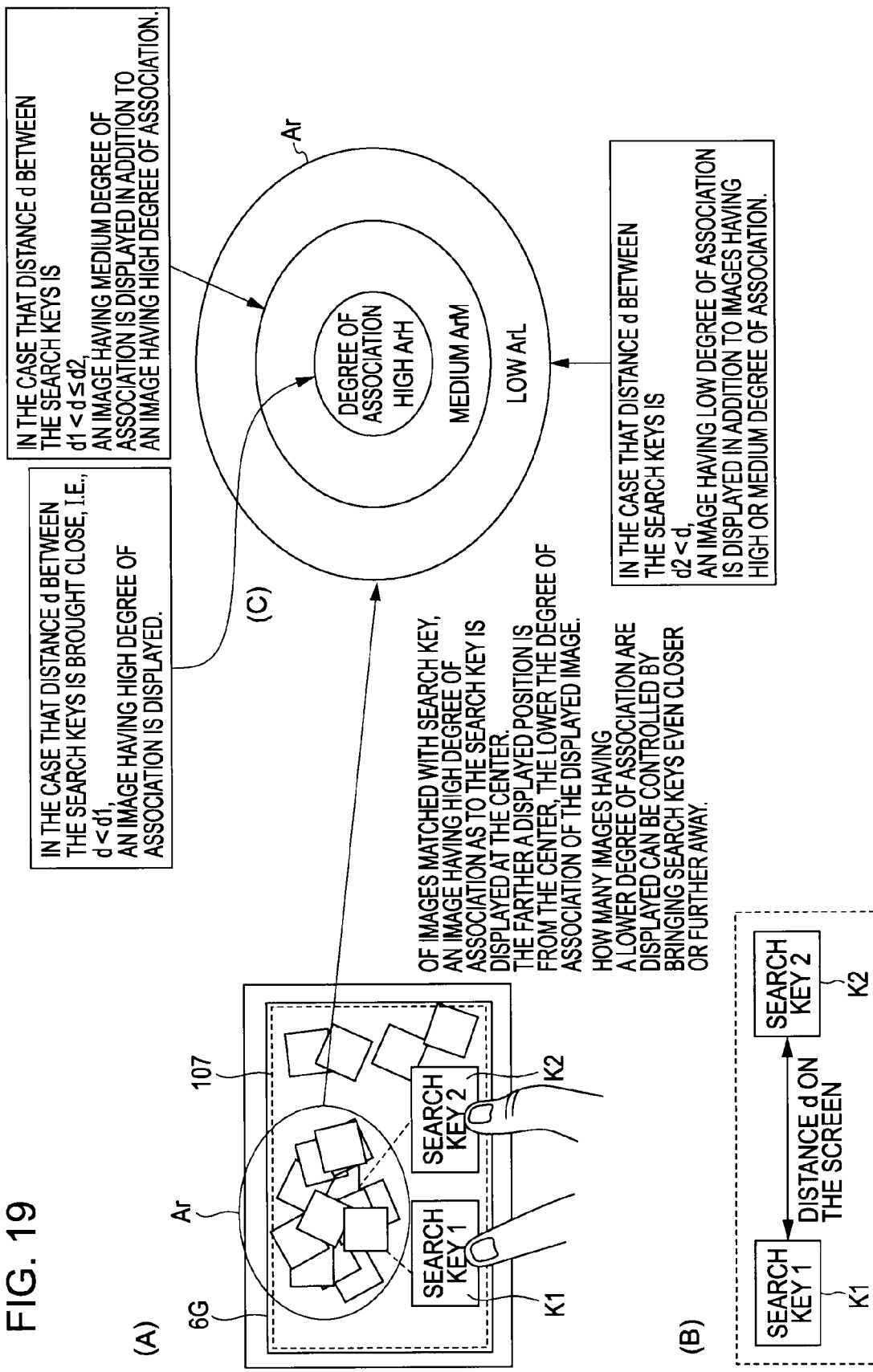
FIG. 19 is a diagram for describing a display mode (5) of search results in the case that image search is executed from a state in which two search keys (character information) is selected.

FIG. 19 is a diagram for describing the display mode (5) of search results in the case that the image search is executed from a state in which two search keys (character information) are selected, as described with reference to FIGS. 5A through 7B.

(A) in FIG. 19 illustrates the display mode of search results in the case that the image search has been executed in accordance with the selected search keys. Also, (B) in FIG. 19 is a diagram for describing the position relationship on the display screen 6G of the two search key displays displayed on the display screen 6G. Also, (C) in FIG. 19 is a diagram for describing the details of a search result display region Ar in (A) in FIG. 19.

In the case of the display mode (5) illustrated in FIG. 19 as well, two search key displays K1 and K2 are specified simultaneously, and the image search according to these corresponding two search keys is executed in the same way as with the case described with reference to FIG. 15. In the case of this example as well, let us say that the search key corresponding to the search key display K1 is a search key k1, and the search key corresponding to the search key display K2 is a search key k2.

The control unit 120 searches and extracts image files having both of a keyword relating to the search key k1, and a keyword relating to the search key k2, and displays the thumbnail images corresponding to the image data of the extracted image files on the display screen 6G.

In this case, the control unit 120 does not simply display the thumbnail images that are the search results on the display screen 6G. The control unit 120 changes the display range of the search results in accordance with the user's operation as to the operating surface of the touch panel 107.

Specifically, as shown in (A) in FIG. 19, the user performs a dragging operation for moving the fingers or the like in contact with the positions on the operating surface of the touch panel 107 corresponding to the display positions of the search key displays K1 and K2, while still in contact as to this operating surface.

In response to this dragging operation, the control unit 120 can change the display positions of the search key displays K1 and K2 by controlling the display information forming unit 111 and the display processing unit 105. Subsequently, the control unit 120 can recognize what kind of information has been displayed where on the display screen 6G.

Accordingly, the control unit 120 can constantly suitably recognize, as shown in (B) in FIG. 19, distance d between the search key display K1 and the search key display K2 of which the display positions are changed. Therefore, the control unit 120 controls the display range of the results of the image search in accordance with the search key display K1 and the search key display K2 of which the display positions can be changed according to the dragging operation of the user, and the distance d on the display screen 6G.

In the case of this example, in an initial state of the image search, the display positions on the display screen 6G of the search key display K1 and the search key display K2 are determined to be a position where the distance d therebetween is smaller than a threshold d1.

As also described above, in the case that the user brings the fingers or the like into contact with the positions on the operating surface of the touch panel 107 corresponding to the display positions of the search key display K1 and the search key display K2, the control unit 120 detects this to execute the image search using the corresponding search keys k1 and k2.

Subsequently, in the case that the distance d between the search key display K1 and the search key display K2 is smaller than the threshold d1, the control unit 120 displays only the thumbnail images corresponding to the image data of the image files having a keyword of which the degree of association is "high" as to the search keys on the region ArH.

In this case, only the thumbnail images corresponding to the image data of the image files having a keyword of which the degree of association is "high" as to the search key k1, and a keyword of which the degree of association is "high" as to the search key k2 are displayed on the central portion ArH of the search result display region Ar.

Subsequently, let us say that a dragging operation to move the fingers or the like in contact at the positions on the operating surface of the touch panel 107 corresponding to the display positions of the search key displays K1 and K2 has been performed, and the display positions of the search key displays K1 and K2 have been moved.

At this time, in the case that the distance d between the search key display K1 and the search key display K2 is greater than the threshold d1, and is also equal to or smaller than the threshold d2, the control unit 120 displays the thumbnail images corresponding to the image data of the image files having a keyword of which the degree of association "medium" as to the search keys on the region ArM.

In this case, the control unit 120 executes not only display of the thumbnail images of the degree of association "high" on the region ArH but also display of the thumbnail images of the degree of association "medium" on the region ArM.

Also, the image files of the degree of association "medium" as to the search keys are the following two combinations. One is that image files having a keyword of which the degree of association is "high" as to one of the search keys k1 and k2, and a keyword of which the degree of association is "medium" or "low" as to the other search key are determined to be the degree of association "medium". The other is that image files having a keyword of which the degree of association is "medium" as to the search key k1, and a keyword of which the degree of association is "medium" as to the search key k2 are determined to be the degree of association "medium".

Subsequently, let us say that a dragging operation to move the fingers or the like in contact at the positions on the operating surface of the touch panel 107 corresponding to the display positions of the search key displays K1 and K2 has further been performed, and the display positions of the search key displays K1 and K2 have been moved.

At this time, in the case that the distance d between the search key display K1 and the search key display K2 is greater than the threshold d2, the control unit 120 displays the thumbnail images corresponding to the image data of the image files having a keyword of which the degree of association "low" as to the search keys on the region ArL.

In this case, the control unit 120 executes not only display of the thumbnail images of the degree of association "high" on the region ArH and display of the thumbnail images of the degree of association "medium" on the region ArM but also display of the thumbnail images of the degree of association "low" on the region ArL.

Also, the image files of the degree of association "low" as to the search keys are the following two combinations. One is that image files having a keyword of which the degree of association is "medium" as to one of the search keys k1 and k2, and a keyword of which the degree of association is "low" as to the other search key are determined to be the degree of association "low". The other is that image files having a keyword of which the degree of association is "low" as to the search key k1, and a keyword of which the degree of association is "low" as to the search key k2 are determined to be the degree of association "low".

Details of Search Result Display Processing

Figure 20:
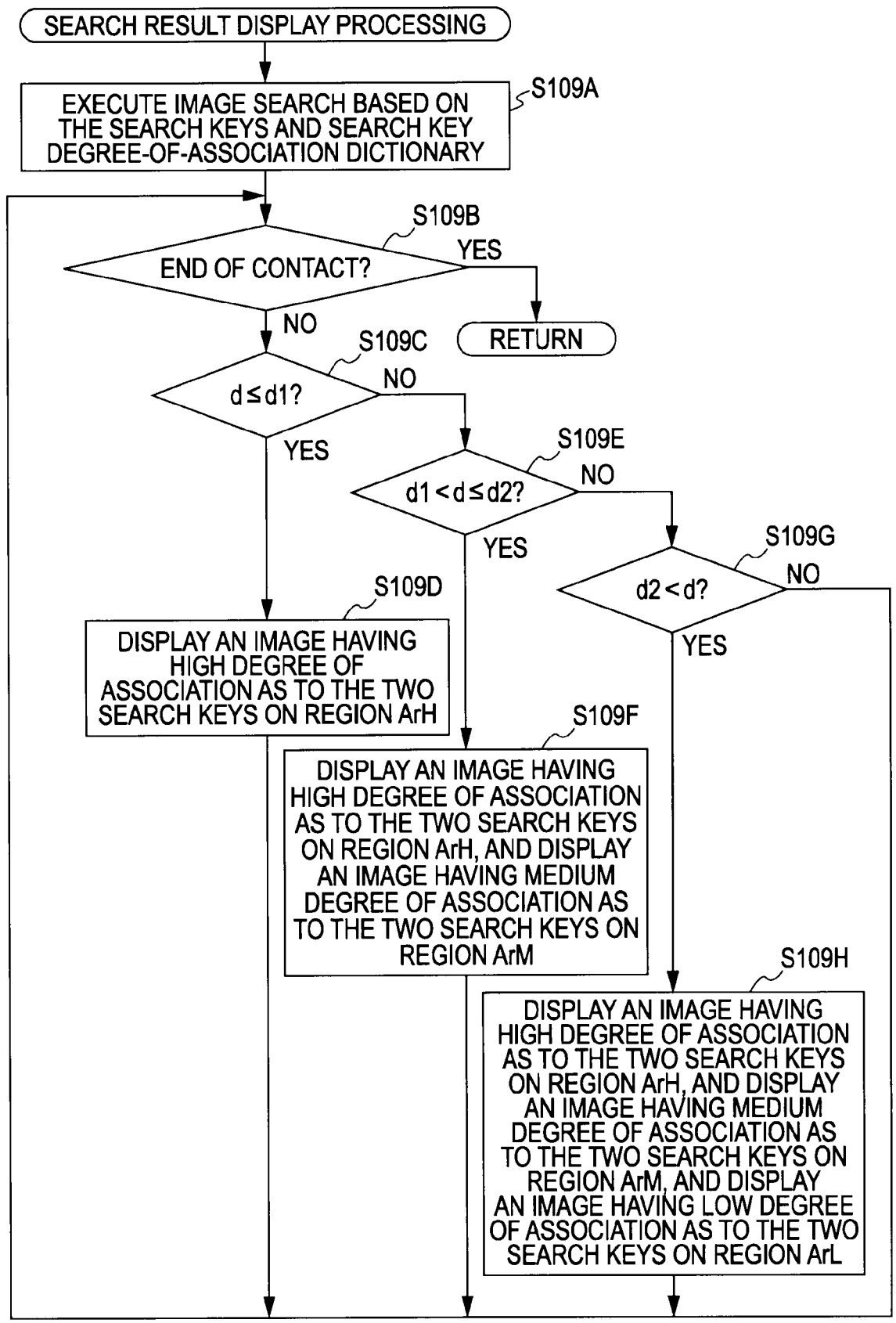
FIG. 20 is a flowchart for describing processing in the case of displaying the results of image search with the display mode (5) described using FIG. 19.

Next, description will be made regarding processing in the case that the results of the image search are displayed in the display mode (5) described with reference to FIG. 19. FIG. 20 is a flowchart for describing the processing in the case that the results of the image search are displayed in the display mode (5) described with reference to FIG. 19.

The processing shown in FIG. 20 is executed in step S109 of the processing at the time of the image search described with reference to FIGS. 11 and 12. Specifically, upon the user bringing the fingers or the like into contact as to the search key displays K1 and K2, and instructing to execute the image search, the control unit 120 executes the search result display processing shown in FIG. 20 in step S109 shown in FIG. 11.

First, the control unit 120 executes the image search based on the specified search keys k1 and k2, and the content of the search key degree-of-association dictionary corresponding to these search keys, and extracts image files having a keyword relating to the specified search keys k1 and k2 (step S109A).

Subsequently, the control unit 120 determines whether or not contact onto the positions on the operating surface of the touch panel 107 corresponding to the display positions of the search key displays K1 and K2, base on the coordinate data supplied from the touch panel 107 (step S109B).

When determination is made in the determining processing in step S109B that contact has ended, the control unit 120 ends the processing shown in FIG. 20, returns to step S109 shown in FIG. 11, and executes the processing from step S110 in FIG. 12.

When determination is made in the determining processing in step S109B that contact has not ended, the control unit 120 determines whether or not the distance d between the search key display K1 and the search key display K2 is equal to or smaller than the threshold d1 (step S109C).

When determination is made in the determining processing in step S109C that the distance d between the search key display K1 and the search key display K2 is equal to or smaller than the threshold d1, the control unit 120 executes display processing in step S109D.

Specifically, the control unit 120 displays the thumbnail images of the image data of image files having a keyword of which the degree of association is "high" as to the search keys k1 and k2 on the central portion ArH of the display region Ar (step S109D). Subsequently, the control unit 120 repeats the processing from step S109B.

When determination is made in the determining processing in step S109C that the distance d between the search key display K1 and the search key display K2 is not equal to nor smaller than the threshold d1, the control unit 120 executes determining processing in step S109E.

Specifically, the control unit 120 determines whether or not the distance d between the search key display K1 and the search key display K2 is greater than the threshold d1, and is also equal to or smaller than the threshold d2 (step S109E).

When determination is made in the determining processing in step S109E that the distance d between the search key display K1 and the search key display K2 is greater than the threshold d1, and is also equal to or smaller than the threshold d2, the control unit 120 executes display processing in step S109F.

In this case, the control unit 120 displays the thumbnail images on the central portion ArH of the search result display region Ar, and the region ArM in the outside thereof (step S109F).

Specifically, in step S109F, the control unit 120 displays the thumbnail images of the image data of image files having a keyword of which the degree of association is "high" as to the search keys k1 and k2 on the central portion ArH.

Further, in step S109F, the control unit 120 displays the thumbnail images of the image data of image files having a keyword of which the degree of association is "medium" as to the search keys k1 and k2 on the region ArM. After the processing in step S109F, the control unit 120 repeats the processing from step S109B.

Also, when determination is made in the determining processing in step S109E that the distance d between the search key display K1 and the search key display K2 is greater than the threshold d1, and is also not equal to nor smaller than the threshold d2, the control unit 120 executes determining processing in step S109G.

That is to say, the control unit 120 determines whether or not the distance d between the search key display K1 and the search key display K2 is greater than the threshold d2 (step S109G).

When determination is made in the determining processing in step S109G that the distance d between the search key display K1 and the search key display K2 is greater than the threshold d2, the control unit 120 executes display processing in step S109H.

In this case, the control unit 120 displays the thumbnail images on the central portion ArH of the search result display region Ar, the region ArM in the outside thereof, and the region ArL in the further outside thereof (step S109H).

Specifically, in step S109H the control unit 120 displays the thumbnail images of the image data of image files having a keyword of which the degree of association is "high" as to the search keys k1 and k2 on the central portion ArH. Further, in step S109H the control unit 120 displays the thumbnail images of the image data of image files having a keyword of which the degree of association is "medium" as to the search keys k1 and k2 on the region ArM. Further, in step S109H the control unit 120 displays the thumbnail images of the image data of image files having a keyword of which the degree of association is "low" as to the search keys k1 and k2 on the region ArL.

After the processing in step S109H, when determination is made in the determining processing in step S109G that the distance d between the search key display K1 and the search key display K2 is not greater than the threshold d2, the control unit 120 repeats the processing from step S109B.

Note that, in the case of this example, with the display processing in step S109D, step S109F, and step S109H, after display clear processing of the search result display region Ar is executed, display processing of the thumbnail images is executed first.

Thus, even after all the thumbnail images of the degrees of association "high", "medium", and "low" are displayed, in the case that the distance d between the search key display K1 and the search key display K2 is narrowed, only the thumbnail images having the degree of association "high" can be displayed, for example.

In the case of this example, a long-pressing operation for search key display does not have to be performed, and the results of the image search can be displayed in a range that the user intends immediately according to the intention of the user.

Display Mode (6) of Image Search Results

Next, description will be made regarding another display mode of search results in the case that, as described above, after a search key has been selected by the user, and the image search has been executed using the selected search key thereof. Here as well, in the same way as with the case of the display mode (5) described with reference to FIGS. 19 and 20, a case where two search keys serving as character information have been selected will be described as an example, as described with reference to FIGS. 5A through 7B.

In the case of this display mode (6) as well, in the same way as with the case of the above display mode (5), the display range of the search results is changed according to the distance between the search key displays corresponding to the selected two search keys respectively (distance on the display screen).

However, in the case of the display mode (6) described below, the image search results to be displayed are changed while taking into consideration not only the distance d between the search key displays but also regarding which search key display has been moved of the two search key displays.

Figure 21:
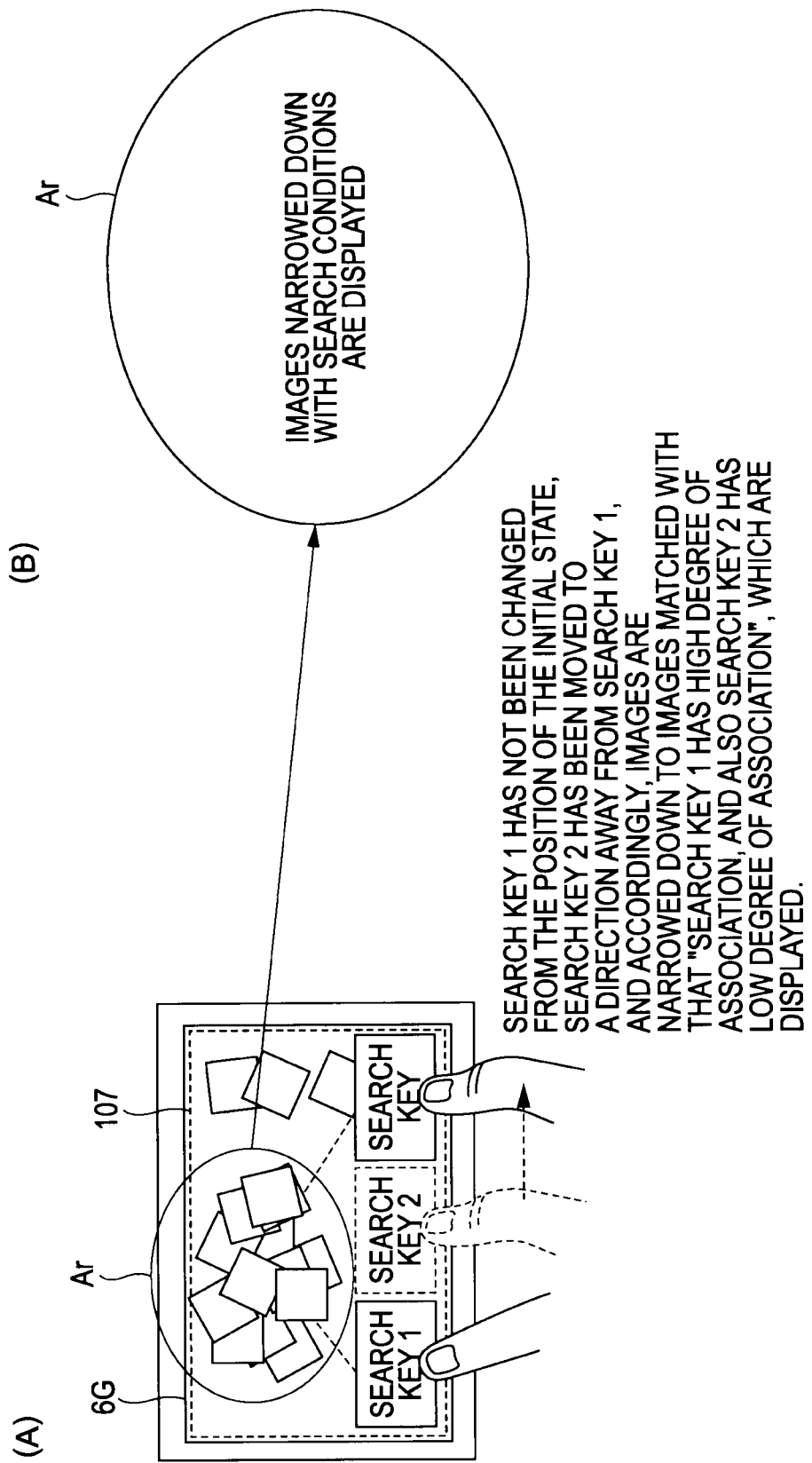
FIG. 21 is a diagram for describing a display mode (6) of search results in the case that image search is executed from a state in which two search keys (character information) is selected.

FIG. 21 is a diagram for describing the display mode (6) of the search results in the case that the image search is executed from a state in which two search keys (character information) are selected, as described with reference to FIGS. 5A through 7B.

(A) in FIG. 21 illustrates the display mode of search results in the case that the image search has been executed in accordance with the selected search keys. Also, (B) in FIG. 21 is a diagram for describing that the search results are displayed on the search result display region Ar in (A) in FIG. 21.

In the case of the display mode (6) illustrated in FIG. 21 as well, two search key displays K1 and K2 are specified simultaneously, and the image search according to these corresponding two search keys is executed in the same way as with the case described with reference to FIG. 15. In the case of this example as well, let us say that the search key corresponding to the search key display K1 is a search key k1, and the search key corresponding to the search key display K2 is a search key k2.

The control unit 120 searches and extracts image files having both of a keyword relating to the search key k1, and a keyword relating to the search key k2, and displays the thumbnail images corresponding to the image data of the extracted image files on the display screen 6G.

In this case, the control unit 120 does not simply display the thumbnail images that are the search results on the display screen 6G. In the case of this display mode (6) as well, the control unit 120 changes the display range of the search results in accordance with the user's operation as to the operating surface of the touch panel 107.

Specifically, as shown in (A) in FIG. 21, the user performs a dragging operation for moving, of the fingers or the like brought into contact with the positions on the operating surface of the touch panel 107 corresponding to the display positions of the search key displays K1 and K2, one of the fingers or the like still in contact with this operating surface.

In response to this dragging operation, the control unit 120 can change the display positions of the search key displays by controlling the display information forming unit 111 and the display processing unit 105. Subsequently, the control unit 120 recognizes what kind of information has been displayed where on the display screen 6G, as described above.

Accordingly, the control unit 120 can recognize which search key display of the search key displays K1 and K2 has been changed in its display position. Also, the control unit 120 can constantly suitably recognize, in the same way as with the case of the above display mode (5), distance d between the search key display K1 and the search key display K2.

Therefore, the control unit 120 displays the thumbnail images of image files having a keyword of which the degree of association is "high" as to the search key corresponding to the search key display of which the display position has not been changed, and a keyword of which the degree of association is "medium" or "low" as to the search key corresponding to the search key display of which the display position has been changed.

(A) in FIG. 21 illustrates a case where the user performs a dragging operation of the fingers or the like in contact to the search key display K2 without changing the display position of the search key display K1 to move the display position of the search key display K2.

In this case, the control unit 120 displays the thumbnail images of image files having a keyword of which the degree of association is "high" as to the search key k1 corresponding to the search key display K1, and a keyword of which the degree of association is "medium" or "low" as to the search key k2 corresponding to the search key display K2.

Subsequently, the display of the search results is displayed within the search result display region Ar within the display screen, as shown in (A) and (9) in FIG. 21.

For example, in the case that the display positions of both of the search key displays K1 and K2 have not been moved, the control unit 120 displays the thumbnail images of image files having a keyword of which the degree of association is "high" as to the search key k1, and also a keyword of which the degree of association is "high" as to the search key k2.

In the case of the user having moved the search key display K2 a predetermined quantity or more, the control unit 120 displays, in addition to the already displayed images, the thumbnail images of image files having a keyword of which the degree of association is "high" as to the search key k1, and also a keyword of which the degree of association is "medium" as to the search key k2.

In the case of the user further having moved the search key display K2 a predetermined quantity or more, the control unit 120 displays, in addition to the already displayed images, the thumbnail images of image files having a keyword of which the degree of association is "high" as to the search key k1, and also a keyword of which the degree of association is "low" as to the search key k2.

In this case as well, the control unit 120 should gradually display thumbnail images according to the degrees of association as to the search keys in the outward direction from the center of the search result display region Ar.

Note that description has been made regarding the case where the display position of the search key display K2 is moved without changing the display position of the search key display K1, as an example. Conversely, it goes without saying that the display position of the search key display K1 is moved without changing the display position of the search key display K2, whereby the results of the image search can also be displayed by changing the degree of association as to the search key k1 without changing the degree of association as to the search key k2.

Also, whether up to the degree of association "medium" as to the search key corresponding to the search key display of which the display position has been moved or up to the degree of association "low" is set to a target should be changed according to the distance d between the search key displays K1 and K2.

Thus, with regard to the two search keys used for the image search, the degree of association as to one of the search keys is fixed, and the degree of association as to the other search key is changed, whereby the results of the image search can be displayed.

Details of Search Result Display Processing

Figure 22:
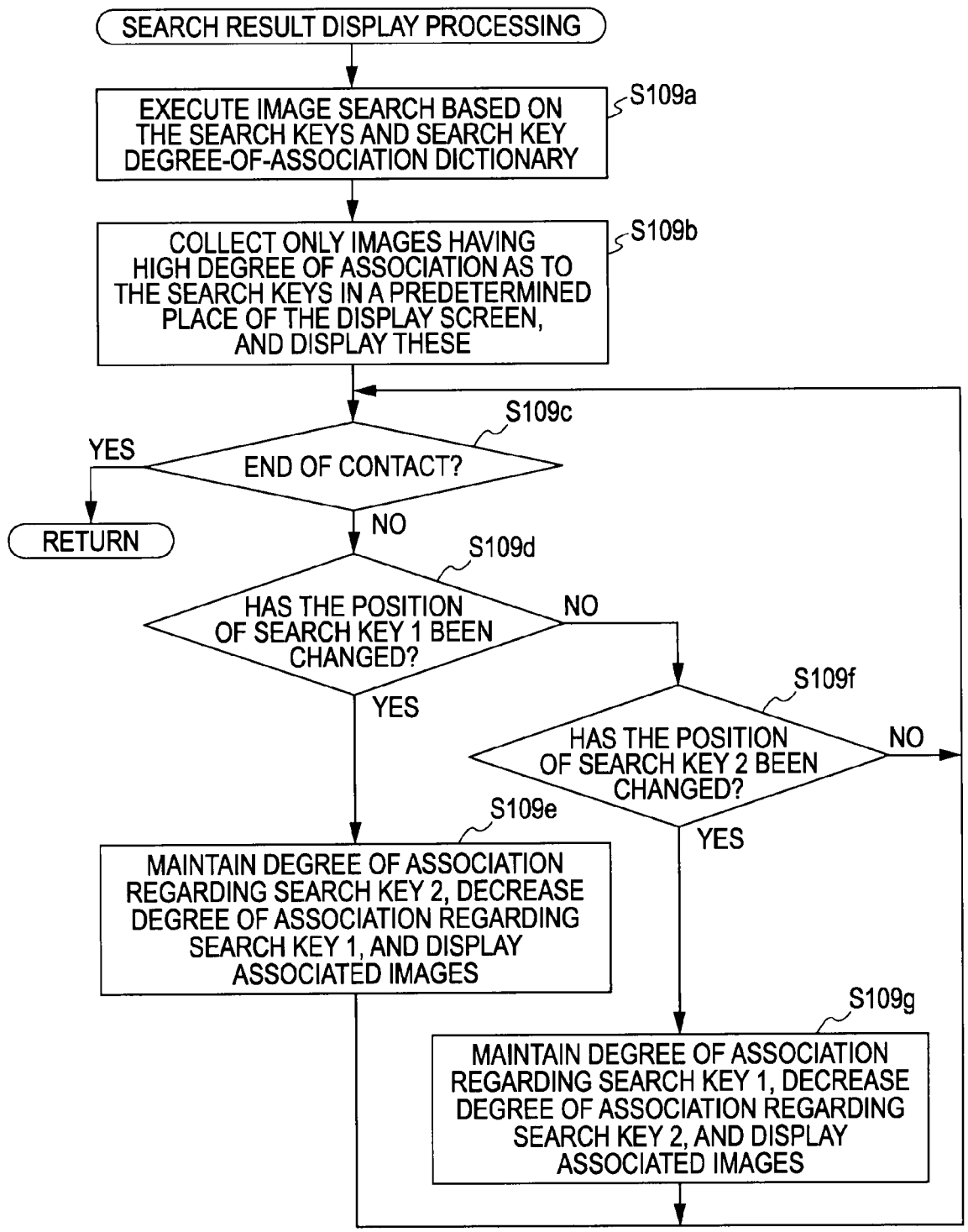
FIG. 22 is a flowchart for describing processing in the case of displaying the results of image search with the display mode (6) described using FIG. 21.

Next, description will be made regarding processing in the case that the results of the image search are displayed in the display mode (6) described with reference to FIG. 21. FIG. 22 is a flowchart for describing the processing in the case that the results of the image search are displayed in the display mode (6) described with reference to FIG. 21.

The processing shown in FIG. 22 is executed in step S109 of the processing at the time of the image search described with reference to FIGS. 11 and 12. Specifically, upon the user bringing the fingers or the like into contact as to the search key displays K1 and K2, and instructing to execute the image search, the control unit 120 executes the search result display processing shown in FIG. 22 in step S109 shown in FIG. 11.

First, the control unit 120 executes the image search based on the specified search keys k1 and k2, and the content of the search key degree-of-association dictionary corresponding to these search keys, and extracts image files having a keyword relating to the specified search keys k1 and k2 (step S109a).

Subsequently, the control unit 120 displays the thumbnail images of the image data of image files having a keyword of which degree of association is "high" as to the search keys k1 and k2 on the central portion of the display region Ar (step S109b).

Subsequently, the control unit 120 determines whether or not contact onto the positions on the operating surface of the touch panel 107 corresponding to the display positions of the search key displays K1 and K2 has ended based on the coordinate data supplied from the touch panel 107 (step S109c).

When determination is made in the determining processing in step S109c that contact has ended, the control unit 120 ends the processing shown in FIG. 22, returns to step S109 shown in FIG. 11, and executes the processing from step S110 in FIG. 12.

When determination is made in the determining processing in step S109c that contact has not ended, the control unit 120 determines whether or not the display position of the search key display K1 has been changed based on the coordinate data from the touch panel 107 (step S109d).

When determination is made in the determining processing in step S109d that the display position of the search key display K1 has been changed, the control unit 120 executes processing for displaying the results of the image search by adjusting the degree of association as to the search key k1 in accordance with the user's instructions (step S109e).

Specifically, in step S109e the control unit 120 maintains the degree of association as to the search key k2, decreases the degree of association as to the search key k1, extracts a thumbnail image having the corresponding degree of association from the results of the image search, and additionally displays this. Subsequently, the control unit 120 repeats the processing from step S109c.

Also, when determination is made in the determining processing in step S109d that the display position of the search key display K1 has not been changed, the control unit 120 determines whether or not the display position of the search key display K2 has been changed (step S109f).

When determination is made in the determining processing in step S109f that the display position of the search key display K2 has been changed, the control unit 120 executes processing for displaying the results of the image search by adjusting the degree of association as to the search key k2 in accordance with the user's instructions (step S109g).

Specifically, in step S109g the control unit 120 maintains the degree of association as to the search key k1, decreases the degree of association as to the search key k2, extracts a thumbnail image having the corresponding degree of association from the results of the image search, and additionally displays this. Subsequently, the control unit 120 repeats the processing from step S109c.

Also, when determination is made in the determining processing in step S109f that the display position of the search key display K2 has not been changed, processing for adjusting the search results has not been executed, and accordingly, the control unit 120 repeats the processing from step S109c.

Thus, as also described above, of the two search keys, the results of the image search can be displayed while adjusting the degree of association as to one of the search keys.

Note that, in the case of the example described with reference to FIGS. 21 and 22, a thumbnail image of which the degree of association has been adjusted is displayed in a manner for adding this to the already displayed thumbnail images. However, the present invention is not restricted to this.

For example, in the case that the display positions of both of the search key displays K1 and K2 have not been moved, the control unit 120 displays only the thumbnail images of image files having a keyword of which the degree of association is "high" as to the search key k1, and also a keyword of which the degree of association is "high" as to the search key k2.

In the case of the user having moved the search key display K2 a predetermined quantity or more while maintaining the display position of the search key display K1, first the control unit 120 eliminates the already displayed images. Subsequently, the control unit 120 displays only the thumbnail images of image files having a keyword of which the degree of association is "high" as to the search key k1, and also a keyword of which the degree of association is "medium" as to the search key k2.

In the case of the user further having moved the search key display K2 a predetermined quantity or more while maintaining the display position of the search key display K1, first the control unit 120 eliminates the already displayed images. Subsequently, the control unit 120 displays only the thumbnail images of image files having a keyword of which the degree of association is "high" as to the search key k1, and also a keyword of which the degree of association is "low" as to the search key k2.

Thus, in the case of the user having moved the display position of the search key display, the display immediately before is cleared, whereby only the thumbnail images of image files having the degree of association specified by the user can be displayed.

Subsequently, the user moves the display position of each of the search key display K1 and the search key display K2 sequentially. In such a case, only the thumbnail images of image files having a keyword of which the degree of association is "medium" as to the search key k1, and a keyword of which the degree of association is "medium" as to the search key k2 can be displayed.

Similarly, only the thumbnail images of image files having a keyword of which the degree of association is "medium" as to the search key k1, and a keyword of which the degree of association is "low" as to the search key k2 can be displayed.

First Modification

With the imaging apparatus 100 according to the above embodiment, image files having a keyword matched with a search key have been searched. That is to say, the above embodiment is a case where a search key is keyword information.

However, search keys are not restricted to keyword information. Similar images can also be detected with an image itself, specifically, the information of image analysis as a search key. With the imaging apparatus 100 according to this first modification, an image itself is used as a search key, and the image search is executed.

Figure 23:
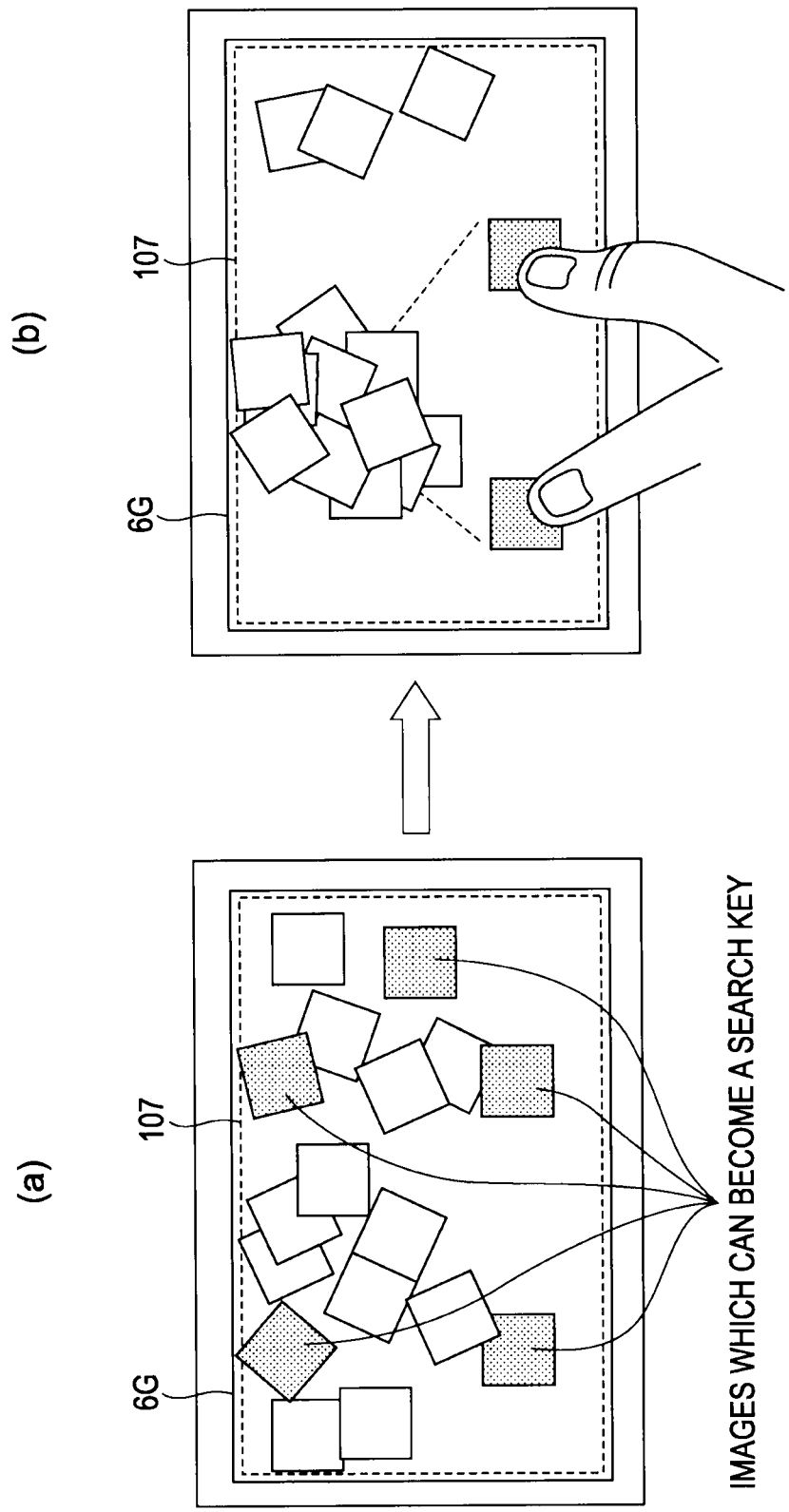
FIG. 23 is a diagram for describing a case where image search is executed using an image as a search key.

FIG. 23 is a diagram for describing a case where images are used as search keys to execute the image search. As shown in (a) in FIG. 23, images to be able to be used as a search key are displayed in a distinguishable mode, for example, such as highlight display or the like.

As described with reference to FIG. 2, with each image file, image analysis information obtained by subjecting the image data of the image file to image analysis is added thereto as metadata. With this image analysis information, as described above, various techniques such as edge detection, color analysis, and the like are used, whereby the features of the image according to each piece of image data can be shown by digitalizing, the similarity of picture compositions and subjects can be compared between images.

Therefore, as a result of the image analysis, an image that has been determined to be an image having clear features, for example, such as an image where a person's face is greatly taken, an image of a building or scenery having a clear outline, is arranged to be able to be used as a search key.

Specifically, the image file of an image that can be used as a search key is arranged to be distinguishable by turning on a flag of the image file of an image that is available as a search key, or the like. Thus, as shown in (a) in FIG. 23, the thumbnail image of an image to be able to become a search key can be distinguishable with highlight display or the like.

Subsequently, as shown in (b) in FIG. 23, the user brings the fingers or the like into contact with the operating surface of the touch panel 107 on the display positions of the thumbnail images of target images.

In this case, the control unit 120 can recognize which thumbnail image has been specified as a search key based on the coordinate data from the touch panel 107, and the thumbnail image displayed on the position on the display screen corresponding to the position on the operating surface indicated with this coordinate data.

The control unit 120 reads out image analysis information from the image file corresponding to the specified thumbnail image, and with this image analysis information as a search key, extracts an image file having image analysis information similar to this search key. Subsequently, the control unit 120 displays, as shown in (b) in FIG. 23, the thumbnail images of the extracted image files by gathering these together into a predetermined position on the display screen.

In the case of the example shown in FIG. 23, the case where two thumbnail images have been specified so as to become search keys is illustrated. Subsequently, in the case of this example, images similar to both of the image analysis results of the specified two images are extracted. Note that it is possible to extract an image similar to one of the image analysis results of the specified two images according to the user's instructions.

Thus, an image is specified as a search key, whereby images can be narrowed down with a person or building or the like taken in this image as a search condition. That is to say, images similar to the image specified as a search key can be extracted.

Note that description has been made assuming that as a result of image analysis, images having clear features are determined beforehand to be an image that can be specified as a search key. However, the present invention is not restricted to this. It goes without saying that all the images may be able to be specified as a search key. In this case, the thumbnail images do not have to be displayed in a highlighted manner. Also, the user himself may set an image to be used as a search key beforehand.

Specifically, as described with reference to FIG. 9, the user selects "the area of a person's face within an image" as image analysis information, and as described with reference to FIG. 23, specifies an image to be used as a search key.

In this case, the control unit 120 searches and extracts related images from the recording medium 135 based on "the area of a person's face within an image" of the image analysis information of the image specified as a search key, whereby the result thereof can be displayed according to the degree of association.

Also, the user selects "the number of persons within an image" as image analysis information, and as described with reference to FIG. 23, specifies an image to be used as a search key. In this case, the control unit 120 searches and extracts related images from the recording medium 135 based on "the number of persons within an image" of the image analysis information of the image specified as a search key, whereby the result thereof can be displayed according to the degree of association.

Also, in the case that the user uses "the degree of a person's smiling face within an image" that is image analysis information as well, the control unit 120 can search related images from the recording medium 135 based on "the degree of a person's smiling face within an image" of the image specified as a search key.

Also, in the case that the user uses "the features of the whole image" that is image analysis information as well, the control unit 120 can search related images from the recording medium 135 based on "the features of the whole image" of the image specified as a search key.

In this case, similarity is obtained from the hue and complexity of an image, related images are extracted according to this similarity, whereby the related images can be classified into the degrees of association "high", "medium", and "low".

Thus, with the imaging apparatus 100 according to the present embodiment, image analysis information is used, and an image itself is used as a search key, whereby images relating to this search key can be searched and extracted.

As described above, even in the case that an image is used as a search key, the search results can be displayed in the display modes shown in FIGS. 10, 13, 15, 17, 19, and 20.

Second Modification

Also, GPS information (position information) included in each image file may be used as a search key. In this case, position information is set to be used as a search key, the search key display corresponding to this position information is displayed on the display screen 6G. Also, the user sets position information by inputting the actual position information (longitude, latitude) used as a search key, or selecting position information from a plurality of position information prepared beforehand, or the like.

Subsequently, the user brings the finger or the like into contact with the search key display corresponding to the position information, whereby the control unit 120 executes the image search using the position information. In this case, the control unit 120 searches image files having GPS information belonging to a predetermined radial area with the position information (longitude, latitude) serving as a search key as the center.

Specifically, the control unit 120 searches and extracts image files having, for example, GPS information belonging to an area of which the radius is below 10 km as an image file having a "high" degree of association with the position information (longitude, latitude) serving as a search key as the center.

Also, the control unit 120 searches and extracts image files having, for example, GPS information belonging to an area of which the radius is equal to or greater than 10 km and less than 20 km as an image file having a "medium" degree of association with the position information (longitude, latitude) serving as a search key as the center.

Also, the control unit 120 searches and extracts image files having, for example, GPS information belonging to an area of which the radius is equal to or greater than 120 km and less than 30 km as an image file having a "low" degree of association with the position information (longitude, latitude) serving as a search key as the center.

Thus, it is possible to use position information as a search key, and to execute search of image files in accordance with the degree of association determined with the position information determined as the search key thereof as a reference.

Thus, with the imaging apparatus 100 according to the present embodiment, position information (GPS information) is used as a search key, whereby images relating to this search key can be searched and extracted.

As described above, even in the case that position information is used as a search key, the search results can be displayed in the display modes shown in FIGS. 10, 13, 15, 17, 19, and 20.

Determination of Image Search Results

With the imaging apparatus 100 according to the present embodiment, as described above, in the case that the image search is executed, and the results thereof are displayed on the display screen 6G of the display unit 106, the user performs predetermined operations, whereby the search results can be determined and stored in a folder.

FIG. 24 is a diagram for describing operations for determining the search results. The imaging apparatus 100 according to the present embodiment includes, as described with reference to FIG. 1, a motion sensor 137. According to the function of the motion sensor 137, as also described above, each of a case where the imaging apparatus 100 is inclined, a case where being shaken, and a case where being tapped can be detected and notified as to the control unit 120.

Therefore, as shown in FIG. 24, in the case that the image search has been executed, and the search results are displayed on the display screen 6G, in the case of the imaging apparatus 100 being inclined, in the case of being shaken, or in the case of being tapped, these are recognized as the determining operations of the search results.

Specifically, as shown in (a) in FIG. 24, in the case that the search results are displayed on the display screen 6G, upon the motion sensor 137 detecting that the imaging apparatus 100 is inclined, the control unit 120 recognizes this inclining operation as the determining operation of the search results.

Subsequently, the control unit 120 processes the image files corresponding to the thumbnail images currently displayed on the display screen 6G, as shown in (d) in FIG. 24, for example, so as to store these in the image folder selected by the user.

In this case, for example, as shown in (d) in FIG. 24, the imagery of the image folder is displayed, and an imagery image is displayed wherein the image files obtained as a result of the image search are stored in the image folder gradually, whereby the user can clearly be notified that the search results are stored in the folder.

Also, as shown in (b) in FIG. 24, in the case that the search results are displayed on the display image 6G, upon the motion sensor 137 detecting that the imaging apparatus 100 being shaken to the left and right for example, the control unit 120 recognizes this shaking operation as the determining operation of the search results.

Subsequently, the control unit 120 processes the image files corresponding to the thumbnail images currently displayed on the display screen 6G, as shown in (d) in FIG. 24, for example, so as to store these in the image folder selected by the user.

In this case as well, as shown in (d) in FIG. 24, the imagery of the image folder is displayed, and an imagery image is displayed wherein the image files obtained as a result of the image search are stored in the image folder gradually, whereby the user can clearly be notified that the search results are stored in the folder.

Also, as shown in (c) in FIG. 24, in the case that the search results are displayed on the display image 6G, upon the motion sensor 137 detecting that the imaging apparatus 100 being tapped for example, the control unit 120 recognizes this shaking operation as the determining operation of the search results.

Subsequently, the control unit 120 processes the image files corresponding to the thumbnail images currently displayed on the display screen 6G, as shown in (d) in FIG. 24, for example, so as to store these in the image folder selected by the user.

In this case as well, as shown in (d) in FIG. 24, the imagery of the image folder is displayed, and an imagery image is displayed wherein the image files obtained as a result of the image search are stored in the image folder gradually, whereby the user can clearly be notified that the search results are stored in the folder.

Note that description has been made here wherein the motion sensor 137 detects that the imaging apparatus 100 has been tapped, but the present invention is not restricted to this. The imaging apparatus 100 according to the present embodiment includes, as described with reference to FIG. 1, the touch panel on the set upper portion 136. Therefore, an arrangement may be made wherein, in the case of detecting via the touch panel on the set upper portion 136 that the imaging apparatus 100 has been tapped by the user, the control unit 120 executes processing for storing the search results in the folder.

Also, as also described above, the imaging apparatus 100 according to the present embodiment can search images according to the degree of association as to a search key to display the results thereof. Therefore, the range of the search results to be stored in the folder can be adjusted according to the frequency of an operation for determining the search results.

Figure 25A:
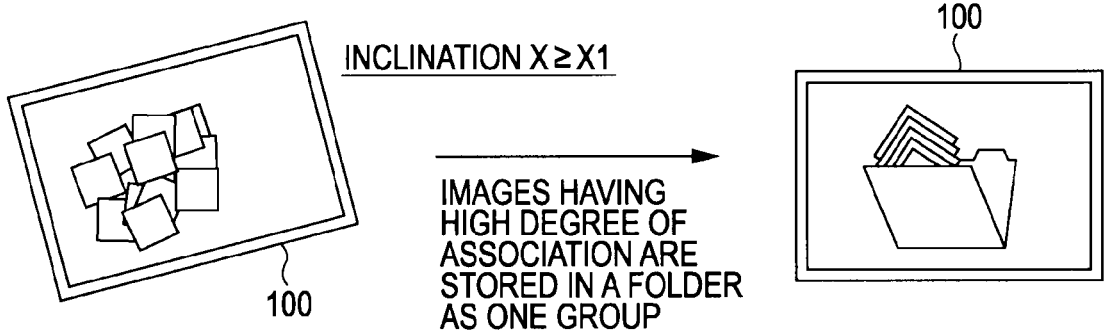
FIGS. 25A through 25C are diagrams for describing a case where a range of image search results to be stored in a folder is changed according to the inclination of the imaging apparatus which is inclined by a user.
Figure 25B:
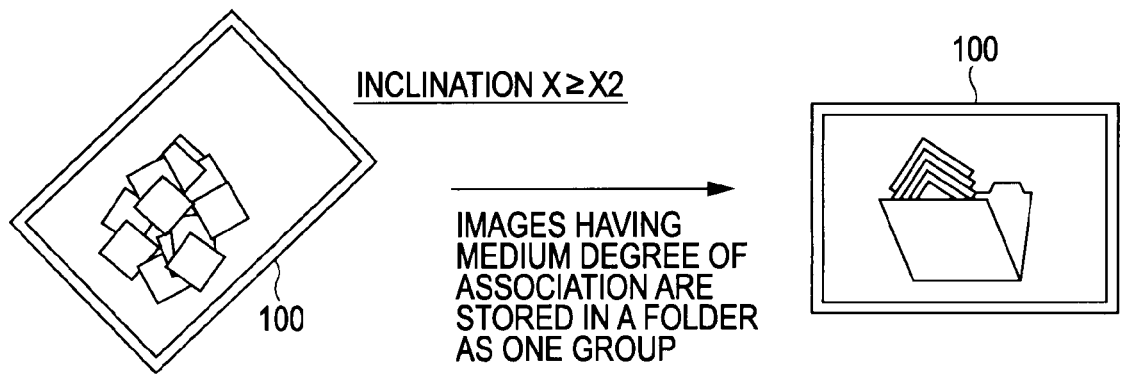
Figure 25C:
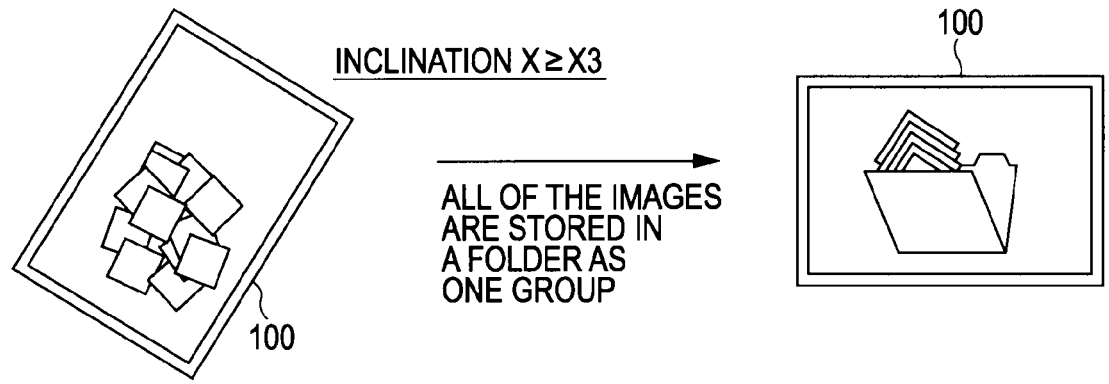

FIGS. 25A through 25C are diagrams for describing a case where the range of the results of the image search to be stored in the folder is changed according to the inclination of the imaging apparatus 100 to be inclined by the user.

As also described above, the motion sensor 137 implemented in the imaging apparatus 100 according to the present embodiment can detect how much the imaging apparatus 100 is inclined in which direction.

Therefore, as shown in FIG. 25A, in the case that the motion sensor 137 detects that the imaging apparatus 100 has been inclined a predetermined angle X1 or more, the control unit 120 stores image files determined to be a "high" degree of association as to the search key in the image folder.

Subsequently, as shown in FIG. 25B, in the case that the motion sensor 137 detects that the imaging apparatus 100 has further been inclined a predetermined angle X2 or more, the control unit 120 stores image files determined to be a "medium" degree of association as to the search key in the image folder.

Subsequently, as shown in FIG. 25C, in the case that the motion sensor 137 detects that the imaging apparatus 100 has further been inclined a predetermined angle X3 or more, the control unit 120 stores image files determined to be a "low" degree of association as to the search key in the image folder.

Subsequently, in the case that the imaging apparatus 100 is returned to a state in which the imaging apparatus is level from the state shown in FIG. 25A, the image files having a "medium" degree of association or "low" degree of association as to the search key can be prevented from being stored in the image folder.

Similarly, in the case that the imaging apparatus 100 is returned to a state in which the imaging apparatus is level from the state shown in FIG. 25B, the image files having a "low" degree of association as to the search key can be prevented from being stored in the image folder.

Also, in the case of the example shown in FIGS. 25A through 25C, the angles X1, X2, and X3 satisfy relationship of X1<X2<X3, and are set as X1=15 degrees, S2=30 degrees, and X3=45 degrees, for example. It goes without saying that these are an example, and accordingly, various values may be set.

Thus, the user of the imaging apparatus 100 according to the present embodiment can store the search results of the intended range in a target image folder with simple operations.

Image Search Result Determining Processing

Figure 26:
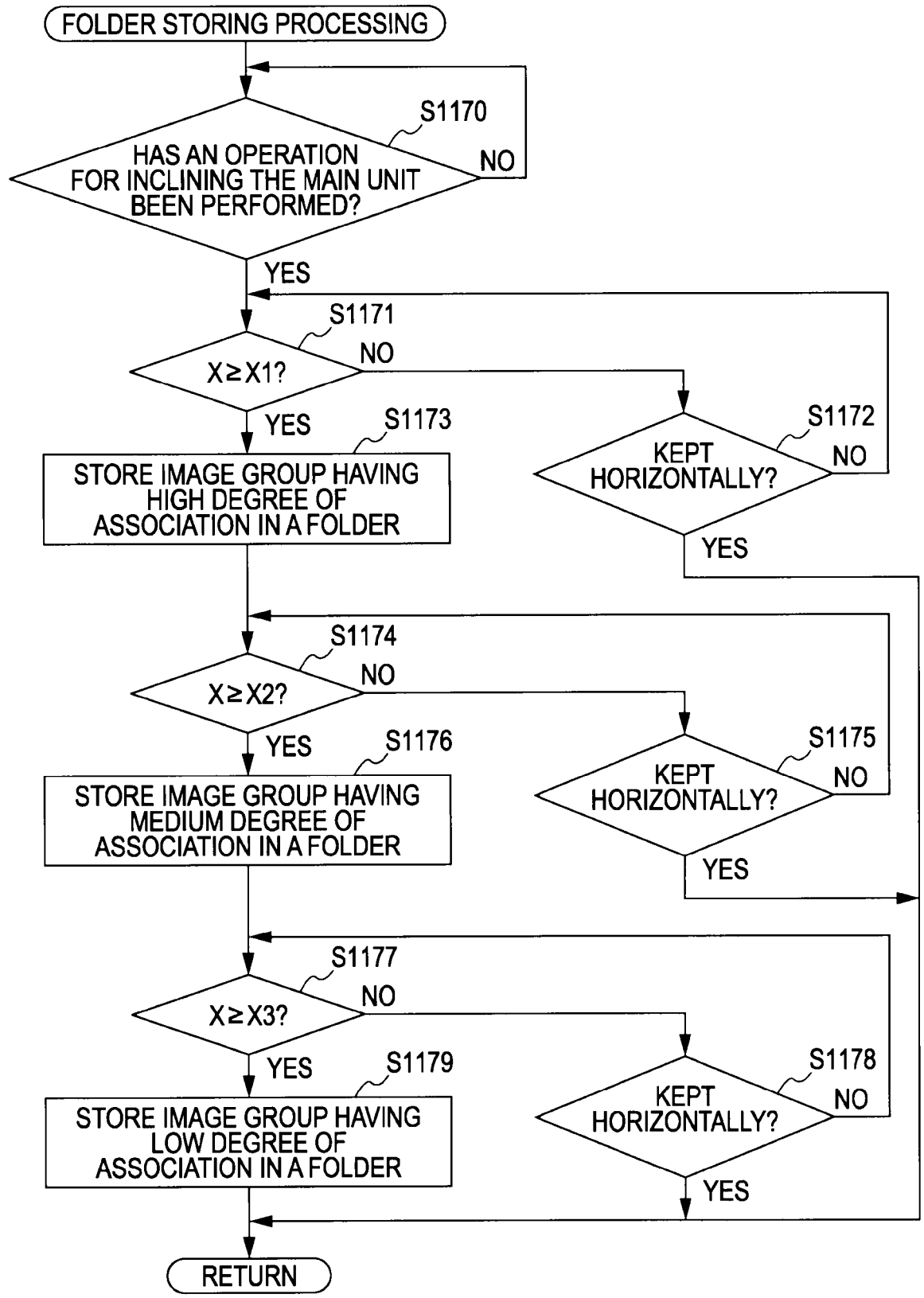
FIG. 26 is a flowchart for describing processing in the case that a range of image search results to be stored in a folder is changed according to the inclination of the imaging apparatus which is inclined by a user, which has been described using FIGS. 25A through 25C.

FIG. 26 is a flowchart for describing processing in the case of changing the range of the results of the image search to be stored in the folder according to the inclination of the imaging apparatus 100 to be inclined by the user described with reference to FIGS. 25A through 25C.

The processing shown in FIG. 26 is principally executed by the control unit 120, for example, in step S117 of the image search processing described with reference to FIGS. 11 and 12.

First, the control unit 120 monitors the detection output from the motion sensor 137 to determine whether or not an operation for inclining the imaging apparatus 100 (main unit) has been performed (step S1170). When determination is made in the determining processing in step S1170 that the imaging apparatus has not been inclined, the control unit 120 repeats the processing in step S1170 to become a waiting state until the imaging apparatus is inclined.

When determination is made in the determining processing in step S1170 that the imaging apparatus has been inclined, the control unit 120 determines whether or not the inclination X of the imaging apparatus 100 is equal to or greater than a predetermined first inclination X1 (step S1171).

When determination is made in the determining processing in step S1171 that the inclination X of the imaging apparatus 100 is not equal to or greater than the predetermined first inclination X1, the control unit 120 determines whether or not the imaging apparatus 100 has been returned to level (step S1172).

When determination is made in the determining processing in step S1172 that the imaging apparatus 100 has not been returned to level, the control unit 120 repeats the processing from step S1171. Also, when determination is made in the determining processing in step S1172 that the imaging apparatus 100 has been returned to level, the control unit 120 ends this processing in FIG. 26.

Also, when determination is made in the determining processing in step S1171 that the inclination X of the imaging apparatus 100 is equal to or greater than the predetermined first inclination X1, the control unit 120 stores the image group determined to be a "high" degree of association as to the search key in a predetermined folder (step S1173).

Subsequently, the control unit 120 determines whether or not the inclination X of the imaging apparatus 100 is equal to or greater than a predetermined second inclination X2 (step S1174).

When determination is made in the determining processing in step S1174 that the inclination X of the imaging apparatus 100 is not equal to or greater than the predetermined second inclination X2, the control unit 120 determines whether or not the imaging apparatus 100 has been returned to even (step S1175).

When determination is made in the determining processing in step S1175 that the imaging apparatus 100 has not been returned to even, the control unit 120 repeats the processing from step S1174. Also, when determination is made in the determining processing in step S1175 that the imaging apparatus 100 has been returned to even, the control unit 120 ends this processing in FIG. 26.

When determination is made in the determining processing in step S1174 that the inclination X of the imaging apparatus 100 is equal to or greater than the predetermined second inclination X2, the control unit 120 additionally stores the image group determined to be a "medium" degree of association as to the search key in this folder (step S1176).

Subsequently, the control unit 120 determines whether or not the inclination X of the imaging apparatus 100 is equal to or greater than a predetermined third inclination X3 (step S1177).

When determination is made in the determining processing in step S1177 that the inclination X of the imaging apparatus 100 is not equal to or greater than the predetermined third inclination X3, the control unit 120 determines whether or not the imaging apparatus 100 has been returned to even (step S1178).

When determination is made in the determining processing in step S1178 that the imaging apparatus 100 has not been returned to even, the control unit 120 repeats the processing from step S1177. Also, when determination is made in the determining processing in step S1178 that the imaging apparatus 100 has been returned to even, the control unit 120 ends this processing in FIG. 26.

When determination is made in the determining processing in step S1177 that the inclination X of the imaging apparatus 100 is equal to or greater than the predetermined third inclination X3, the control unit 120 additionally stores the image group determined to be a "low" degree of association as to the search key in this folder (step S1179). Subsequently, the control unit 120 ends the processing in FIG. 26.

Thus, the user of the imaging apparatus 100 according to the present embodiment performs an operation for inclining the imaging apparatus 100 after performing the image search, whereby the results of the image search can be stored in a predetermined folder.

Also, the user can store the search results of the intended range in a target image folder by adjusting the inclination of the imaging apparatus 100.

Note that FIGS. 25 and 26 have described the case where the operation for inclining the imaging apparatus 100 is taken as an operation for starting the processing for storing the results of the image search, as an example. However, in addition to this, an operation for shaking the imaging apparatus 100, or an operation for tapping the imaging apparatus 100 may also be taken as an operation for starting the processing for storing the results of the image search.

In this case, according to the number of operations for shaking the imaging apparatus 100, or the number of operations for tapping the imaging apparatus 100, the range of the results of the image search to be stored in the folder can be controlled. Also, in the case that the strength of the operation for shaking the imaging apparatus 100 or the strength of the operation for tapping the imaging apparatus 100 is detectable, the range of the image search to be stored in the folder may be controlled according to this strength.

Advantages

The imaging apparatus 100 according to the above embodiment can execute search of images relating to the search key specified by the user. Subsequently, the results of the image search can be provided so as to allow the user to visually recognize the degree of association as to the search key (search condition).

Also, the above imaging apparatus 100 can store the results of the image search in the folder with simple operations. Moreover, the range of the results of the image search can be controlled according to the level of the user's operations.

Also, the operation for starting the image search is an operation for bringing the finger or the like into contact as to the search key display, and the operation for storing the results of the image search in a folder is an operation for inclining, shaking, tapping, or the like the imaging apparatus 100. Thus, the image search, and the search result storing processing can readily be executed by intuitive operations.

Method and Program of Present Invention

Note that, such as is apparent from the above embodiment, the method and program of the present invention can be realized principally as a method and program described with reference to the flowchart shown in FIGS. 11 and 12. That is to say, the method described with reference to FIGS. 11 and 12 is an embodiment according to the method of the present invention.

The program for executing the processing described with reference to FIGS. 11 and 12 is an embodiment of the program of the present invention. Accordingly, the program according to the present invention is realized, and is implemented into a digital still camera or various types of image processing apparatus, whereby the image processing apparatus according to the present invention can be realized.

Further, the method and program described with the flowcharts shown in FIGS. 14, 20, 22, and 26 can also be realized. Also, in step S109 in FIG. 11, the method and program for executing the display processing described with reference to FIGS. 15 and 16 can also be realized. Similarly, in step S109 in FIG. 11, the method and program for executing the display processing described with reference to FIGS. 17 and 18 can also be realized.

Other Embodiments and Modifications

Note that, with the above embodiment, the display unit 106 realizes the display device, the recording medium 135 realizes the storage unit, and the display unit 106 collaborates with the touch panel 107 to realize the search key specifying unit. Also, the control unit 120 principally realizes the search unit and the display control unit.

Also, the touch panel 107 realizes the specified position detecting unit, and the control unit 120 realizes the search key display control unit. Also, the motion sensor 137 and the touch panel on the set upper portion 136 realize the motion detecting unit.

Also, with the above embodiment, the display unit 106 collaborates with the touch panel 107 to realize the search key specifying unit, but the present invention is not restricted to this. The search key specifying unit can also be realized with a hardware key provided to the operating unit 131, for example.

Specifically, after specifying a search key to be used for the image search, in the case that a predetermined hardware key for executing the image search using this search key is pressed and operated, the image search using this search key can be executed.

In this case, in the event of using two or more search keys, multiple predetermined hardware keys for executing the image search are provided corresponding thereto, whereby the image search can be executed in the same way as with the case using the touch panel. Also, these hardware keys are provided, for example, as two slidable hardware keys, whereby the image search using two search keys can be executed as described with the above embodiment.

Also, with the above embodiment, image files having a degree of association in three stages of a high degree of association, a medium degree of association, and a low degree of association as to the search keys have been searched, but the present invention is not restricted to this. It goes without saying that a degree of association may be further divided more finely.

Also, with the above embodiment, a case where the present invention has been applied to the imaging apparatus has been described as an example, but the present invention is not restricted to this. For example, the present invention may be applied to cellular phone terminals, portable information terminals called PDAs (Personal Digital Assistant) or the like capable of image data processing, and various image processing apparatuses capable of other image data processing.

Also, image data to be displayed is not restricted to the image data of a still image. For example, the present invention may be applied to image processing apparatuses wherein the representative images or thumbnail images of multiple moving picture contents stored in a recording medium are taken as display objects.

Also, with the above embodiment, the touch panel 107 included in the imaging apparatus 100 has been described as a panel capable of detecting the user's finger or the like, but the present invention is not restricted to this. For example, in the case of the user bringing the finger or the like close to the operating surface to an extent without contacting the operating surface this can be used for realizing the present invention, as long as the position brought close is detectable.

That is to say, the touch panel 107 is not restricted to a contact type. For example, a non-contact type touch panel may be used wherein in the case that the finger or the like is brought close to an extent, change in the potential on the operating surface, or change in brightness at the position brought close is detected, and this changed position on the operation surface can be determined as a specified position.

Also, with the above embodiment, as shown in FIG. 10 and the like, the display positions and display directions and the like of thumbnail images to be displayed have been displayed in a scattered manner (at random), but the present invention is not restricted to this.

The display direction may be fixed. That is to say, in the case of having executed the image search, there is a feature in that the thumbnail images of images matched with the search key are displayed so as to be gathered together at predetermined positions on the display screen, and other portions can be displayed in various modes.

Also, as also described above, thumbnail data is formed from image data beforehand, this is added to each image file, and accordingly, thumbnail data does not have to be provided at the time of display of the thumbnail images, and accordingly, load of the apparatus can be reduced.

The present application contains subject matter related to that disclosed in Japanese Priority Patent Application JP 2008-309248 filed in the Japan Patent Office on Dec. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a display device; and
processing circuitry programmed to implement image search and configured to
generate a plurality of search buttons corresponding to a plurality of candidate search keys, each search button inscribed with a name of the respective candidate search key;
receive a selection of at least one search button of the plurality of search buttons corresponding to the plurality of candidate search keys as designated search keys for the image search;
store a plurality of image data having information corresponding to the designated search keys for the image search,
receive selection of a particular one of the designated search keys via actuation of a respective selectable search button inscribed with the name of the respective designated search key and determine a duration of the actuation;
search and extract image data having information relating to the selected particular one of the designated search keys,
determine a first display position at a central portion of a display screen of said display device for a first one of a plurality of images corresponding to image data having information of a first degree of association as to the particular one of said designated search keys,
determine a second display position outside of the central portion of said display screen for a second one of the plurality of images corresponding to image data having information of a second degree of association as to the particular one of said designated search keys, the second degree of association being lower than the first degree of association,
control display of only the first one of the plurality of images on said display screen of said display device in response to the particular one of the respective search button of the respective one of the designated search keys being actuated for less than a first duration,
control display of the first one of the plurality of images together with the second one of the plurality of images at the respective first and second display positions on said display screen of said display device only in response to the duration of actuation of the particular one of the respective search button of the respective one of the designated search keys being equal to or greater than the first duration,
detect a motion of said image processing apparatus,
classify said detected motion of said image processing apparatus, and store said plurality of images into a folder in a manner corresponding to said classified motion of said image processing apparatus, wherein the processing circuitry is further configured to receive the selection of the at least one search button of the plurality of search buttons corresponding to the plurality of candidate search keys as the designated search keys for the image search by detecting a requested movement of the at least one search button of the plurality of selectable search buttons from a first area including search buttons corresponding to all the candidate search keys to a second area distinct from the first area in which only search buttons corresponding to designated search keys are located, wherein the designated search keys for the image search located in the second area only modify an outcome of the search and extraction of the image data when the particular one of the designated search keys is selected via actuation of the respective selectable search button inscribed with the name of the respective designated search key, and wherein actuation of the respective selectable search button inscribed with the name of the respective designated search key modifies the outcome of the search and extraction of the image data.

2. The image processing apparatus according to claim 1, wherein the processing circuitry is further configured to further search and extract image data having information relating to each of the designated search keys;

wherein said processing circuitry is further configured to control display of the images corresponding to the image data further extracted by said processing circuitry on positions corresponding to the degrees of association to a respective one of said designated search keys, on a coordinates system having a coordinate axis corresponding to each of said designated search keys formed on the display screen of said display device.

3. The image processing apparatus according to claim 1, wherein said processing circuitry is further configured to:

execute control to display one or more designated search keys on the display screen of said display device for a selection.

4. The image processing apparatus according to claim 3, wherein said processing circuitry is further configured to change display positions of said designated search keys displayed, according to an operation, executed via said processing circuitry, for moving the display positions of said designated search keys displayed; and said processing circuitry is further configured to execute control of display, of images corresponding to the image data extracted by said processing circuitry, the images corresponding to the image data having degrees of association according to distances between said designated search keys on the display screen of said display device.

5. The image processing apparatus according to claim 1, wherein the processing circuitry is further configured to determine an operation for search results currently displayed, when a specifying operation is accepted after displaying the plurality of images corresponding to the image data extracted by said processing circuitry on said display screen under control of said processing circuitry.

6. The image processing apparatus according to claim 1, wherein the classified detected motion of said image processing apparatus includes obliquely inclining said image processing apparatus detected via said processing circuitry, shaking said image processing apparatus, and tapping said image processing apparatus, and wherein the circuitry is further configured to gradually store said plurality of images in said folder and notify a user that said plurality of images are stored in the folder.

7. The image processing apparatus according to claim 6, wherein said processing circuitry is further configured:

measure an inclination level of said image processing apparatus, and in response to the inclination being above a first threshold, store images having high degree of association in a folder as one group, in response to the inclination being above a second threshold, store images having medium degree of association in a folder as one group, and in response to the inclination being above a third threshold, store all of said images in a folder as one group.

8. The apparatus according to claim 1, wherein the processing circuitry is further configured to display the first one, the second one, and a third one of the plurality of images together on respective first, second and third display positions on said display screen of said display device only after the duration of actuation of the particular one of the plurality of search keys is greater than a second duration, the second duration being greater than the first duration, the third image having a third degree of association as to said particular one of the designated search keys, the third degree of association being lower than the second degree of association.

9. The image processing apparatus according to claim 1, wherein the actuation of the respective selectable search button is performed while the selectable search button is maintained within the second area, and wherein the designation of the search keys is performed by a drag and drop operation.

10. The image processing apparatus according to claim 1, wherein the circuitry is further configured to:

receive selection of two of the designated search keys via actuation of respective selectable search buttons inscribed with the name of the respective designated search keys, and determine a display location for each one of displayed images having information related to the selected two of the designated search keys based on a measured distance between the selected two of the designated search keys.

11. An image display method, comprising:

generating a plurality of search buttons corresponding to a plurality of candidate search keys, each search button inscribed with a name of the respective candidate search key;

receiving a selection of at least one search button of the plurality of search buttons corresponding to the plurality of candidate search keys as designated search keys for the image search;

receiving selection of a particular one of the designated search keys via actuation of a respective selectable search button inscribed with the name of the respective designated search key;

determining a duration of the actuation;

searching and extracting, in response to receiving a selection by the receiving, image data having information relating to the particular one of the designated search keys from a storage circuit for storing a plurality of image data having information corresponding to the designated search keys;

determining a first display position at a central portion of a display screen of a display device for a first one of a plurality of images corresponding to image data having information of a first degree of association as to the particular one of said designated search keys;

determining a second display position outside of the central portion of said display screen for a second one of the plurality of images corresponding to image data having information of a second degree of association as to the particular one of said designated search keys, the second degree of association being lower than the first degree of association;

executing control of a display control circuit to control display of only the first one of the plurality of images on said display screen of said display device in response to the particular one of the respective search button of the respective one of the designated search keys being actuated for less than a first duration;

executing control of the display control circuit to control display of the first one and the second one of the plurality of images together at the respective first and second display positions on said display screen of said display device only in response to the duration of actuation of the particular one of the respective search button of the respective one of the designated search keys being equal to or greater than the first duration;

detecting a motion of an image processing apparatus;

classifying said detected motion; and storing said plurality of images into a folder in a manner corresponding to said classified motion of said image processing apparatus, wherein the receiving further comprises receiving the selection of the at least one search button of the plurality of search buttons corresponding to the plurality of candidate search keys as the designated search keys for the image search by detecting a requested movement of the at least one search button of the plurality of selectable search buttons from a first area including search buttons corresponding to all the candidate search keys to a second area distinct from the first area in which only search buttons corresponding to designated search keys are located, wherein the designated search keys for the image search located in the second area only modify an outcome of the search and extraction of the image data when the particular one of the designated search keys is selected via actuation of the respective selectable search button inscribed with the name of the respective designated search key, and wherein actuation of the respective selectable search button inscribed with the name of the respective designated search key modifies the outcome of the search and extraction of the image data.

12. The image processing method according to claim 11, further comprising:

executing control of the display control circuit to display the first one, the second one, and a third one of the plurality of images together on respective first, second and third display positions on said display screen of said display device only after the duration is greater than a second duration, the second duration being greater than the first duration, the third image having a third degree of association as to said particular one of the designated search keys, the third degree of association being lower than the second degree of association.

13. A non-transitory storage medium encoded with an image display program, wherein the program, when executed by a computer implemented in an image processing apparatus, causes the computer to perform a method comprising:

generating a plurality of search buttons corresponding to a plurality of candidate search keys, each search button inscribed with a name of the respective candidate search key;

receiving a selection of at least one search button of the plurality of search buttons corresponding to the plurality of candidate search keys as designated search keys for the image search;

receiving selection of a particular one of the designated search keys via actuation of a respective selectable search button inscribed with the name of the respective designated search key;

determining a duration of the actuation;

searching and extracting, in response to receiving a selection by the receiving, image data having information relating to the particular one of the designated search keys from a storage circuit for storing a plurality of image data having information corresponding to the plurality of search keys;

determining a first display position at a central portion of a display screen of a display device for a first one of a plurality of images corresponding to image data having information of a first degree of association as to the particular one of said designated search keys;

determining second a display position outside of the central portion of said display screen for a second one of the plurality of images corresponding to image data having information of a second degree of association as to the particular one of said designated search keys, the second degree of association being lower than the first degree of association;

executing control of a display control circuit to control display of only the first one of the plurality of images on said display screen of said display device in response to the particular one of the respective search button of the respective one of the designated search keys being actuated for less than a first duration;

executing control of the display control circuit to control display of the first one and the second one of the plurality of images together at the respective first and second display positions on said display screen of said display device only in response to the duration of actuation of the particular one of the respective search button of the respective one of the designated search keys being equal to or greater than the first duration;

detecting a motion of the image processing apparatus;

classifying said detected motion; and storing said plurality of images into a folder in a manner corresponding to classified motion of said image processing apparatus, wherein the receiving further comprises receiving the selection of the at least one search button of the plurality of search buttons corresponding to the plurality of candidate search keys as the designated search keys for the image search by detecting a requested movement of the at least one search button of the plurality of selectable search buttons from a first area including search buttons corresponding to all the candidate search keys to a second area distinct from the first area in which only search buttons corresponding to designated search keys are located, wherein the designated search keys for the image search located in the second area only modify an outcome of the search and extraction of the image data when the particular one of the designated search keys is selected via actuation of the respective selectable search button inscribed with the name of the respective designated search key, and wherein actuation of the respective selectable search button inscribed with the name of the respective designated search key modifies the outcome of the search and extraction of the image data.

14. The non-transitory storage medium according to claim 13, further comprising:

executing control of the display control circuit to display the first one, the second one, and a third one of the plurality of images together on respective first, second and third display positions on said display screen of said display device only after the duration is greater than a second duration, the second duration being greater than the first duration, the third image having a third degree of association as to said particular one of the designated search keys, the third degree of association being lower than the second degree of association.

15. An image processing apparatus, comprising:

a display device;

a search key specifying unit configured to generate a plurality of search buttons corresponding to a plurality of candidate search keys, each search button inscribed with a name of the respective search key and to receive a selection of at least one search button of the plurality of search buttons corresponding to the plurality of candidate search keys as designated search keys for the image search;

a storage unit configured to store a plurality of image data having information corresponding to the designated search keys for the image search;

a search key input circuit configured to receive selection of a particular one of the designated search keys via actuation of a respective selectable search button inscribed with the name of the respective designated search key and determine a duration of the actuation;

a search unit configured to search and extract image data having information relating to the particular one of the designated search keys selected by said search key input unit;

a display control unit configured to determine a first display position at a central portion of a display screen of said display device for a first one of a plurality of images corresponding to image data having information of a first degree of association as to the particular one of said designated search keys, to determine a second display position outside of the central portion of said display screen for a second one of the plurality of images corresponding to image data having information of a second degree of association as to the particular one of said designated search keys, the second degree of association being lower than the first degree of association, to control display of only the first one of the plurality of images on said display screen of said display device in response to the particular one of the respective search button of the respective one of the designated search keys being actuated for less than a first duration, and to control display of the first one of the plurality of images together with the second one of the plurality of images at the respective first and second display positions on said display screen of said display device only in response to the duration of actuation of the particular one of the respective search button of the respective one of the designated search keys being equal to or greater than the first duration; and a processing unit configured to detect a motion of the image processing apparatus, to classify said detected motion, and to store said plurality of images into a folder in a manner corresponding to said classified motion of said image processing apparatus, wherein the search key input circuit is further configured to receive the selection of the at least one search button of the plurality of search buttons corresponding to the plurality of candidate search keys as the designated search keys for the image search by detecting a requested movement of the at least one search button of the plurality of selectable search buttons from a first area including search buttons corresponding to all the candidate search keys to a second area distinct from the first area in which only search buttons corresponding to designated search keys are located, wherein the designated search keys for the image search located in the second area only modify an outcome of the search and extraction of the image data when the particular one of the designated search keys is selected via actuation of the respective selectable search button inscribed with the name of the respective designated search key, and wherein actuation of the respective selectable search button inscribed with the name of the respective designated search key modifies the outcome of the search and extraction of the image data.

16. The apparatus according to claim 15, wherein the display control unit displays the first one, the second one, and a third one of the plurality of images together on respective first, second and third display positions on said display screen of said display device only after the duration is greater than a second duration, the second duration being greater than the first duration, the third image having a third degree of association as to said particular one of the designated search keys, the third degree of association being lower than the second degree of association.

17. An image display method, comprising:

generating a plurality of search buttons corresponding to a plurality of candidate search keys, each search button inscribed with a name of the respective candidate search key;

receiving a selection of at least one search button of the plurality of search buttons corresponding to the plurality of candidate search keys as designated search keys for the image search;

receiving selection of a particular one of the designated search keys via actuation of a respective selectable search button inscribed with the name of the respective designated search key;

determining a duration of the actuation;

searching and extracting, in response to receiving a selection by the receiving, image data having information relating to the particular one of the designated search keys from a storage unit for storing a plurality of image data having information corresponding to the designated search keys;

determining a first display position at a central portion of a display screen of a display device for a first one of a plurality of images corresponding to image data having information of a first degree of association as to the particular one of said designated search keys;

determining a second display position outside of the central portion of said display screen for a second one of the plurality of images corresponding to image data having information of a second degree of association as to the particular one of said designated search keys, the second degree of association being lower than the first degree of association;

executing control of a display control unit to control display of only the first one of the plurality of images on said display screen of said display device in response to the particular one of the respective search button of the respective one of the designated search keys being actuated for less than a first duration;

executing control of the display control unit to control display of the first one and the second one of the plurality of images together at the respective first and second display positions on said display screen of said display device only in response to the duration of actuation of the particular one of the respective search button of the respective one of the designated search keys being equal to or greater than the first duration;

detecting a motion of an image processing apparatus;

classifying said detected motion; and storing said plurality of images into a folder in a manner corresponding to classified motion of said image processing apparatus, wherein the receiving further comprises receiving the selection of the at least one search button of the plurality of search buttons corresponding to the plurality of candidate search keys as the designated search keys for the image search by detecting a requested movement of the at least one search button of the plurality of selectable search buttons from a first area including search buttons corresponding to all the candidate search keys to a second area distinct from the first area in which only search buttons corresponding to designated search keys are located, wherein the designated search keys for the image search located in the second area only modify an outcome of the search and extraction of the image data when the particular one of the designated search keys is selected via actuation of the respective selectable search button inscribed with the name of the respective designated search key, and wherein actuation of the respective selectable search button inscribed with the name of the respective designated search key modifies the outcome of the search and extraction of the image data.

18. The image processing method according to claim 17, further comprising:

executing control of the display control unit to display the first one, the second one, and a third one of the plurality of images together on respective first, second and third display positions on said display screen of said display device only after the duration is greater than a second duration, the second duration being greater than the first duration, the third image having a third degree of association as to said particular one of the designated search keys, the third degree of association being lower than the second degree of association.

19. A non-transitory storage medium encoded with an image display program, wherein the program, when executed by a computer implemented in an image processing apparatus, causes the computer to perform a method comprising:

generating a plurality of search buttons corresponding to a plurality of candidate search keys, each search button inscribed with a name of the respective candidate search key;

receiving a selection of at least one search button of the plurality of search buttons corresponding to the plurality of candidate search keys as designated search keys for the image search;

receiving selection of a particular one of the designated search keys via actuation of a respective selectable search button inscribed with the name of the respective designated search key;

determining a duration of the actuation;

searching and extracting, in response to receiving a selection by the receiving, image data having information relating to the particular one of the designated search keys from a storage unit for storing a plurality of image data having information corresponding to the designated search keys;

determining a first display position at a central portion of a display screen of a display device for a first one of a plurality of images corresponding to image data having information of a first degree of association as to the particular one of said designated search keys;

determining a second display position outside of the central portion of said display screen for a second one of the plurality of images corresponding to image data having information of a second degree of association as to the particular one of said designated search keys, the second degree of association being lower than the first degree of association;

executing control of a display control unit to control display of only the first one of the plurality of images on said display screen of said display device in response to the particular one of the respective search button of the respective one of the designated search keys being actuated for less than a first duration;

executing control of the display control unit to control display of the first one and the second one of the plurality of images together at the respective first and second display positions on said display screen of said display device only in response to the duration of actuation of the particular one of the respective search button of the respective one of the designated search keys being equal to or greater than the first duration;

detecting a motion of the image processing apparatus;

classifying said detected motion; and storing said plurality of images into a folder in a manner corresponding to classified motion of said image processing apparatus, wherein the receiving further comprises receiving the selection of the at least one search button of the plurality of search buttons corresponding to the plurality of candidate search keys as the designated search keys for the image search by detecting a requested movement of the at least one search button of the plurality of selectable search buttons from a first area including search buttons corresponding to all the candidate search keys to a second area distinct from the first area in which only search buttons corresponding to designated search keys are located, wherein the designated search keys for the image search located in the second area only modify an outcome of the search and extraction of the image data when the particular one of the designated search keys is selected via actuation of the respective selectable search button inscribed with the name of the respective designated search key, and wherein actuation of the respective selectable search button inscribed with the name of the respective designated search key modifies the outcome of the search and extraction of the image data.

20. The non-transitory storage medium according to claim 19, further comprising:

executing control of the display control unit to display the first one, the second one, and a third one of the plurality of images together on respective first, second and third display positions on said display screen of said display device only after the duration of actuation of the particular one of the plurality of search keys is greater than a second duration, the second duration being greater than the first duration, the third image having a third degree of association as to said particular one of the designated search keys, the third degree of association being lower than the second degree of association.

* * * * *